(12) United States Patent
Moeller et al.

(10) Patent No.: US 11,064,056 B2
(45) Date of Patent: Jul. 13, 2021

(54) METHODS AND APPARATUS TO IMPROVE INTERPROCESS COMMUNICATION

(71) Applicant: Intel Corporation, Santa Clara, CA (US)

(72) Inventors: Henrik Krogh Moeller, Aalborg (DK); Amol Dhere, Aalborg (DK)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 16/097,000

(22) PCT Filed: Jul. 1, 2016

(86) PCT No.: PCT/US2016/040691
§ 371 (c)(1),
(2) Date: Oct. 26, 2018

(87) PCT Pub. No.: WO2018/004655
PCT Pub. Date: Jan. 4, 2018

(65) Prior Publication Data
US 2020/0326959 A1    Oct. 15, 2020

(51) Int. Cl.
*H04L 29/06* (2006.01)
*G06F 9/54* (2006.01)

(52) U.S. Cl.
CPC .............. *H04L 69/06* (2013.01); *G06F 9/547* (2013.01); *H04L 67/40* (2013.01); *H04L 69/22* (2013.01)

(58) Field of Classification Search
CPC ................................ G06F 9/547; H04L 67/40
See application file for complete search history.

(56) References Cited

U.S. PATENT DOCUMENTS

| | | | |
|---|---|---|---|
| 7,242,406 B2 | 7/2007 | Robotham et al. | |
| 8,856,532 B2 | 10/2014 | Boyer et al. | |
| 9,197,641 B2 | 11/2015 | Choi et al. | |
| 2001/0025372 A1* | 9/2001 | Vermeire | G06F 9/541 717/146 |
| 2007/0143664 A1 | 6/2007 | Fang et al. | |
| 2012/0220272 A1 | 8/2012 | Husney | |

OTHER PUBLICATIONS

International Searching Authority, "International Search Report and Written Opinion," issued in connection with International Patent Application No. PCT/US2016/040691, dated Mar. 30, 2017, 9 pages.

European Patent Office, "Extended European Search Report", issued in connection with European patent application No. 16907605.6 dated Jan. 2, 2020, 9 pages.

* cited by examiner

*Primary Examiner* — Brian W Wathen
(74) *Attorney, Agent, or Firm* — Hanley, Flight & Zimmerman, LLC

(57) ABSTRACT

Methods, apparatus, systems and articles of manufacture are disclosed to improve interprocess communication. An example apparatus to improve network transmission efficiency of a sending peer includes a metadata engine to identify a reference element of a composite to a receiving peer, an annotation engine to identify configuration information of the reference element, a deep copy engine to extract an active portion of the reference element based on the configuration information, and a client payload engine to transmit the active portion of the reference element in a binary data format associated with transmission metadata.

25 Claims, 34 Drawing Sheets

| | PEER 1 ~702 | | | PEER 2 ~704 | | | | |
|---|---|---|---|---|---|---|---|---|
| Composite Type ~706 | enum | | | enum | | | | |
| Composite Name ~708 | colors | | | colors | | | | |
| Composite Size (bytes) ~710 | 2 | | | 4 | | | | |
| Composite Elements ~712 | Element Index ~714 | Element Name ~716 | Element Value ~718 | Element Index ~714 | Element Name ~716 | Element Value ~718 | Element Parity ~720 | Secondary (2°) Resolution ~722 |
| | 0 | red | ---(0) | 0 | red | --- | TRUE | n/a |
| 728 → | 1 | green | ---(1) | 1 | green | 50 | TRUE | n/a |
| 724 → | 2 | blue | ---(2) | 2 | yellow | 700 | FALSE | Peer 1=2° term "yellow" Peer 2 = 2° term "yellow" |
| 726 → | 3 | yellow | 900 | 3 | black | 1000 | FALSE | Peer 1=2° term "black" Peer 2=2° term "black" |
| | 4 | black | 1000 | 4 | grey | ---(1001) | FALSE | Peer 1=2° term "black" Peer 2=2° term "grey" |
| | 5 | grey | ---(1001) | 5 | brown | ---(1002) | FALSE | Peer 1=2° term "grey" Peer 2=2° term "brown" |
| | 6 | brown | ---(1002) | 6 | magenta | 100000 | FALSE | Peer 1=2° term "brown" Peer 2=FALSE |
| | ... | ... | ... | ... | ... | ... | ... | ... |

FIG. 7

Sender side meta-data — 1602

```
union transport_t
{
  car_t      car;     //u_discr = 1
  cycle_t    cycle;   //u_discr = 2
  bus_t      bus;     //u_discr = 50
  train_t    train;   //u_discr = 10
} struct report
{
  ... <other elements> ...

uint8_t           vechicle_discr;

union transport_t vehicle;  //discriminator = vechicle_disc

... <other elements> ...
}
```

Receiver side meta-data — 1604

```
union transport_t
{
  cycle_t    cycle;   //u_discr = 2      match
  bus_t      bus;     //u_discr = 30     match
  tram_t     tram     //u_discr = 51  ×
  train_t    train;   //u_discr = 12     match
  plane_t    plane;   //u_discr = 100 ×
}                                        No
                                         match
struct report
{
  ... <other elements> ...

uint8_t           vechicle_discr;

union transport_t vehicle;  //discriminator = vechicle_disc

... <other elements> ...
}
```

| Sender Side Union Element Name | Sender Side Discriminator Value | Receiver Side Union Element Name | Receiver Side Discriminator Value |
|---|---|---|---|
| car | 1 | cycle | 2 |
| cycle | 2 | bus | 30 |
| bus | 50 | tram | 51 |
| train | 10 | train | 12 |
| ... | ... | plane | 100 |
| ... | ... | ... | ... |

FIG. 17

METHODS AND APPARATUS TO IMPROVE INTERPROCESS COMMUNICATION

CROSS-REFERENCE TO RELATED APPLICATIONS

This patent arises from a 371 nationalization of International Patent Application Serial No. PCT/US2016/040691, which is entitled "METHODS AND APPARATUS TO IMPROVE INTERPROCESS COMMUNICATION", and which was filed on Jul. 1, 2016. The subject matter of this application is incorporated herein by reference in its entirety.

FIELD OF THE DISCLOSURE

This disclosure relates generally to information exchange, and, more particularly, to methods and apparatus to improve interprocess communication.

BACKGROUND

In recent years, server devices have collected information from ubiquitous network client devices, such as mobile telephones, tablets, personal computers, and the like. In some examples, the client devices perform one or more tasks to collect information as instructed by program(s) executing thereon. In response to a request from the client devices, the server devices store the collected information in a particular format for circumstances when requesting entities wish to retrieve the collected information. Because the different client devices, server devices and requesting entities may have different architecture types, the client devices encode their collected task information into one or more particular formats that can be read and/or otherwise processed by the server devices.

BRIEF DESCRIPTION OF THE DRAWINGS

FIG. 7 is an example enumeration resolution table (ERT) constructed in accordance with the teachings of this disclosure.

FIG. 16 illustrates example sender-side metadata and example receiver-side metadata associated with union data types.

FIG. 17 illustrates an example mapping table to resolve active union elements between sending and receiving peers.

DETAILED DESCRIPTION

Figure 1A:
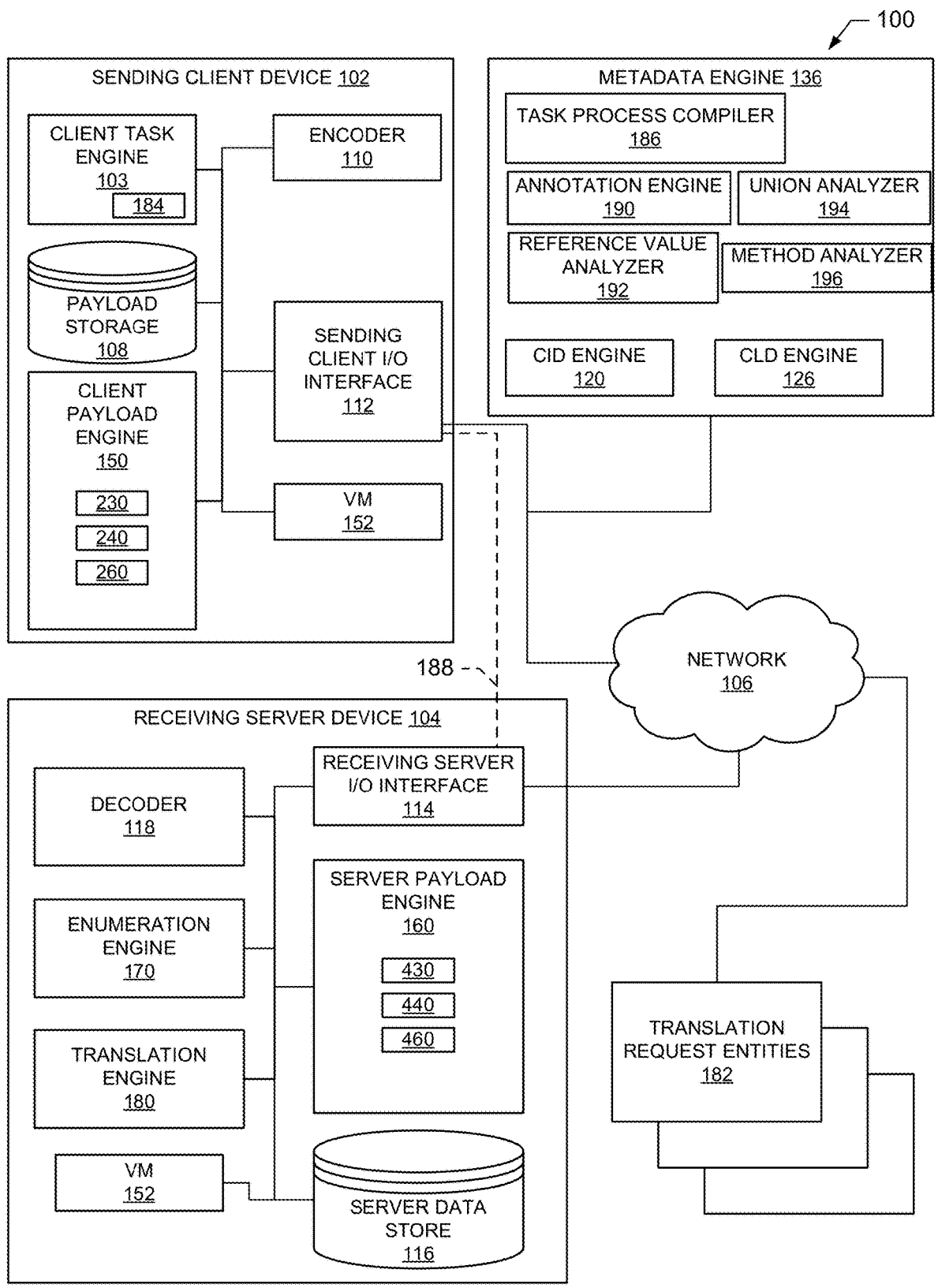
FIG. 1A is a schematic illustration of a network environment including a system to improve interprocess communication.

Network applications may exchange data in response to one or more triggers, such as remote procedure calls (RPCs), in which an example first application (e.g., a networked server) sends a request having particular data fields, and expects a response from an example second application (e.g., a networked mobile peer device) including those same data fields. In some examples, the second application may send reports in response to triggers, such as periodic time durations, aperiodic time durations, scheduled time durations, memory storage capacity threshold values, sensor response events, and/or manual triggers. Data collected and/or otherwise acquired by the example second application may be stored on a client device that executes the second application, in which the collected data is stored in a memory and/or other storage in a native format, such as a binary format. Data stored in a binary format is typically architecture specific, in which different architectures utilize different byte sizes (e.g., 8-bits per byte, 16-bits per byte, etc.), different endianness (e.g., big-endian, little-endian, mixed-endian, etc.), and/or different offset alignments.

Composite Information Exchange Between Peers

FIG. 1 is an example interprocess environment 100 having an example sending client device 102 communicatively connected to an example receiving server device 104 via an example network 106. In some examples, the sending client device 102 and the receiving server device 104 reside and/or otherwise operate on a common platform, in which communication therebetween employs a communication bus 188 instead of the example network 106. The example network 106 may employ any type of communication protocol (e.g., TCP/IP, socket communication protocol/interface, interprocess communication via I²C, shared memory, etc.) and include a wired network (e.g., CAT5 router/switch network), a wireless network (e.g., WiFi), and/or a cell-based network (e.g., GSM, CDMA, etc.). In still other examples, the network 106 is not employed and any other type of communication protocol may be employed within the same platform as a logical communication rather than a hardware-based communication. In operation, the example sending client device 102 performs one or more tasks, such as task process(es) 184, with an example client task engine 103 or a virtual machine (VM) 152 and sends (via an example sending client (also referred to as a sending peer) input/output (I/O) interface 112) collected and/or otherwise generated data (such as task data stored in an example payload storage 108 of the sending client device 102) to the example receiving server device 104 (also referred to as a receiving peer) (via an example receiving server I/O interface 114) to be stored in an example server data store 116. While the illustrated example of FIG. 1 includes a single task process 184, examples disclosed herein may include any number of task processes. Prior to sending, traditional applications of the example sending client device 102 invoke an encoder 110 to encode the payload into a format that is compatible with the example receiving server device 104. In particular, the example encoder 110 encodes in a format that is compliant with an example decoder 118 of the example receiving server device 104. As such, in the event of any changes to device architecture and/or data schema, alterations of the corresponding example encoder 110 and example decoder 118 must be addressed to ensure successful communication therebetween. The example sending client device 102 may transmit one or more portions of the data in the example payload storage 108 in response to a request from the example receiving server device 104 and/or in response to any other type of trigger (e.g., time-based triggers managed by the sending client device 102, sensor based triggers managed by the sending client device 102, etc.).

However, because an architecture of the example sending client device 102 may differ from an architecture of the example receiving server device 104, the sending client device 102 includes the example encoder 110 to encode one or more portions of the data from a native binary format into a format that can be processed by the example receiving server device 104. For example, the encoder 110 may convert and/or otherwise encode the native binary (or portions thereof) to an extensible markup language (XML) format, an abstract syntax notation (ASN, e.g., ASN.1) format, a text format (e.g., ASCII), etc. In some examples, encoding the native binary to an alternate format results in a relatively larger data storage footprint. Additionally, the example encoder 110 of the sending client device 102 is unique to a predetermined format of interest that is to communicate with one or more receiving server device(s).

Example sending client devices, such as the example sending client device 102 of FIG. 1, typically have limited processing and/or storage resources. In some examples, the sending client device 102 is a wireless telephone with (a) power consumption capabilities that are limited by battery capacity, (b) storage size capabilities that are limited by on-board memory and/or (c) processing capabilities that are limited by on-board processing device(s). Additionally, when a binary is encoded into an alternate format, the alternate format of the data (e.g., human readable ASCII) is less secure during transmission as compared to the native binary format. Furthermore, in the event the example sending client device 102 and/or the example receiving server device 104 alters a schema for encoding and/or decoding operations, compatibility therebetween is disrupted, thereby requiring additional configuration operations to enable communication.

Example methods, apparatus, articles of manufacture and/or systems disclosed herein facilitate an improved manner of exchanging information between peers (e.g., the example sending client device 102 and the example receiving server device 104) of a network 106 (or within a common platform). As described in further detail below, an example client payload engine 150 facilitates sending data from the example sending client device 102 in a manner that preserves a native binary format that may have been generated by one or more task processes 184 of the example client task engine 103 and/or stored in the payload storage 108.

Such preservation of the native binary format reduces a computational burden of the example sending client device 102 that would otherwise traditionally occur when encoding the native binary to a human-readable format prior to sending to one or more destination peer(s). Furthermore, such preservation of the native binary format reduces a storage capacity requirement of the sending device 102 because native binary formats exhibit a relatively smaller storage footprint than data encoded in a human-readable format. Because transmitting the native binary format reflects a relatively lower bandwidth when compared to encoded versions of the binary into an alternate format, network transmission efficiency is improved. Moreover, by sending data in its native binary format, it exhibits superior security characteristics when compared to human-readable format(s), and consumes less bandwidth during transmission.

Additionally, and as described in further detail below, an example server payload engine 160 facilitates reception of data in the binary format from a sending peer that may exhibit architecture differences of the example receiving server device 104, thereby allowing the network transfer of the binary format to maintain its inherent security as compared to traditional human-readable format(s). In some examples, the example client payload engine 150 and the example server payload engine 160 may be identical entities on either side of a transmission pair. An example enumeration engine 170 facilitates mapping of data composite types of ENUM between peers that may not operate with a similar architecture (e.g., different value mappings may be employed for ENUM elements, such as similar names having different values), as described in further detail below. An example deep copy engine 230 (and an associated receiving peer deep copy engine 430) facilitates transmission of reference-type composite data (e.g., one or more array data types) in a binary format. Additionally, an example method engine 240 (and an associated receiving peer method engine 440) facilitates transmission of method-type composite data (e.g., one or more function calls (e.g., in response to a remote procedure call (RPC)) in a binary format. An example union engine 260 (an an associated receiving peer union engine 460) facilitates transmission of union-type composite data in a binary format. Further, an example translation engine 180 facilitates requests (e.g., translation requests to render data associated with a composite stored on the example receiving server device 104 (the receiving peer)) that may originate from one or more translation request entities 182 and/or the example receiving server device 104, as described in further detail below.

To facilitate the improved manner of exchanging information between peers (e.g., the example sending client device 102 and the example receiving server device 104), the example interprocess environment 100 includes an example metadata engine 136 communicatively connected to the example sending client device 102 and/or the example receiving server device 104 via at least one of the example network 106 and/or the example communication bus 188. In the illustrated example of FIG. 1A, the metadata engine 136, primarily used prior to run time, includes a composite interface description (CID) engine 120, a composite layout description (CLD) engine 126, a task process compiler 186, an annotation engine 190, a reference value analyzer 192, a union analyzer 194, and a method analyzer 196, all of which are discussed in further detail below.

In operation, the example sending client device 102 (e.g., "sending peer") retrieves and/or otherwise receives one or more task process(es) 184 to be executed in a manner that retrieves and/or otherwise collects payload data to be stored in the example payload storage 108. As described above, the example sending client device 102 may be a device having limited processing and/or storage resources, but able to execute one or more task process(es) 184 to accomplish, for example, data acquisition operations. The example task process(es) 184 may be compiled into an executable format by an example task process compiler 186 of the example metadata engine 136. Payload data generated by the task process(es) 184 includes one or more associated composites. As used herein, a composite reflects a portion of a payload in the example payload storage 108 having data fields and/or data units. An example composite includes a C-structure having variable names, variable types and corresponding variable values (e.g., values for each variable name). One or more payloads stored in the example payload storage 108 may include any number and/or type of composite.

Traditional sending client devices 102 are typically instructed to send and/or otherwise transmit one or more payloads that will invoke the example encoder 110 to encode a native binary of the requested composite to a format expected by the example receiving server device. However, examples disclosed herein improve bandwidth utilization during the sending process by preventing the encoder (e.g., for legacy peers having an encoder) from encoding the composite(s), thereby allowing the sending of data to a peer (e.g., the example receiving server device 104) in its native binary format. Additionally, because the composite is sent in its native binary format, the composite is more secure by preventing a human-readable format from being rendered in the event of interception and/or network sniffing. In some examples, the native binary format, as distinguished from a human-readable format, is considered security by way of obscurity.

Figure 1B:
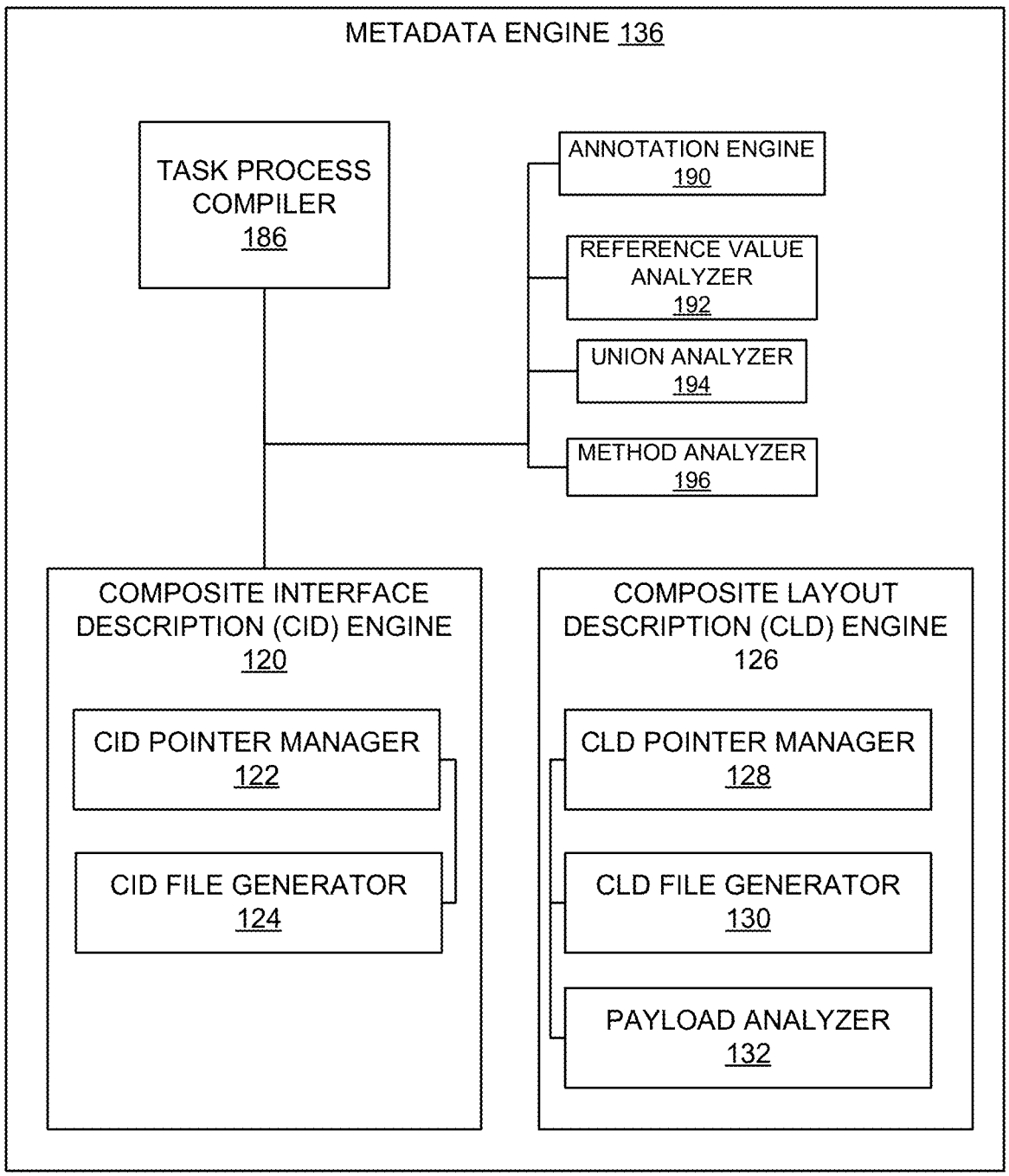
FIG. 1B is a schematic illustration of an example interprocess communication engine of FIG. 1A.

FIG. 1B includes additional detail associated with the example metadata engine 136 of FIG. TA. In the illustrated example of FIG. 1B, the CID engine 120 also includes a CID pointer manager 122 and a CLD file generator 124. Additionally, the example CLD engine 126 also includes an example CLD pointer manager 128, an example CLD file generator 130, and an example payload analyzer 132. In response to the example task process compiler 186 compiling a task process 184, the example CID engine 120 generates a CID associated with the composite to be sent. Generally speaking, and as described in further detail below, composite metadata facilitates shorthand reference to an associated CID and CLD of the composite. As described in further detail below, the CID is an architecture agnostic textual or combined binary and textual description of the composite, which includes a definition of a type of the composite (e.g., a C-structure, etc.), a name of the composite, and a list of composite element names and corresponding types and array dimensions. Additionally, the example CLD engine 126 generates a CLD associated with the composite to be sent. As described in further detail below, the CLD is an architecture specific textual or combined textual/binary description of the composite, which includes a size of the composite (e.g., a number of bytes), a number of elements in the composite, and a byte offset values for respective elements within the binary image.

Taken together, the example CID and the CLD represent the composite metadata, which is compiled into the task process 184 or, in the case of virtualized languages like JAVA, the composite metadata is stored in a virtual machine (VM) 152 and/or stored in the example payload storage 108 of the sending client device 102. After the example task process 184 is compiled and the metadata is included therein, the example metadata engine 136 is no longer needed during run time. Generally speaking, after the example CID engine 120 generates the CID associated with the composite and the example CLD engine 126 generates the CLD associated with the composite, any future reference to the composite (and the associated CID and CLD) to be sent may be referenced via the example metadata reference to conserve processing resources of the example sending client device 102. The generated composite metadata, which includes the CID and the CLD, is later retrieved during run time by an example metadata reference manager 134 (in circumstances of a compiled task process 184), or retrieved from the VM 152 and associated with a unique metadata reference (e.g., textual and/or numeric nomenclature to identify the composite metadata), in which other devices using this reference can generate consistent results despite any architecture differences that may exist therebetween. The example metadata reference manager 134 is located in the example client payload engine 150 and described in further detail below.

Figure 2:
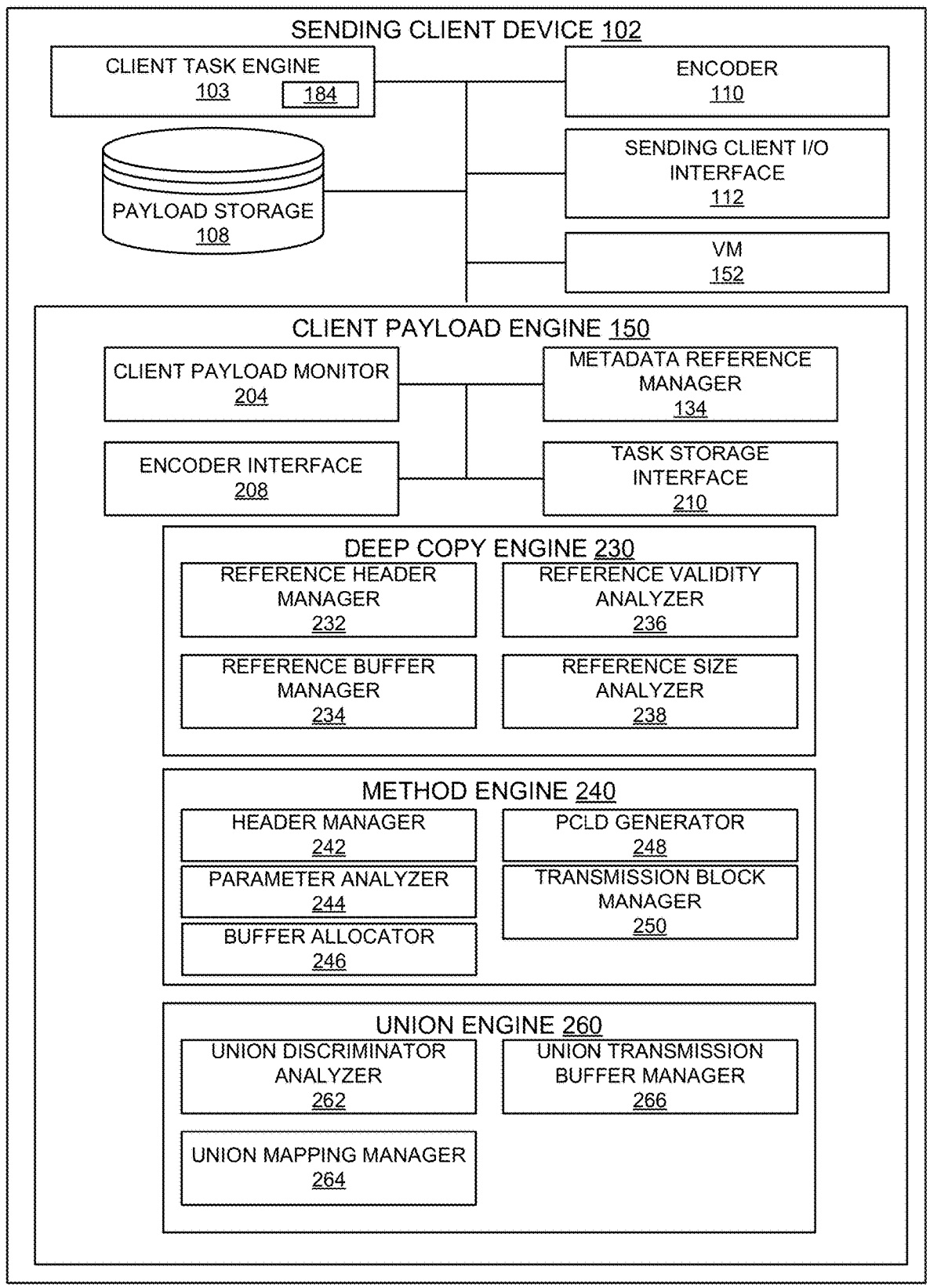
FIG. 2 is a schematic illustration of a sending client device constructed in accordance with the teachings of this disclosure.

FIG. 2 is a schematic illustration of the example sending client device 102 of FIG. 1, and includes additional detail related to managing data stored in the example payload storage 108 and/or generated by one or more task process(es) 184 of the example client task engine 103. In the illustrated example of FIG. 2, the sending client device 102 includes the client task engine 103 having one or more executable task process(es) 184, the payload storage 108, the encoder 110 (e.g., a legacy encoder), and the sending client I/O interface 112 communicatively connected to the network 106 and/or communication bus 188, as described above in connection with FIG. 1. Additionally, the example sending client device 102 of FIG. 2 includes the example VM 152, the example client payload engine 150, an example client payload monitor 204, an example encoder interface 208, an example task storage interface 210, and the example metadata reference manager 134.

Additionally, the example client payload engine 150 includes the example deep copy engine 230, which contains an example reference header manager 232, an example reference buffer manager 234, an example reference validity analyzer 236, and an example reference size analyzer. Generally speaking, and as described in further detail below, the example deep copy engine 230 (and the associated receiving-peer deep copy engine 430 of FIG. 4 having similar components) facilitates peer transfer of composites that include reference data types, such as arrays. Additionally, the example client payload engine 150 includes the example method engine 240, which contains an example header manager 242, an example parameter analyzer 244, an example buffer allocator 246, an example parameter CLD (PCLD) generator 248, and an example transmission block manager 250. Generally speaking, and as described in further detail below, the example method engine 240 (and the associated receiving-peer method engine 440 of FIG. 4 having similar components) facilitates peer transfer of composites that include method data. Additionally, the example client payload engine 150 includes the example union engine 260, which contains an example union discriminator analyzer 262, an example union mapping manager 264, and an example union transmission buffer manager 266. Generally speaking, and as described in further detail below, the example union engine 260 (and the associated receiving-peer union engine 460 of FIG. 4 having similar components) facilitates peer transfer of composites that include union data.

In operation, the example client payload monitor 204 determines whether the example payload storage 108 includes information that is to be sent and/or otherwise transmitted to the example receiving server device 104. In some examples, the client payload monitor 204 responds to one or more triggers to identify available information in the payload storage 108, such as a request from the receiving server device 104 (e.g., a remote procedure call (RPC), a time-based trigger, a sensor based trigger and/or a trigger based on a threshold capacity of stored information in the payload storage 108. When the example client payload monitor 204 is to send payload information, the example metadata reference manager 134 extracts and/or otherwise retrieves the metadata compiled in the task process 184 to facilitate improved payload transmission between peers that may have architecture differences. In the event non-compiled (virtualized) tasks are invoked (e.g., tasks executed with the example VM 152), the example metadata reference manager 134 extracts and/or otherwise retrieves the associated metadata from the VM 152 or payload storage 108.

Figure 3A:
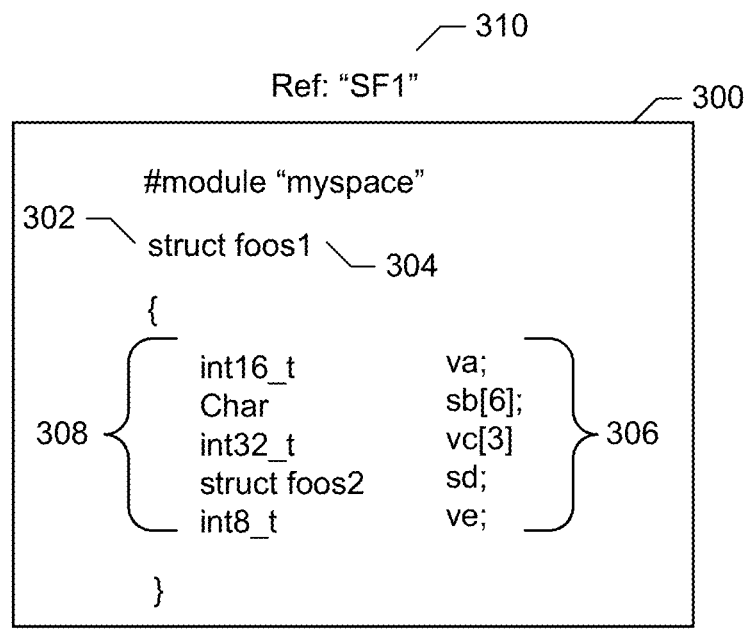
FIG. 3A is an example composite interface description (CID) constructed in accordance with the teachings of this disclosure.

FIG. 3A illustrates an example CID 300 generated by the example CID engine 120. In the illustrated example of FIG. 3A, the CID 300 includes a composite type 302 ("struct"), a composite name 304 ("foos1"), composite element names 306, and corresponding composite element types 308. As described above, the CID includes architecture agnostic textual descriptions of the composite, which is a C-structure in the illustrated example of FIG. 3A. Additionally, the example CID 300 may be stored in the example payload storage 108 as a file (e.g., a CID file), which may be a portion of the example composite metadata.

associated with the task process 184 that is to be compiled by the task process compiler 186. Generally speaking, composite information, such as variable types, variable names, offset values, and/or size information are available to and/or otherwise resolved by compilers. As such, the example task process compiler 186 is of a type that is consistent and/or otherwise associated with an architecture type for the device on which a corresponding executable will execute. An example CLD structure (binary) definition handled by the example task process compiler 186 is shown below in Table 1.

TABLE 1 typedef struct
{
    uint16_t nbr_earfcn;
    uint16_t nbr_phys_cell_id;
    uint8_t freq_band_ind;
    uint8_t nbr_rsrp;
    uint8_t nbr_rsrq;
}CellMeasResult;

Additionally, the corresponding textual CID is shown below in Table 2.

TABLE 2 const char* CellMeasResult_cid =
"\
uint16_t nbr_earfcn;\
uint16_t nbr_phys_cell_id;\
uint8_t freq_band_ind;\
uint8_t nbr_rsrp;\
uint8_t nbr_rsrq;\
"

Further, the example task process compiler 186 may compile the binary CLD as shown below in Table 3.

TABLE 3 typedef struct
{
    uint32_t size;
    uint16_t number_of_elements;
    uint16_t offset[5];
} CellMeasResult_CLD8;
CellMeasResult_CLD8 CellMeasResult_info =
{{sizeof(CellMeasResult),5, },{offsetof(CellMeasResult,nbr_earfcn),
offsetof(CellMeasResult,nbr_phys_cell_id), offsetof(CellMeasResult,freq_band_ind),
offsetof(CellMeasResult,nbr_rsrp),
offsetof(CellMeasResult,nbr_rsrq)}}

Figure 3B:
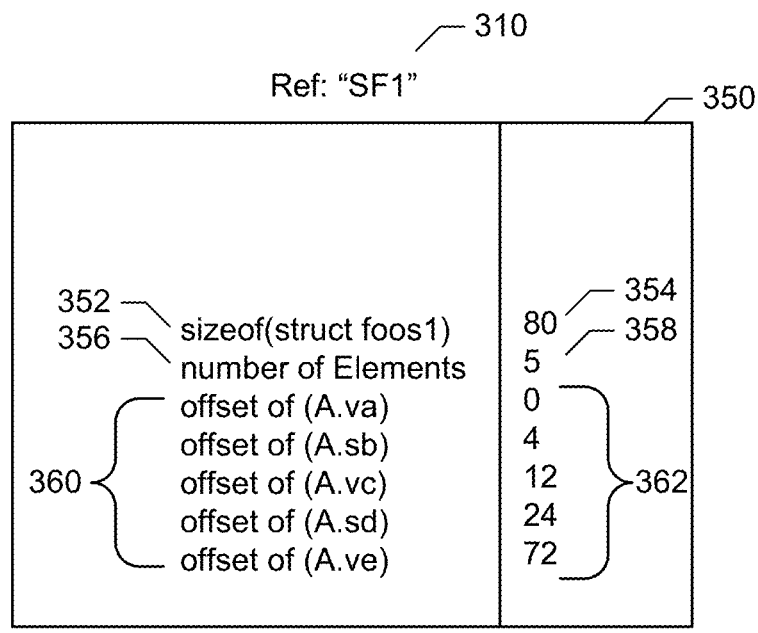
FIG. 3B is an example composite layout description (CLD) constructed in accordance with the teachings of this disclosure.

FIG. 3B illustrates an example CLD 350 generated by the example CLD engine 126. In the illustrated example of FIG. 3B, the CLD 350 includes a size identifier 352 of an example composite and a corresponding size value 354, a number of elements identifier 356 and a corresponding elements value 358, and offset identifiers 360 with corresponding binary offset values 362. Additionally, the example CLD 350 may be stored in the example payload storage 108 as a file (e.g., a CLD file), which may be a portion of the example composite metadata. Taken together, the example composite metadata includes the example CID 300 and the example CLD 350.

To build and/or otherwise generate the example CID 300, the example CID pointer manager 122 retrieves a composite The example CID file generator 124 generates a CID shell file to populate with architecture agnostic information associated with the composite, and the example CID pointer manager 122 identifies the beginning of the binary composite with a pointer to parse the composite for information for each element contained therein. For each element in the binary composite, the example CID file generator 124 encodes information to the CID 300 as text. When all elements have been encoded to the CID 300, the example CLD pointer manager 128 retrieves the composite associated with the task process 184 that is to be compiled by the task process compiler 186, and the example CLD file generator 130 generates a CLD shell file to populate with architecture specific information associated with the composite. The example payload analyzer 132 identifies a size of the composite and writes it to the CLD shell file and identifies a number of elements of the composite and writes that value to the CLD shell file (see elements 352, 354, 356 and 358) of the example CLD 350). Based on the number of elements of the composite, the example CLD pointer manager 128 increments and/or otherwise parses the composite binary a corresponding number of times to identify each element, identify its corresponding binary offset value, and the example payload analyzer 132 writes that information to the CLD shell file. In some examples, the example payload analyzer 132 determines an endianness value of the example binary composite, if available, and writes the same to the CLD shell file. In the event of any sub-composites within a composite, such sub-composites will have their own similar metadata definition(s) determined in a manner similar to the above.

The example metadata reference manager 134 sends the CID 300 and CLD 350 to the sending client device 102 as composite metadata for future use to facilitate improved data transfer/transmission to a targeted peer (e.g., the example receiving server device 104). In some examples, when the task process 184 of the sending client device is ready to transmit available payload data to a target peer, such transmission may proceed without further involvement by the example metadata engine 136. However, in the event one or more additional and/or alternate task process(es) 184 are to be provided to the example sending client device for payload data collection, then the example metadata engine 136 repeats the above disclosed examples to generate a corresponding executable and one or more instances of composite metadata (e.g., CID, CLD) for corresponding composites.

As described above, one or more task process(es) 184 are associated with virtualized languages (e.g., JAVA®, C#) rather than compiled (e.g., native) languages (e.g., C, C++). In such circumstances, the example CID and CLD are generated by reflection with cooperation from the example VM 152. For example, the metadata reference manager 134 (see the example payload engine 150 of the sending client device 102) queries the VM 152 of the sending client device 102 to determine one or more variable types and/or variable names available for the composites associated with the virtualized task process 184. Additionally, because virtual machine based languages (e.g., JAVA®, C#) do not include offset information, elements are packed back-to-back with or without padding bytes. In some examples, virtualized tasks do not need a CLD, particularly when one or more padding techniques are employed. Still further, VMs in one or more different locations (e.g., the VM 152 of the sending client device 102, the VM 152 of the receiving server device 104) may be synchronized and/or otherwise registered by the example metadata engine 136 to ensure task process consistency between two or more peers.

In response to a trigger (e.g., a request for payload data), the example task storage interface 210 of FIG. 2 determines whether the composite metadata, which includes the example CID 300 and the example CLD 350 and is associated with a particular metadata reference, has been sent to the example receiving server device 104 on a prior occasion. If not, then the example client payload engine 150 sends (a) the native binary (e.g., a portion of the payload containing the binary composite of interest), (b) the composite metadata, and (c) a metadata reference to be used when making any future reference to the binary composite and/or its associated composite metadata. In some examples, the client payload engine 150 sends (a) the native binary and (b) the metadata reference under the assumption that any receiving peer has already received and/or otherwise has the composite metadata. If not, such as when the composite metadata has not been previously sent, or the receiving peer no longer has the previously received composite metadata, then the example receiving I/O interface 114 (sometimes referred to as a receiving peer I/O interface 114) generates a request command. When the request command is received by the example client payload engine 150, the composite metadata is sent to the example receiving peer (e.g., the receiving server device 104).

As described in further detail below, sending the composite metadata along with the native binary allows the example receiving server device 104 to decode the native binary upon receipt, which allows computational efficiency improvements of the example sending client device 102 by avoiding encoding effort(s). Additionally, because the example sending client device 102 may send the native binary without expending encoding resources/effort, the example sending client device 102 conserves on-board power (e.g., battery) resources, consumes a lower transmission bandwidth (improves transmission efficiency) and, because native binary formats include a relatively smaller storage footprint than human readable format(s), the example sending client device 102 conserves on-board storage (e.g., on-board memory, RAM, FLASH, etc.) resources. Furthermore, in the event the example sending client device 102 changes its schema related to the composite binaries generated, sending compatibility is not disrupted between sending/receiving peers and, instead, schema updates (e.g., architecture changes, changes in binary offset values associated with composite elements, etc.) may be managed with updated composite metadata.

In some examples, the sending client device 102 has previously sent the composite metadata associated with the composite to the example receiving server device 104. Accordingly, the example receiving server device 104 already has a stored copy of (a) the composite metadata and (b) the metadata reference. Thus, rather than sending all three of the (a) composite metadata, (b) the metadata reference and (c) the composite binary, the example client payload engine 150 sends only the metadata reference and the composite binary, as described above. The example receiving server device references a previously stored copy of the composite metadata to allow the composite binary to be translated (e.g., translated into an alternate format, such as text, XML, an alternate binary associated with the receiving peer architecture, etc.).

Figure 4:
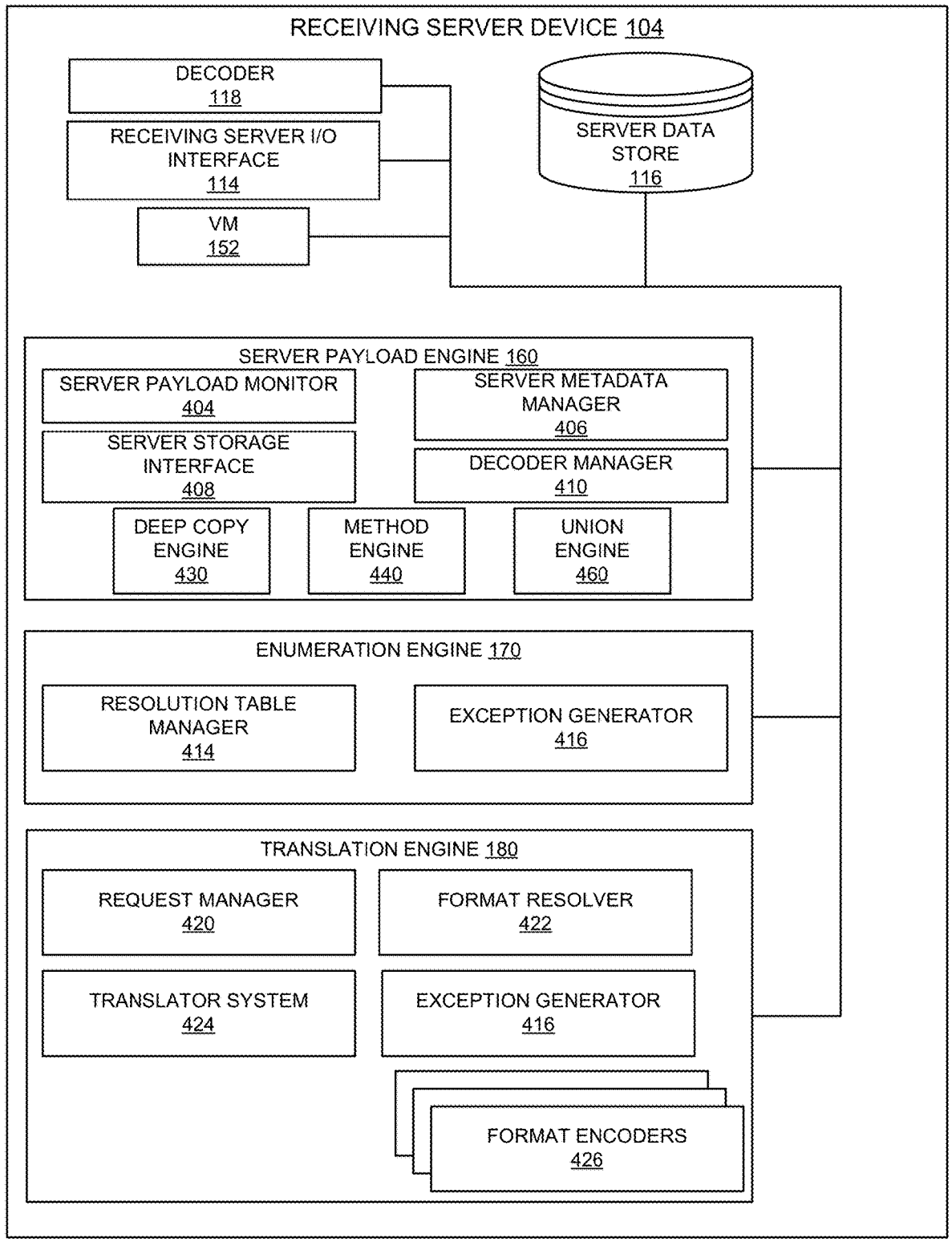
FIG. 4 is a schematic illustration of a receiving server device constructed in accordance with the teachings of this disclosure.

FIG. 4 is a schematic illustration of the example receiving server device 104 of FIG. 1A, and includes additional detail related to processing data received by the example sending client device 102. In some examples, processing data includes resolving data, such as a composite binary retrieved by a sending peer that has an architectural format that is different than the receiving peer. In the illustrated example of FIG. 4, the receiving server device 104 includes the example receiving server I/O interface 114 communicatively connected to the example network 106, the example decoder 118, the example server data store 116, and the example VM 152, as described above in connection with FIG. 1A. Additionally, the example receiving server device 104 of FIG. 4 includes the example server payload engine 160 (which, in some examples, may be identical to or similar to the example client payload engine 150), an example server payload monitor 404, an example server metadata manager 406, an example server storage interface 408, an example decoder manager 410, an example enumeration engine 170, an example resolution table manager 414, an example exception generator 416, an example translation engine 180, an example request manager 420, an example format resolver 422, an example translator system 424, the example exception generator 416, and example format encoders 426 to, in part, encode payload data into a desired format of one or more requesting entities, such as one or more requests from the example translation request entities 182. Additionally, the example receiving server device 104 of FIG. 4 includes the example deep copy engine 430, which includes the same components as the deep copy engine 230 shown in the illustrated example of FIG. 2, but with a 43"x" series of reference numbers. Further, the example receiving server device 104 of FIG. 4 includes the method engine 440, which includes the same components as the method engine 240 shown in the illustrated example of FIG. 2, but with a 44"x" series of reference numbers. Additionally, the example receiving server device 104 of FIG. 4 includes the union engine 460, which includes the same components as the union engine 260 shown in the illustrated example of FIG. 2, but with a 46"x" series of reference numbers.

In operation, the example server payload monitor 404 determines whether a payload has been received via the example receiving server I/O interface 114. As described above, the example sending client device 102 may send payload data in response to a trigger, such as a trigger initiated by the example receiving server device 104. If payload information has been received, then the example server metadata manager 406 determines whether the received payload data also includes a matching composite metadata reference. As described above, when the example sending client device 102 provides composite metadata (e.g., the example CID 300 and the example CLD 350), an associated composite metadata reference is also associated, matched and/or otherwise tagged to the composite metadata for future reference. Assuming for this example that the received payload (e.g., a received binary composite, a received metadata reference, and received metadata composite information) occurs for the first time, then the example server storage interface 408 extracts the received metadata composite information to identify the corresponding CID and CLD. The extracted CID (e.g., the example CID 350 of FIG. 3A) and the extracted CLD (e.g., the example CLD 350 of FIG. 3B) are stored in the example server data store 116 and associated with the extracted metadata reference nomenclature (e.g., "SF1"). As such, in the event another binary composite is sent having the same schema (e.g., composite metadata having the same CID and the same CLD), then the example receiving server device 104 may retrieve that from the server data store 116, which conserves processing resources of the receiving server device 104 during one or more subsequent requests to obtain and/or otherwise render data stored within a requested composite. In effect, when the metadata reference from the example sending client device 102 (e.g., sending peer) matches the metadata reference from the example receiving server device 104 (e.g., receiving peer), efforts to re-build and/or otherwise populate the CID and CLD information may be bypassed.

However, because the example sending client device 102 and the example receiving server device 104 may each have a unique and/or otherwise different architecture, the received payload from the sending client device 102 may not be compatible with the receiving server device 104. As such, the example server metadata manager 406 generates its own server-side CID file and server-side CLD file to accommodate for and/or otherwise resolve any architecture differences. In some examples, the server metadata manager 406 includes one or more elements as shown in FIG. 1B to generate the server-side CID file and the server-side CLD file, in which the example task process compiler 186 is capable of compiling task processes for a particular architecture type of the example receiving server device 104. In still other examples, the server metadata manager 406 is communicatively connected to a metadata engine 136 that is compatible with the architecture associated with the example receiving server device 104.

Figure 5:
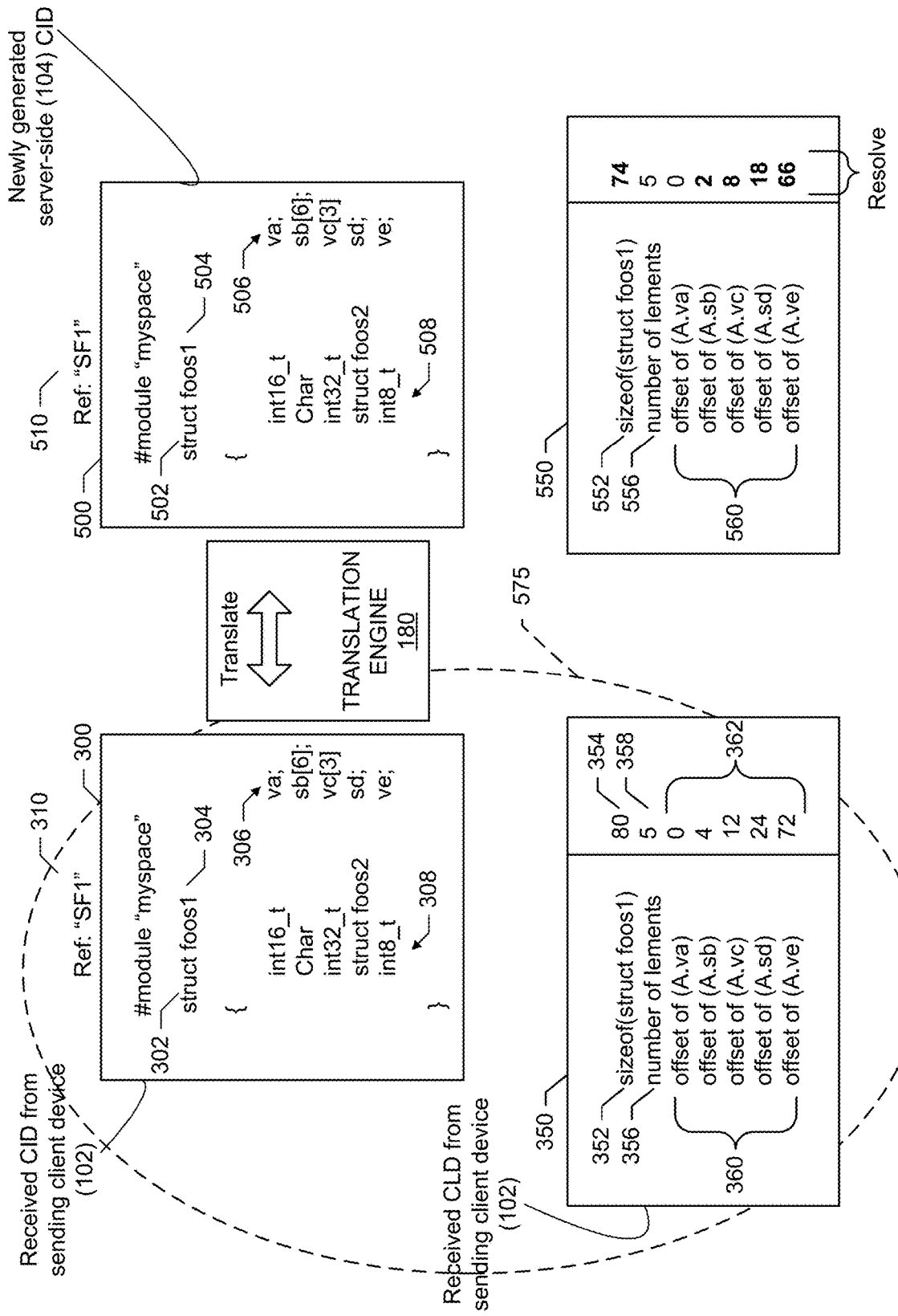
FIG. 5 illustrates example generation of a server-side CID and a server-side CLD constructed in accordance with the teachings of this disclosure.

In the illustrated example of FIG. 5, the example CID 300 generated by the example CID engine 120 has been translated by the example translation engine 180 and stored in the example server data store 116. Additionally, the example CLD 350 generated by the example CLD engine 126 has been translated by the example receiving server device 104 and stored in the example server data store 116. Taken together, the example CID 300 and the example CLD 350 produce composite metadata 575 (see dotted line). As described above in connection with FIG. 3A, the example CID 300 includes a composite type 302 ("struct"), a composite name 304 ("foos1"), composite element names 306 and corresponding composite element types 308. While the illustrated example of FIG. 5 includes a composite type of "struct," examples disclosed herein are not limited thereto. In some examples, the composite may be of type enumeration (ENUM), in which one or more elements are resolved, as described in further detail below.

The server-side CID 500 may have its own unique definition with more or less elements, in which only those matching between peers will allow translating. For those one or more elements that do not include corresponding matches between peers, they may be ignored and/or exception errors may be generated by the example exception generator 416 to convey partial decoding capabilities therebetween. When comparing and/or translation is complete, the example server-side CID 500 will also include a composite type 502, a composite name 504, composite element names 506 and corresponding composite element types 508. Additionally, the example server-side CID 500 will be associated with the same metadata reference nomenclature that was originally established by the example sending client device 102. In the illustrated example of FIG. 5, the CID 300 was associated with a metadata reference "SF1" 310, which is also attributed to the server-side CID 500 (see element 510).

As described above in connection with FIG. 3B, the example CLD 350 includes a size identifier 352 of the composite and a corresponding size value 354, a number of elements identifier 356 and a corresponding elements value 358, and offset identifiers 360 with corresponding binary offset values 362. The example server metadata manager 406 also generates the server-side CLD 550 and populates it with one or more portions of the data that translated from the received CLD 350 by the translation engine 180. In particular, when initial comparing/translation is complete, the example CLD 550 will reflect a degree of parity with the received CLD 350 by including a size identifier 552, a number of elements identifier 556, and offset identifiers 560. If the architecture of the example receiving server device 104 is dissimilar to the architecture of the sending client device 102, the example translation engine 180 determines appropriate values for the size, number of elements and/or binary offsets to be written to the example server-side CLD 550 based on a respective architecture type of the receiving server device 104.

In some examples, a mapping table resolves sender metadata and receiver metadata. In the illustrated example of FIG. 5, the translation engine 180 has determined that, based on the architecture of the receiving server device 104, the size of the binary composite is "74" (rather than a size of "80" from the sending client device 102). Similarly, the example translation engine 180 has identified particular ones of server-side CLD 550 binary offset values 362 that are to be adjusted to conform to requirements of the architecture of the receiving server device 104 (e.g., offset value of element A.sb is "4" on the sending client device 102, but is "2" on the receiving server device 104).

When the binary composite is received and/or otherwise retrieved by the example receiving server device 104 in the future (e.g., when the binary composite contains different payload data, but exhibits the same schema/composite format), then the receiving server device 104 can identify matching metadata and map to correct offset locations. In some examples, the server metadata manager 406 generates side-by-side comparison tables as shown in the illustrated example of FIG. 5 to serve as a metadata resolution table for comparison. The example translation engine 180 obtains the retrieved CID 300 and corresponding metadata reference (e.g., "SF1" 310), and queries the example server data store 116 to identify/compare a matching metadata reference (e.g., "SF1" 510). If found, the example translation engine 180 may bypass any operations to re-populate the server-side CID 500 and/or the server-side CLD 550 and, instead, retrieves the previously stored and/or resolved server-side CID 500 and compares them to verify parity therebetween.

When one or more differences between the retrieved CID 300 and the stored server-side CID 500 are identified, then one or more exceptions may be invoked and/or otherwise generated by the example exception generator 416 of the translation engine 180 to identify data corruption and/or data mismatch. Additionally, the example translation engine 180 obtains the retrieved CLD 350 and corresponding metadata reference (e.g., "SF1" 310), and queries the example server data store 116 to identify a matching metadata reference (e.g., "SF1" 510). If found, the example translation engine 180 retrieves the previously stored server-side CLD 550 and compares it with the retrieved CLD 350 to identify differences in offset values. Knowledge of the offset values in the retrieved CLD 350 permits the example receiving server device 104 to extract stored data within the composite binary that is associated with a particular element, and then store it in the example server data store 116 in a binary format that complies with the particular hardware architecture of the receiving server device 104.

Additionally, in the event the example receiving server device 104 is to perform a translation request that generates an alternate format of the retrieved binary composite for a translation request entity 182 (e.g., third party requestors (e.g., one of the translation request entities 182) that need the binary composite information rendered in XML), then the example server-side CLD 550 allows the example translator system 424 to retrieve the stored binary composite (e.g., in a binary format native to the receiving server device 104 rather than native to the sending client device 102), identify accurate locations within the binary for one or more elements of interest, and invoke an appropriate format encoder 426 to render payload data to the desired alternate format for further transmission/distribution. While the illustrated example of FIG. 1 shows translation request entities 182 outside the receiving server device 104, some examples may include one or more translation request entities 182 within the receiving server device 104. In either case, if the translation request entities 182 have their own CID/CLD (metadata), then they are compared to any metadata associated with the sending client device 102 to resolve architectural differences, as described above.

When the request manager 420 identifies a translation request (e.g., a third party request to the example receiving server device 104 to obtain composite data in a particular format), the example format resolver 422 identifies a type of the format desired. The example format resolver 422 queries the example server data store 116 to determine whether the desired format of the requested composite is already available and, if so, the example translation engine 180 retrieves the decoded composite from storage and forwards it to the requestor via the example receiving server I/O interface 114. In some examples, the requested composite is already available because it was saved to the example server data store 116 in response to one or more prior efforts to decode the binary composite into a desired format requested by a third party translation request.

On the other hand, if the desired format of the requested composite is not available in the example server data store 116 (e.g., this is the first time a translation request has been invoked for the composite binary of interest), then the example format resolver 422 identifies a first composite element from the server-side CID 500, and identifies a corresponding composite element from the server-side CLD 550 containing an offset value associated with elements of the composite binary stored in the example server data store 116. Based on respective offset values for elements of the composite binary, the example translator system 424 obtains the data located in the composite binary and invokes a corresponding format encoder 426 to translate the data to a format associated with the requestor (e.g., translation to text, translation to XML, translation to JSON, etc.). The format encoders 426 may include any number of encoder types, each one capable of encoding into a particular format. In some examples, the translator system 424 invokes a format encoder 426 to translate from a native binary into text, a native binary into XML, a native binary into JSON, etc. As the example translation engine 180 translates each element of the target composite binary stored in the example server data store 116, it stores (e.g., in the example server data store 116) aggregated composite elements to an output file having the desired format. The example translation engine 180 then sends the translated file to the requestor via the example receiving server I/O interface 114.

Exchange of Enumeration (ENUM) Data Between Peers

Figure 6:
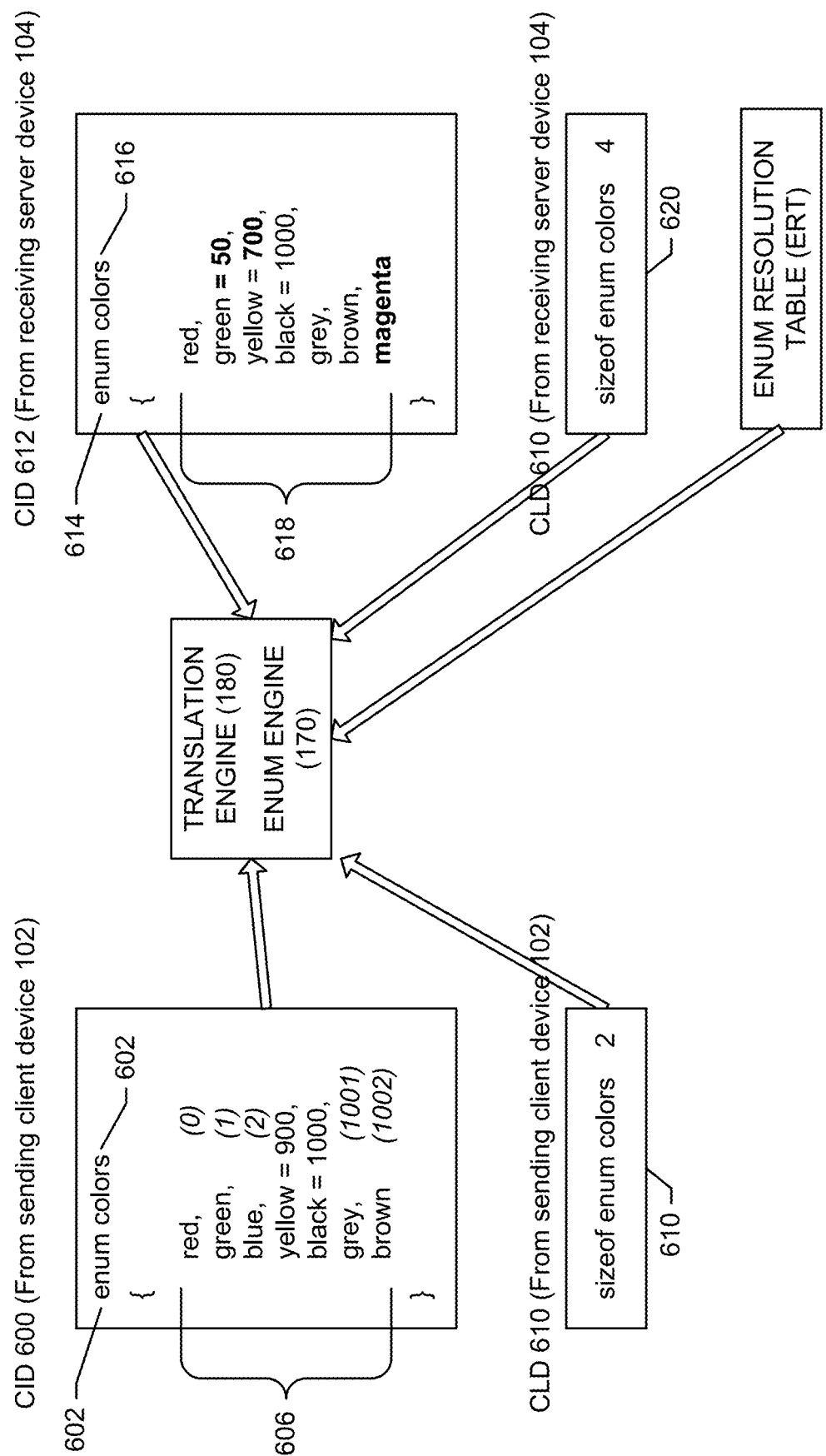
FIG. 6 illustrates an example CID and an example CLD associated with enumeration data types.

As described above, in some examples the composite is of type ENUM, which requires further resolution between elements to resolve one or more nomenclature disparities of a composite ENUM from the sending peer as compared to a composite ENUM from the receiving peer. FIG. 6 illustrates example CID and CLD tables associated with enumeration (ENUM) composite types. In some examples, the server payload monitor 404 detects a particular payload type and/or a particular type of composite stored in the payload. For example, in the event the example server payload monitor 404 detects that a received composite binary is of type ENUM, then the example enumeration engine 170 facilitates a translation of ENUM data between the received composite binary (from the example sending client device 102), and an ENUM format implemented on the example receiving server device 104. Generally speaking, while the data associated with an ENUM from the example sending client device 102 (e.g., sending peer) may be referencing the same data as an ENUM from the example receiving server device 104 (e.g., receiving peer), each of the devices may implement the ENUM with some differences in reference nomenclature. Enumeration structures represent a list of named values, which are abstracted using corresponding names in which a compiler will resolve the actual value based on the names/nomenclature. However, when communicating in a network of peers (e.g., the example sending client device 102 and the example receiving server device 104) that are not compiled together and/or have different architectures, resolution is not possible unless the ENUM is first translated into a non-binary (e.g., text) format. As discussed above, conversion from binary to one or more alternate formats results in a bloated storage footprint and computational strain during an encoding process. Thus, to allow coordination between the example sending client device 102 and the example receiving server device 104, the example enumeration engine facilitates translation therebetween while avoiding encoding overhead and/or preventing binary translation efforts when resolving one or more disparities.

In the illustrated example of FIG. 6, a CID 600 from a peer (e.g., from the sending client device 102) on the network 600 includes a composite structure of type enumeration (ENUM), as identified by a composite type identifier 602. The example CID 600 also includes an ENUM tag 604 having a name "colors." In some examples, the ENUM tag 604 is referred to as an ENUM name. The example CID 600 also includes element names 606, in which some of the elements include a corresponding target value (e.g., yellow=900, black=1000). For those elements not including an initial explicit target value (e.g., red, green, blue, etc.), an implicit value is sequentially assigned. For instance, red is assigned zero (0), green is assigned one (1), etc. In some examples, selection and/or identification of an ENUM element may occur by way of reference to an element name (e.g., "yellow"), an element target value (e.g., "900"), or an element binary position within the list of ENUM elements (e.g., "3," which refers to the fourth element in a zero-based binary list). FIG. 6 also includes a CLD 610 from the peer (e.g., from the sending client device 102), which includes information related to the size of the ENUM composite. In the illustrated example of FIG. 6, the size of the ENUM composite is "2," which reflects a byte value indicative of sixteen (16) bits. As described in further detail below, the example CID 600 and the example CLD 610 are sent to the example translation engine 180 or ENUM engine 170 in response to an instance of an ENUM composite type to be mapped.

FIG. 6 also includes a CID 612 from a separate peer (e.g., from the receiving server device 104) on the network 600. In the illustrated example of FIG. 6, the CID 612 includes an ENUM type 614 having an ENUM tag 616 named "colors," thereby indicating a match with any other ENUM composite to be mapped on the example network 600. The example CID 612 includes element names 618, in which some of the elements include a corresponding target value (e.g., green=50, yellow=700, etc.). As described above, those elements without an explicit value are sequentially assigned implicit values (e.g., red is assigned zero (0), grey is assigned one thousand and one (1001), etc.). FIG. 6 also includes a CLD 620 from the separate peer (e.g., from the receiving server device 104), which includes information related to the size of the ENUM composite. In the illustrated example of FIG. 6, the size of the ENUM composite is "4," which reflects a byte value indicative of thirty-two (32) bits. The example CID 612 and the example CLD 620 are sent to the example decoder 618 in response to an instance of an ENUM composite type to be mapped.

As described above, traditional approaches to mapping and/or otherwise resolving disparities between ENUM composite types required coordination between peers to encode and/or otherwise translate the ENUM into a standard format, which causes an original binary format to be converted into a relatively larger memory storage footprint and causes a corresponding greater bandwidth consumption, requires encoding resources, and decreases data security during a data transfer (e.g., the encoded standard type becomes human readable text). Examples disclosed herein conserve a memory storage footprint, conserve bandwidth consumption, reduce and/or eliminate encoding resources, and improve data security during a data transfer.

The example resolution table manager 114 of the example receiving server device 104 determines whether an enumeration resolution table (ERT) has previously been generated and, if not, an ERT (e.g., an initially blank shell file) is generated based on CID and CLD information sharing a matching composite tag. The example resolution table manager may save the ERT as a file in the example server data store 116. FIG. 7 illustrates an example ERT 700 populated with CID and CLD information from a pair of peers (e.g., the example sending client device 102 and the example receiving server device 104) on the example network 600. In the illustrated example of FIG. 7, the ERT 700 includes a first peer column 702 (e.g., "Peer 1") and a second peer column 704 (e.g., "Peer 2"). Additionally, for each of the example first peer column 702 and the example second peer column 704, the ERT 700 includes an example composite type identifier 706, an example composite name identifier 708, an example composite size identifier 710, and example composite element(s) identifier(s) 712. For each of the example first peer column 702 and the example second peer column 704, the example composite elements identifiers 712 include an element index column 714, an element name column 716 and an element value column 718 (e.g., a target value). Additionally, the example composite elements identifiers 712 include an element parity column 720 to identify whether composite positions for particular elements of the first and second peers match, and a secondary resolution column 722 to identify whether one or more alternate identifiers (excluding an element index position) can be used to match elements between the example first peer 702 and the example second peer 704. In other words, the example secondary resolution column 722 reflects mapping links between respective ENUM elements between the example first peer 702 and the example second peer 704.

To determine which elements match between ENUMs of the example first peer 702 and the example second peer 704, the example exception generator 416 of the ENUM engine 170 determines whether an element position mismatch occurs. In particular, the example exception generator 416 identifies a first element position of both peers (e.g., the zero "0" bits of the element index position columns 714) and determines whether a corresponding element name (e.g., the element name "red" in the element name columns 716) matches. If so, then the element associated with the evaluated element index position (e.g., index position zero "0") is deemed to be a match, in which the example resolution table manager 414 sets a value of TRUE in the example element parity column 720.

On the other hand, in the event the example exception generator 416 identifies a mismatch of an element position between peers (see row 724 of FIG. 7), then the example exception generator 416 determines if a secondary resolution parameter indicates a candidate match with a different element (e.g., a separate element having an alternate element index value). In the illustrated example of FIG. 7, index position "2" (row 724) for Peer 1 702 is associated with element name 716 "blue," but index position "2" for Peer 2 704 is associated with element name 716 "yellow," thereby indicating a mismatch. As such, the example resolution table manager 414 sets a value of FALSE in the example element parity column 720 associated with index position "2" (row 724). Despite the identified mismatch of index position "2" between the example first peer 702 and the example second peer 704, the example exception generator 416 uses a secondary resolution parameter results in a match. In particular, the example exception generator 416 uses a secondary resolution parameter of the element name "blue" from the example first peer 702 and searches all element names of the example second peer 704 for a matching element name "blue." In the illustrated example of FIG. 7, no match is identified in the example second peer 704, and the example exception generator 416 invokes an exception for any element associated with the element name "blue." While the illustrated example employs element names as the secondary resolution approach, examples disclosed herein are not limited thereto. In some examples, the primary technique to identify any differences between peers with ENUMs may employ element names only.

Despite the mismatch between the example first peer 702 and the example second peer 704 associated with the element name "blue," one or more other elements therebetween may still indicate matches that can be used to resolve differences between the ENUMs of the example first peer 702 and the example second peer 704. For example, the example exception generator 416 also identifies a mismatch of an index position between peers for index position "3" (see row 726 of FIG. 7) because the example element name "yellow" in index position "3" for the first peer 702 does not match the element name "black" in index position "3" for the second peer 704. However, when the example exception generator 416 searches alternate index positions for the element name "yellow," a match is identified in index position "2" for the second peer 704. As such, the example resolution table manager 414 populates the secondary resolution column 722 for bit position "3" with a mapping indicator that the first peer 702 matches index position "2" of the second peer 704.

When the example ERT 700 has been populated with resolved mapping information, the example enumeration engine 170 stores the ERT in the example server data store 116 in the event one or more future requests for mapping the ENUM "colors" is requested. For example, in the event the example enumeration engine 170 retrieves and/or otherwise receives a binary input query value of "1" associated with an ENUM named "colors" from the example first peer 702, then it invokes the example resolution table manager 414 to retrieve a corresponding target value for the appropriate ENUM named "colors" from the example second peer 704 by referencing the ERT 700. Because the example input query value of "1" is associated with element name "green" from the first peer 702, then a corresponding value from the second peer 704 of "50" is resolved (see row 728 of FIG. 7). While examples disclosed above illustrate a use case where the sending client device 102 is prevented from computationally intensive translations when sending payload data to the receiving server device 104, such examples are limited thereto. In some examples, the receiving server device 104 may send payload data to the sending client device 102 in a similar manner.

Exchange of Reference Data Between Peers

In some examples, a composite includes data fields and/or data units having a reference type, such as pointers in native languages. For instance, referenced data may be of variable length (e.g., a variable array), which consumes an amount of memory proportional to its length. When the array is initially declared, it may occupy a finite amount of memory, but in particular use-case scenarios the whole array is not needed. As such, when passing array references to another process (e.g., a remote peer), a corresponding amount of memory and transmission bandwidth is consumed to capture the entire array.

In circumstances where a sending peer has limited processing, memory and/or energy (e.g., battery) resources, handling relatively larger amounts of data transmission information consumes those limited resources. Examples disclosed herein reduce transmission loads between peers (e.g., sending peer and receiving peer) when handling reference composite data. Additionally, and as described above, examples disclosed herein facilitate transmission of reference composite data in a binary format, thereby reducing and/or eliminating a need to transfer such information in a relatively higher bandwidth format (e.g., XML, JSON, etc.).

Figure 8:
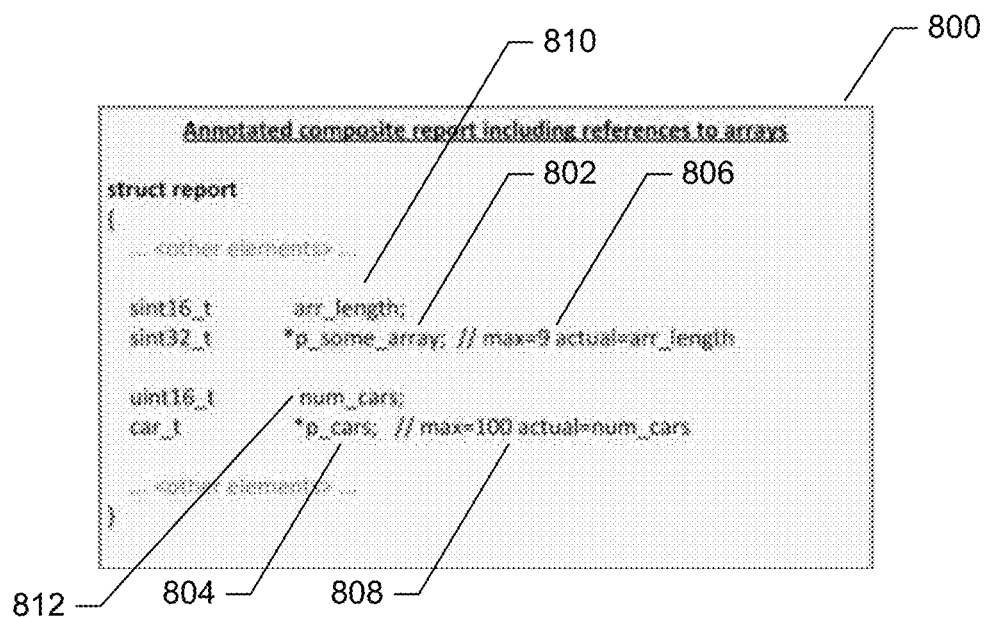
FIG. 8 is a portion of an example composite containing reference data types.

To facilitate the improved manner of exchanging reference composite data between peers (e.g., the example sending client device 102 and the example receiving server device 104), the example metadata engine 136 determines whether a new task is to be compiled that includes reference composite data. In the illustrated example of FIG. 8, a portion of an example composite containing references 800 is shown. As described above, composites and/or composite definitions may include any number and/or type of data, such as data written in the form of programming languages (e.g., C) having parameters, parameter types, structures, unions, methods, references, etc. In the illustrated example of FIG. 8, the composite 800 includes a reference to an integer array 802 (*p_some_array of type sint32_t), and a reference to an array of structures 804 (*p_cars of type car_t). The example integer array 802 also includes array annotations 806 to identify a maximum possible size of the array and an actual size of the array. Similarly, the example character array 804 includes array annotations 808 to identify configuration information of a reference of interest, such as a maximum possible size of the array and an actual size of the array (e.g., an active or relevant portion of the array to be sent to a receiving peer).

Generally speaking, developers of the example composite 800 (e.g., code developers) annotate the composite 800 to enable examples disclosed herein to perform the exchange of reference data in a more efficient manner than traditional techniques of reference data transfers. For instance, traditional techniques of reference data transfers typically require the sending peer to first translate the entire array into a format that can be interpreted and/or otherwise rendered by the receiving peer, which results in an associated buffer/memory consumption, bandwidth requirement, and processing resources to perform the translation. Additionally, traditional techniques typically require the sending peer to allocate a sufficient buffer/memory to accommodate the entire array, even if only a portion of that array includes relevant data to be transferred. As such, to reduce one or more burdens associated with reference data transfers, the example annotations identify reference element configuration information, such as one or more parameters indicative of an actual array length. In the illustrated example of FIG. 8, the integer array annotation 806 identifies "actual=arr_length" to indicate that the actual (e.g., relevant, useful, etc.) array length value can be found in the variable named "arr_length" 810. Similarly, the example p_cars reference to an array of structures annotation 808 identifies "actual=num_cars" to indicate that the actual array length value can be found in the variable named "num_cars" 812.

Figure 9:
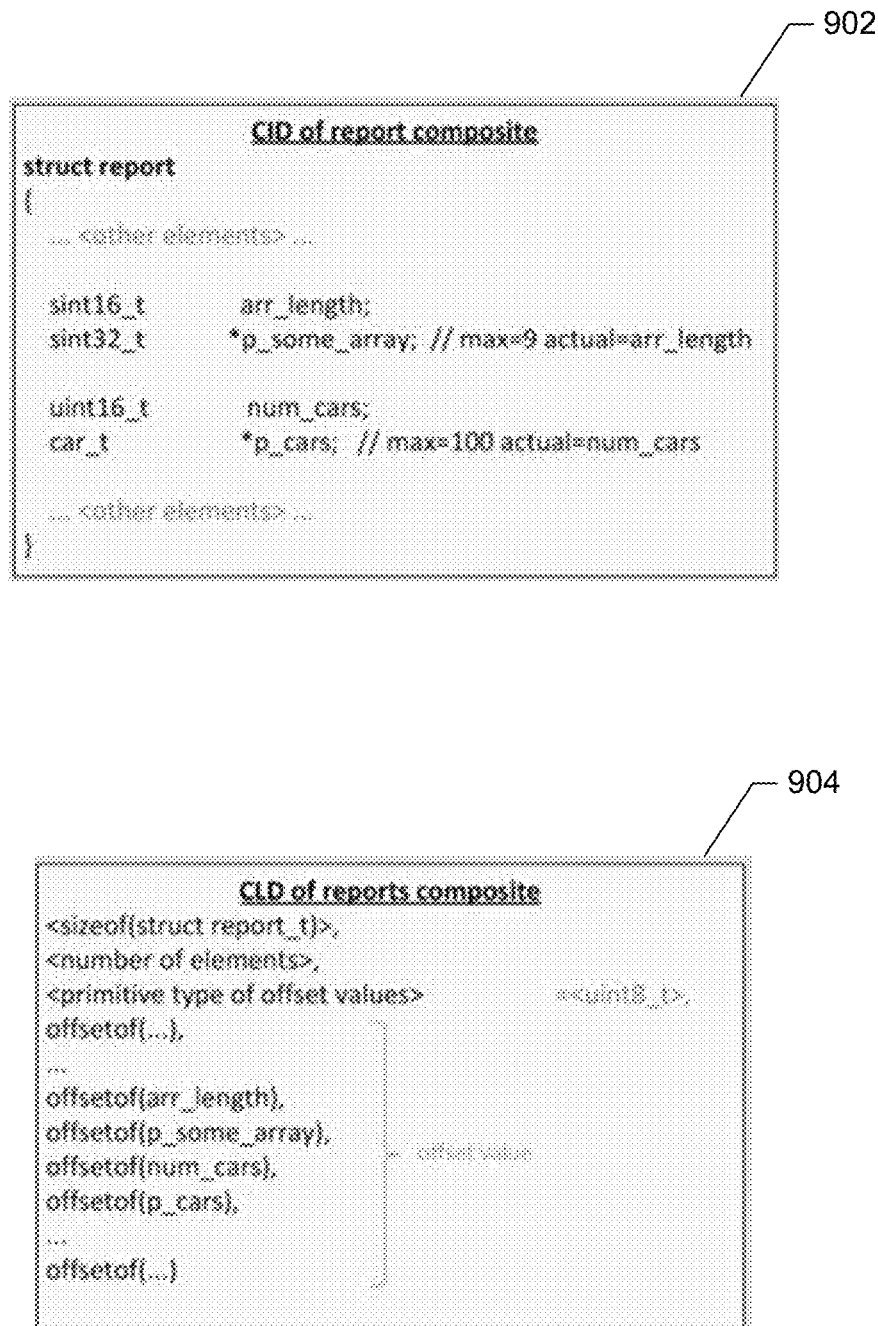
FIG. 9 illustrates an example CID and an example CLD associated with reference data types.

In operation, the example metadata engine 136 determines whether a composite includes reference data and, if so, generates a corresponding CID 902 and CLD 904 in a manner consistent with descriptions above and as shown in FIG. 9. The example annotation engine 190 parses the CID 902 for one or more annotations associated with detected reference data type(s), and the example reference value analyzer 192 identifies corresponding reference maximum value(s) and corresponding variables indicative of actual array lengths. The example deep copy engine 230 prepares the reference data for transmission from a sending peer to a receiving peer, as described below.

Figure 10:
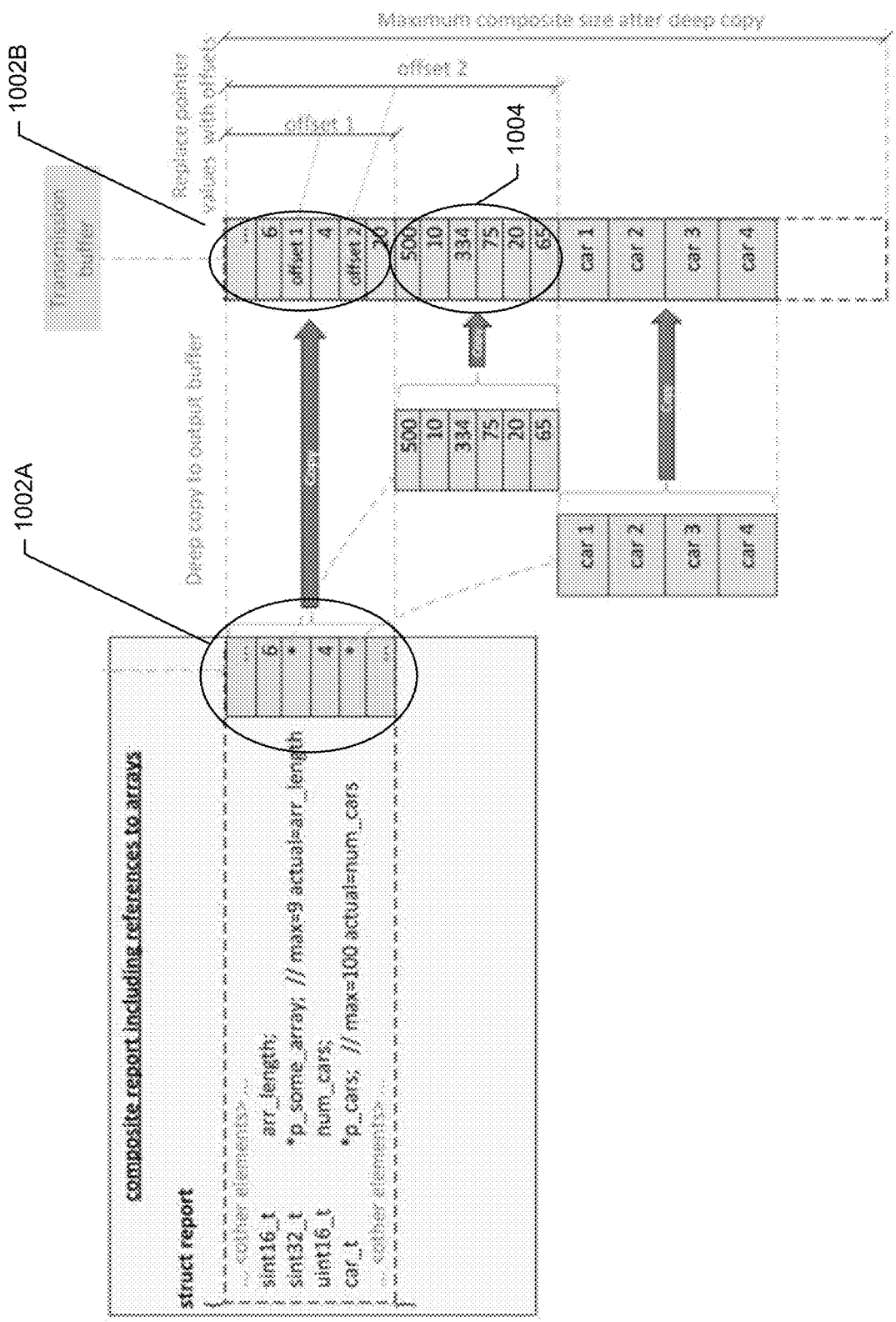
FIG. 10 illustrates an example assembly of a reference header.

The example reference header manager 232 of the deep copy engine 230 allocates memory for a reference header 1002A based on the contents of the example CID 902, as shown in the illustrated example of FIG. 10. The reference header 1002A is indicative of a composite having references, in which the identification of reference data within the composite instigates one or more services from the deep copy engine 230. The example reference header 1002A, when populated as described below, is stored in a reference transmission buffer to be sent to one or more receiving peers as transmission metadata. When combined with binary payload data (e.g., containing deep copy values of one or more arrays or other reference elements/parameters), reference header transmission metadata 1002B permits a receiving peer to identify and extract the payload data (e.g., via provided offset information) when the receiving peer has an architecture that is dissimilar to the sending peer. In some examples, the payload storage 108 may serve as the reference transmission buffer. Using offset information from the example CLD 904 and the binary reference data to be sent, the example reference transmission buffer manager 234 populates, modifies and/or otherwise replaces the example reference header 1002A with corresponding array length data and offsets for corresponding references, as shown in an example populated reference header transmission metadata 1002B (e.g., a populated, modified version of the example reference header 1002A).

Although the example integer array 802 had a maximum size of nine (9), the relevant data to be sent only includes six (6) elements of that array. Accordingly, to send any more data than is relevant for the purpose of the composite would be a waste of computing resources, memory and/or transmission bandwidth. As such, the example reference transmission buffer manager 234 selects a reference of interest (e.g., the integer array 802 (*p_some_array)) and the example reference size analyzer 238 determines whether it includes an indication of an actual size (e.g., "actual=arr_length"). If so, then the example reference transmission buffer manager 234 copies only those relevant array elements to the transmission buffer (e.g., the payload storage 108) (see oval 1004 of FIG. 10). In the event there are one or more additional references of interest within the composite, this process repeats for those one or more references, which are separated by their associated offsets. As described above, because the reference data is sent in a binary format, the associated offset information facilitates an ability for the receiving peer to segregate the one or more reference data when that particular receiving peer has an architecture that is dissimilar from the sending peer. In some examples, references may be nested, such as references inside of a reference to a structure or array of structures. If so, then the deep copy is performed on such nested references in a manner consistent with examples described above. When all references have been copied to the transmission buffer, the example reference transmission buffer 234 sends the buffer contents to the receiving peer.

In some examples, a reference to be sent from a sending peer to a receiving peer is invalid. The example reference validity analyzer 236 examines each reference of interest for an indication of invalidity (e.g., a NULL indicator or indicia) and, when detected, the example reference transmission buffer manager 234 generates an indicator (and/or indicia) of invalidity. In still other examples, if a reference does not include a corresponding actual size value, then all elements of the reference are copied to the transmission buffer, and if neither a maximum size nor an actual size is included, then an implicit maximum value of one (e.g., "ONE," or "1") is applied/assumed.

As described above, both the sending peer and the receiving peer may be capable of both sending and receiving of composite data. The example receiving server device 104 includes the server payload engine 160, which also includes the example deep copy engine 430 to facilitate reception of binary data sent by a corresponding sending peer. The example server payload monitor 404 detects receipt of payload information (e.g., a binary composite) from a sending peer, and the example deep copy engine 430 determines whether the composite includes a reference header (e.g., the reference header 1002B of FIG. 10). If so, then the example deep copy engine 430 dereferences the received binary information using the received offset data. Accordingly, the receiving peer now has the ability to determine the contents of the binary payload, even when that receiving peer is operating with an architecture that is dissimilar to that of the sending peer. As described above, the example receiving server device 104 may save the binary in association with its own CID and CLD in the event that binary is to be transmitted to one or more alternate peers. Additionally, the receiving server device 104 may employ the example translation engine 180 to translate the received binary data in one or more formats for a requestor (e.g., translation request entities 182), as described above.

Exchange of Method Data Between Peers

In some examples, a composite includes data fields and/or data units having associations with methods, such as methods that may be invoked during a remote procedure call (RPC). Methods typically include one or more method return values, input parameters and output parameters. However, in some circumstances one or more parameters of the method invoked by a caller do not need to be returned by the implementer. Examples disclosed herein improve transmission efficiency of method data by allowing the requestor to identify which parameters are to be returned (e.g., a "VALID" indicator/indicia) and which parameters do not need to be returned (e.g., an "INVALID" indicator/indicia). In other words, only relevant data is sent or returned. Examples disclosed herein also allow for compatibility verification between the caller and the implementer of RPCs, and avoids complexities related to mismatched ID allocations that may cause misalignment of one or more interfaces.

Figure 11:
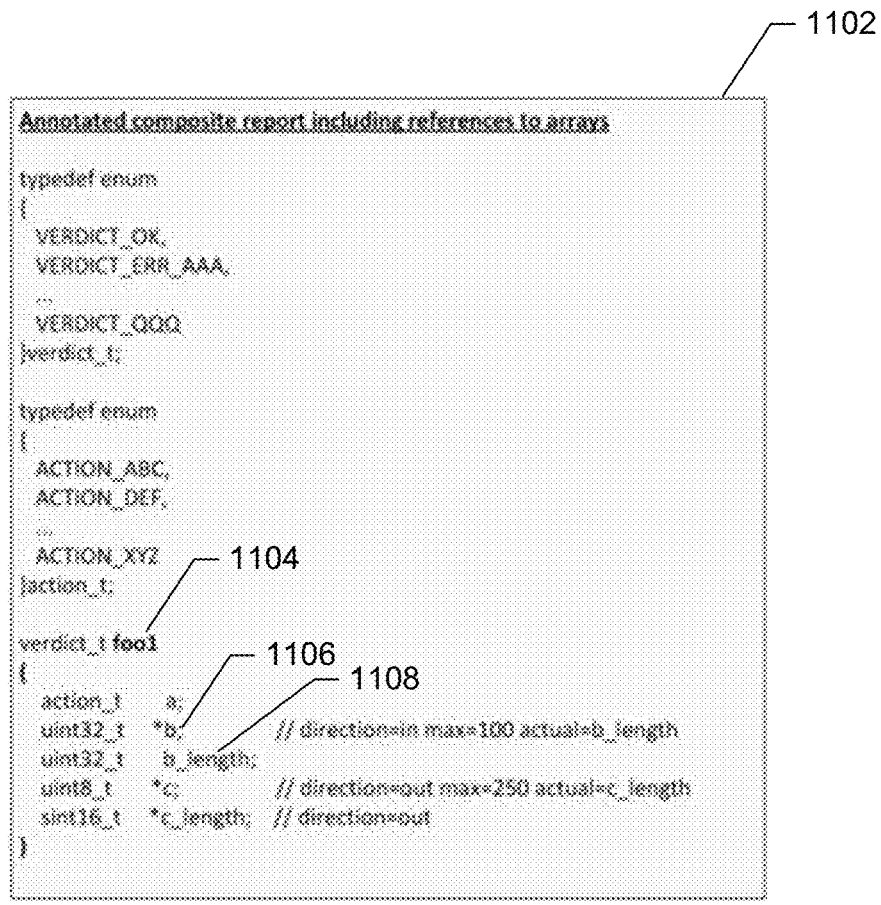
FIG. 11 is a portion of an example composite containing method data.

In operation, the example metadata engine 136 determines whether a new task is to be compiled, and whether it includes method composite data. In the illustrated example of FIG. 11, a portion of an example composite containing method composite data 1102 is shown. The example composite 1102 includes function "fool" 1104 of type "verdict_t." The example function 1104 includes five (5) parameters, three of which include annotations (e.g., "*b," "*c," and "*c_length"). The example annotation engine 190 parses a received composite for the presence of annotations and saves corresponding annotation information to determine whether a particular parameter is an input parameter, an output parameter, array maximum length, and whether the parameter has an actual length value (which may be less than the maximum length). In the illustrated example of FIG. 11, reference parameter *b 1106 includes annotations to identify that it is an input parameter ("direction=in") having a maximum length of 100 ("max=100") and an actual length value defined by the parameter b_length 1108 ("actual=b_length"). In the event a method parameter does not include annotations, it is deemed as an input parameter by default. In the event a method parameter does not identify a maximum length, then it is deemed a default length of one (1). In the event a method parameter identifies a maximum length value, but does not identify a corresponding actual length indicator, then the maximum length value is used when performing a deep copy, as described above.

Figure 12:
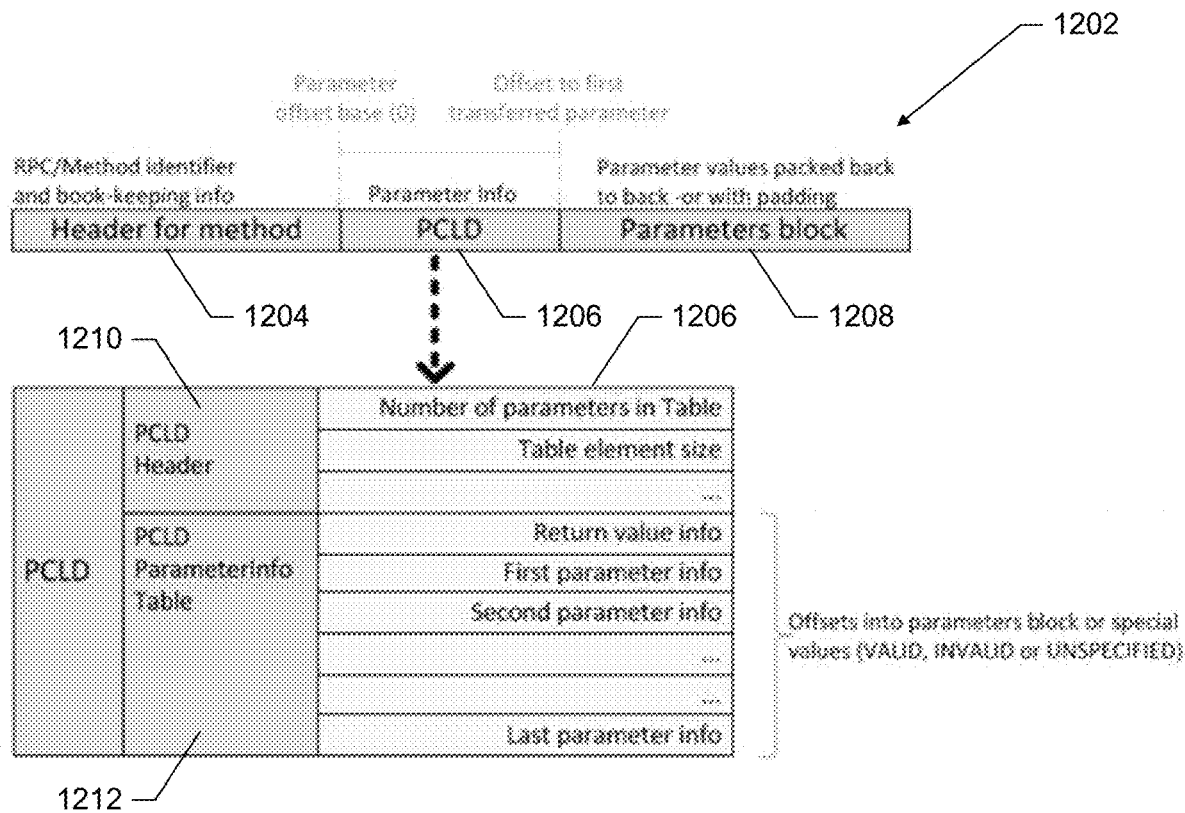
FIG. 12 is an example transmission unit structure to transmit composites containing method data.

The example method engine 240 builds a transmission unit (sometimes referred to as a "transmission block") to facilitate sending method composite data from a sending peer to a receiving peer. FIG. 12 illustrates an example transmission unit 1202 that includes a method header 1204, a parameter CLD (PCLD) 1206, and a parameter block 1208. Generally speaking, the example transmission unit 1202 serves as buffer allocation instructions for the implementer (receiving peer/receiving server device 104). In short, the buffer allocation instructions facilitate buffer memory allocation directives to the implementer when return data is expected by the caller (sending peer/sending client device 102). The example method header 1204 identifies the method of interest being invoked (e.g., via an RPC), the example PCLD 1206 contains table information that describes each parameter of the method of interest, such as parameter offset values and whether the parameter is VALID (e.g., return information is expected from the implementer) or INVALID (e.g., return information is not needed from the implementer), and the example parameter block 1208 is a data block where parameter values are copied.

Based on the number of method parameters identified by the example header manager 242 that are associated with the method of interest, the header manager 242 builds a PCLD header 1210 of the PCLD 1206 to include such information. Additionally, the example header manager 242 adds table size information (e.g., 16-bit, 32-bit, etc.) to the example PCLD header 1210. The example PCLD generator 248 builds a PCLD parameter information table 1212 to refer to offset information and whether corresponding parameters are VALID or INVALID.

Figure 13:
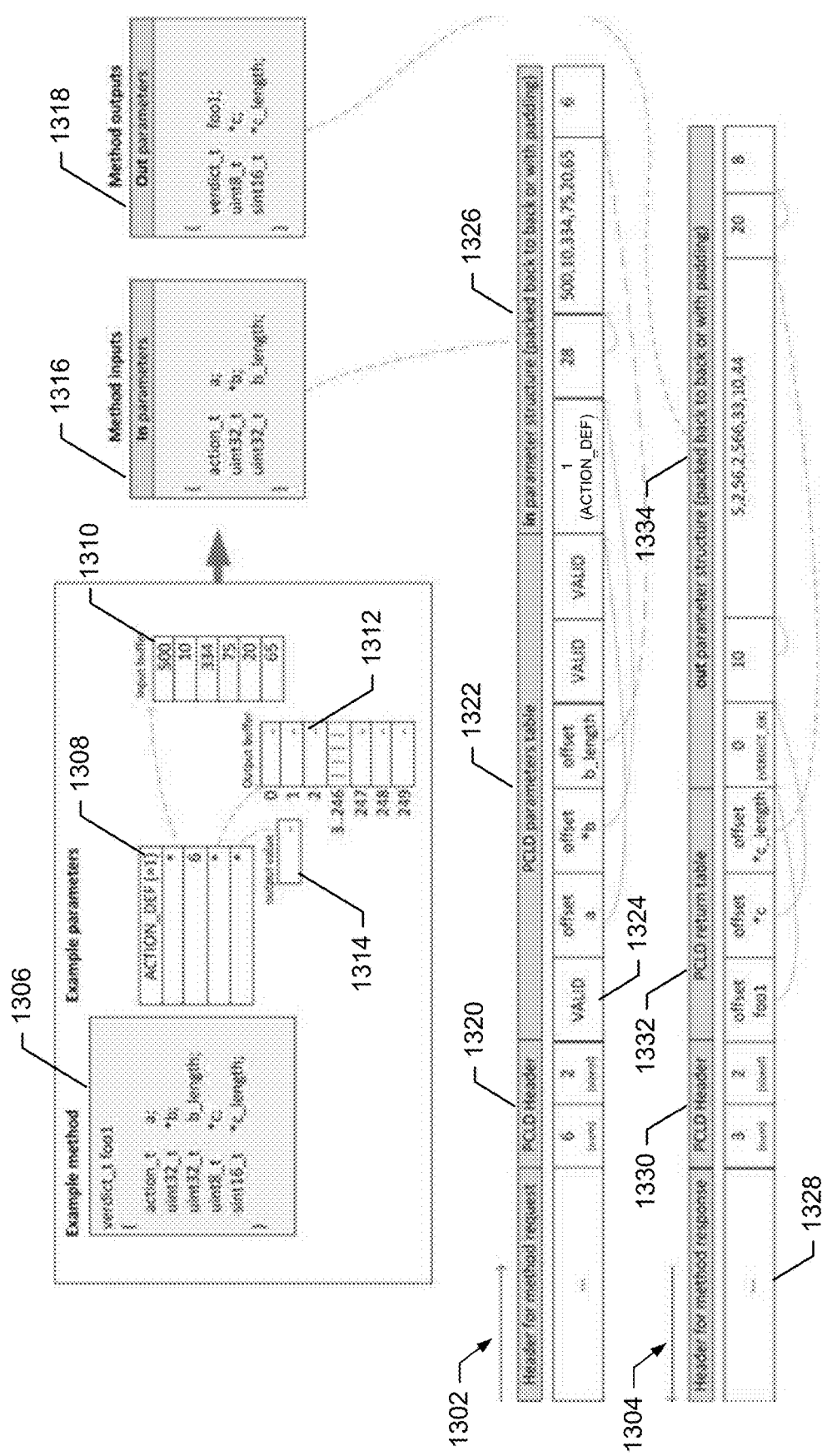
FIG. 13 illustrates construction of an example transmission request unit and an example transmission response unit.

FIG. 13 includes an example transmission request unit 1302 and an example transmission response unit 1304 generated with example data associated with a method composite. As described above, the example annotation engine 190 and the example method analyzer 196 have identified the method of interest 1306 and associated information from the annotations of the composite (see 1102 of FIG. 11). In the illustrated example of FIG. 13, method "fool" includes parameter "a" having an ENUM type "action_t" and assigned a value of "ACTION_DEF(=1)" 1308, parameter "b" is a reference pointing to an array of integer values 1310, parameter "b_length" identifies a size of the array of integer values ("6"), and parameters "c" and "c_length" are output parameters that point to a table 1312 and a value 1314, respectively, to hold values that are returned from the implementer of the function "fool." Based on the annotation information, method input parameters 1316 and method output parameters 1318 are identified.

To build the example transmission request block 1302, the example header manager identifies the number of method parameters and the size of the offsets (e.g., offset size of 16-bits) and adds this data to the PCLD header 1320. In the event the example parameter analyzer 244 determines that one or more method return value(s) is/are to be expected and/or otherwise desired, the example PCLD generator 248 sets first value(s) (or just the first value in the event there is only one method return value) of the PCLD parameter information table 1322 to "VALID" 1324. However, in some examples the return value of the method is not desired, such as circumstances when a caller of a C-language function sets a void typecast in front of a method/function call (e.g., (void) fool( )). In such example circumstances, the PCLD generator 248 sets the first value of the PCLD parameter information table 1322 to "INVALID."

The example parameter analyzer 244 identifies one of the parameters of interest from the method based on a corresponding input or output type. Generally speaking, the example transmission request block 1302 and the example transmission response block 1304 have parameter information grouped by input/output type. For instance, all parameters of type "in" may be grouped together in the example PCLD parameter information table 1322, followed by all remaining parameters of type "out" (or vice-versa). In some examples, an order of the parameters mirrors an order defined by the method definition. The example parameter analyzer 244 determines whether one or more parameters of interest under consideration is/are to be returned by the implementer and, if so, a VALID indicator/indicia is added to the PCLD parameter information table 1322. At least one effect of identifying one or more parameters as "VALID" is that it causes the implementer to allocate corresponding buffers/memory for those parameters to store parameter values to be returned to the caller. On the other hand, in the event one or more parameter values do not need to be returned to the caller, designating those particular parameters as "INVALID" (e.g., or not stating "VALID") conserves transmission bandwidth during an RPC. For the input parameters that are sent to the implementer (e.g., "a," "*b," "b_length"), offsets are written into the PCLD parameter information table 1322. The $0^{th}$ place of the PCLD table is at the beginning for the sake of convention. Additionally, in the event the parameter of interest is a reference-type parameter, then only those actual size elements of the reference are copied for transmission (deep copy), as described above and also facilitating bandwidth conservation. Data that is copied for eventual transmission is placed in the example data parameter block 1326 in a binary format.

When construction/generation of the example transmission request block 1302 is complete, the example transmission block manager 250 sends the transmission request block 1302 to the implementer. The example transmission block manager 250 monitors for receipt of a corresponding transmission response block 1304, which is generated by the receiving peer after the method has been executed thereon. When the example transmission response block 1304 is received and/or otherwise retrieved, the example method engine 240 identifies a method header 1328 that identifies the method and that the block is a response block, a PCLD header 1330 that identifies a number of returned parameters (e.g., "3") and a size of the parameters (e.g., "2" represents two bytes (16 bits)). In some examples, the number of returned parameters may always equal the number of output parameters associated with the method. Such handling may further simplify the example transmission response unit 1304 formatting (e.g., designating the number of output parameters will always equal the number of such output parameters associated with the method). However, in some examples further optimizations may be implemented to conserve transmission bandwidth for one or more output parameters that are not needed/desired by the caller. For instance, in the event two (2) out of the three (3) output parameters were designated as "VALID" (e.g., and the remaining parameter was designated as "INVALID"), then the PCLD header 1330 will include an integer value of two (2) to identify that only two output parameters are being returned. The example parameter analyzer 244 then identifies a PCLD return table 1332 to identify the returned parameters (e.g., "fool," "*c," "*c_length"), and a return data block 1334 containing the binary data values of the returned parameters at their corresponding offset locations.

Prior to the sending peer retrieving and/or otherwise receiving the example transmission response block 1304 described above, the receiving peer (implementer) first receives and/or otherwise retrieves the example transmission request block 1302 that was generated/built by the sending peer. In operation, the example server payload monitor 404 of the receiving server device 104 (the receiving peer) determines whether a payload has been received. If so, the example method engine 440 determines whether the payload includes method data. If so, the example method engine 440 identifies receipt of a method header, PCLD header 1320, PCLD parameter table 1322 and binary data block 1326 from the sending peer. The example parameter analyzer 442 extracts the number of parameters in the transmission request block 1302 and corresponding size information from the PCLD header 1320, and determines whether the method to be executed should also return one or more values, which is/are based on whether the PCLD parameter table 1322 first (or more with multiple return parameters) value is "VALID" or not. If so, the example buffer allocator 446 allocates a buffer/memory for the one or more method return value(s) to be sent back to the sending peer after the method has finished execution.

Next, the example parameter analyzer 442 iterates through the example PCLD parameter table 1322 to identify each parameter of interest, which includes groupings of "in" parameters and "out" parameters, some of which are returned to the sending peer based on an indication/indicia of validity. For "in" (input) parameters, the example method engine extracts the parameter value from the example data block 1326 based on provided offset values, and for "out" (output) parameters the example buffer allocator 446 allocates buffer/memory space to be populated with the parameter values generated after method execution. After all parameters have been extracted and/or otherwise evaluated, the input parameter values are provided to the method to be executed by the implementer (the receiving peer). After the method has completed execution, the example transmission block manager 450 builds the transmission response block 1304 in a manner consistent with the description above, and sends the example transmission response block 1304 back to the caller (sending peer/sending client device 102).

Exchange of Union Data Between Peers

In some examples, a composite includes data fields and/or data units having associations with unions (union data types in the C-language). A union is a type of data structure that can have any number of elements, which is conceptually similar to a structure (e.g., a C-language struct). The structure data type allocates memory for each element of that structure. However, unlike structures, a union has a size of( ) equal to a maximum structure size within it, and a union reference may point to any of the structure types within it. For proper dereferencing of a union, it is required to know which structure type the reference points to. In other words, unions occupy a relatively smaller memory footprint as compared to the sum of all combined structures. In the event a composite includes a reference to a union data type, examples disclosed herein permit transmission of the appropriate union element from a sending peer (e.g., the sending client device 102) to a receiving peer (e.g., the receiving server device 104) without extra data to define all union elements. Additionally, examples disclosed herein facilitate union data transmission in a binary format, thereby reducing translation processing burdens of the sending peer.

Figure 14:
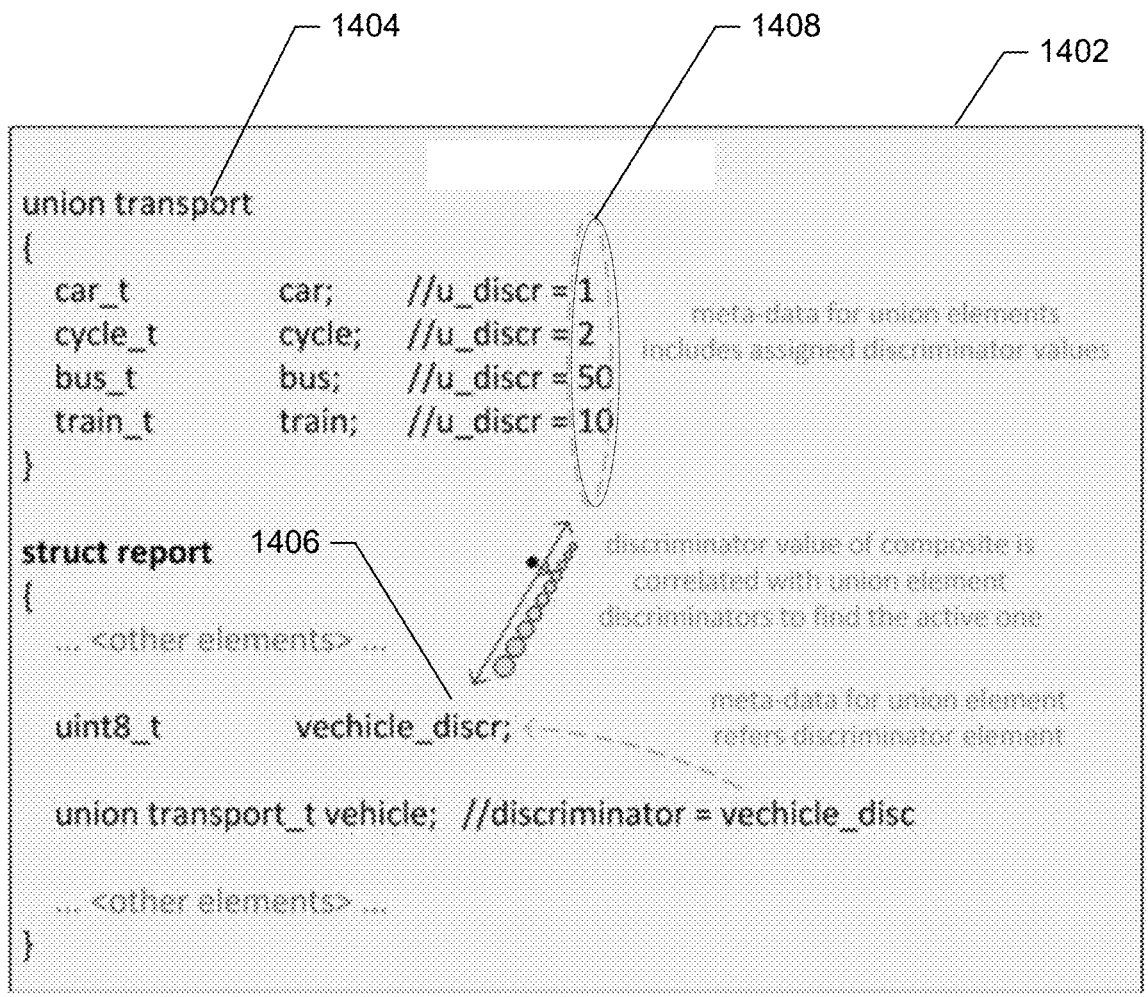
FIG. 14 is a portion of an example composite containing union data.

In operation, the example metadata engine 136 determines whether a task process is available to compile, such as a composite having any number of data types. If the example metadata engine 136 detects one or more union data types, then the example union analyzer 194 identifies the union elements of the composite associated with the union data type, as shown in the illustrated example of FIG. 14. In the illustrated example of FIG. 14, a composite containing a union 1402 is shown. A union definition of "transport" 1404 includes elements of "car," "cycle," "bus," and "train." To identify which union element is active, a discriminator variable 1406 is included in the composite named "vehicle_discr." The example union composite 1402 also includes annotations 1408 for each union element to identify a unique discriminator value that is associated with the discriminator variable 1406 when it is active. As described in further detail below, the discriminator value for the active union element is passed to the receiving peer to identify to that receiving peer which one of the union elements is active.

Figure 15:
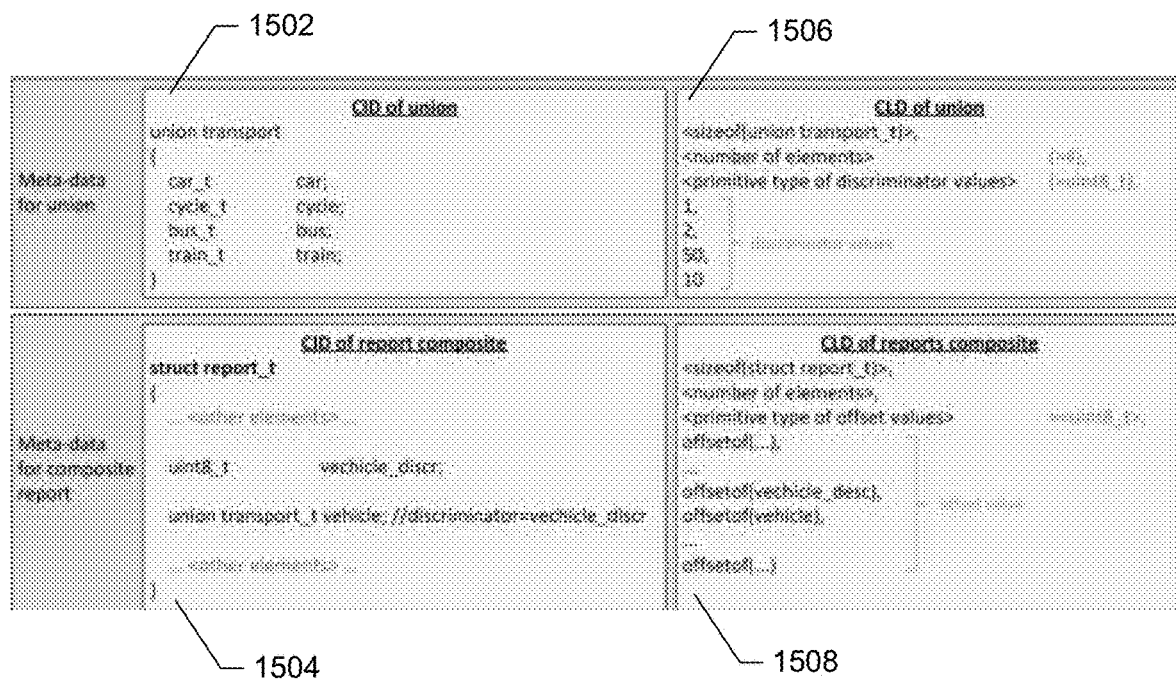
FIG. 15 illustrates an example CID and an example CLD associated with union data types.

As described above, a CID and CLD of the composite is generated by the example CID engine 120 and CLD engine 126, as shown in the illustrated example of FIG. 15. In the illustrated example of FIG. 15, a union CID 1502 and corresponding structure CID 1504 is generated by the example CID engine 120. Additionally, the example CLD engine 126 generates a union CLD 1506 and corresponding structure CLD 1508. The CIDs include architecture agnostic information, while the CLDs include architecture or implementation specific information. The example CIDs define the type, name and other properties of the composite and its corresponding elements. As shown in the illustrated example of FIG. 14, annotations are evaluated to identify which element is the discriminator for the union indicative of the active element when two or more elements are possible. The example CLDs define the size of the composite, how many elements are present, and corresponding offset values, when needed. However, unlike other data types in which offset values are part of the CLD to determine where to identify/extract particular binary data, the union data type is associated with an offset of zero (0) because all elements are overlaid (e.g., only one element can be active). Instead, the discriminator values are used to identify appropriate union elements. As such, the metadata (CID/CLD) only needs to be sent one time between peers in which the only change is with regard to the value of the discriminator variable/parameter.

In operation, the example union discriminator analyzer 262 determines which union element is being sent and the example union transmission buffer manager 266 sets the discriminator value to match the union element's value to be sent. Finally, the example client payload engine 150 sends the payload and the metadata to the receiving peer.

On the receiving peer side, the example server payload monitor 404 of the receiving server device 104 (receiving peer) determines whether a payload has been received. If so, the example union engine 260 determines whether the payload includes union data type information based on the received metadata. The receiving server I/O interface 114 retrieves and stores the binary payload and associated metadata and retrieves receiver-side CID and CLD composites. However, because the receiver-side (e.g., the receiving server device 104) may have its own metadata associated with the union, one or more differences may reside between discriminator values of the sending peer and the receiving peer. In the examples disclosed herein, assume that the sending peer's active union element is "bus" having a discriminator value of fifty (50).

FIG. 16 illustrates example sender side (e.g., sending peer/sending client device 102) metadata 1602 and example receiver side (e.g., receiving peer/receiving server device 104) metadata 1604. In the illustrated example of FIG. 16, the sender side metadata 1602 does not exhibit complete parity with the receiver side metadata 1604. In particular, the receiver side metadata 1604 does not include a car union element, but includes additional tram and plane union elements. Additionally, the discriminator values for the sender side metadata 1602 and the receiver side metadata 1604 do not match. As such, while the sending peer has sent binary data containing a union element value, the receiving peer cannot yet identify which element is active.

To resolve metadata dissimilarities that may exist between sending and receiving peers, the example union mapping manager generates a mapping table. FIG. 17 illustrates an example mapping table 1700. The example union mapping manager 464 identifies a sender-side union element based on the retrieved discriminator value. As described above, assume that the retrieved discriminator value is fifty (50). Additionally, because the sender-side metadata includes a value of fifty (50) that is associated with the union element "bus," the example union mapping manager 464 determines that "bus" is the active union element contained within the binary data. The example union mapping manager 464 searches the receiver side union element names to identify a match for "bus" and, if found, links and/or otherwise associates the sender-side active union element "bus" with the sender-side union element "bus." However, in the event a particular match cannot be found, the example union engine 460 generates an exception or ignores the transmission attempt.

While the receiving peer union element "bus" still has an associated discriminator value of thirty (30), this discrepancy does not affect the ability for the sending peer to communicate the same union element of interest. In particular, in the event the receiving peer has a need to further transmit this union element to a subsequent/other receiving peer, the discriminator value of thirty (30) will be used when transmitting that binary data in the future.

While an example manner of implementing the metadata engine 136, the client payload engine 150, the server payload engine 160, the enumeration engine 170, the translation engine 180, the deep copy engine 230, the method engine 240, and the union engine 260 of FIGS. 1A and 1B is illustrated in FIGS. 2, 3A, 3B and 4-17, one or more of the elements, processes and/or devices illustrated in FIGS. 1, 2, 3A, 3B and 4-17 may be combined, divided, re-arranged, omitted, eliminated and/or implemented in any other way. Further, the example sending client device 102, the example receiving server device 104, the example client task engine 103, the example payload storage 108, the example encoder 110, the example sending client I/O interface 112, the example receiving server I/O interface 114, the example server data store 116, the example decoder 118, the example metadata engine 136, the example task process compiler 186, the example VM 152, the example client payload monitor 204, the example metadata reference manager 134, the example encoder interface 208, the example task storage interface 210, the example annotation engine 190, the example reference value analyzer 192, the example union analyzer 194, the example method analyzer 196, the example reference header manager 232, the example reference transmission buffer manager 234, the example reference validity analyzer 236, the example reference size analyzer 238, the example header manager 242, the example parameter analyzer 244, the example buffer allocator 246, the example PCLD generator 248, the example transmission block manager 250, the example union discriminator analyzer 262, the example union mapping manager 264, the example union transmission buffer manager 266, the example CID engine 120, the example CID pointer manager 122, the example CID file generator 124, the example CLD engine 126, the example CLD pointer manager 128, the example payload analyzer 132, the example CLD file generator 130, the example server payload monitor 404, the example server metadata manager 406, the example server storage interface 408, the example decoder manager 410, the example resolution table manager 414, the example exception generator 416, the example request manager 420, the example format resolver 422, the example translator system 424, the example format encoders 426 and/or, more generally, the example client payload engine 150, the example server payload engine 160, the example enumeration engine 170, the example translation engine 180, the example deep copy engine 230, the example method engine 240 and the example union engine 260 of FIGS. 1A, 1B, 2 and 4 may be implemented by hardware, software, firmware and/or any combination of hardware, software and/or firmware. Thus, for example, any of the example sending client device 102, the example receiving server device 104, the example client task engine 103, the example payload storage 108, the example encoder 110, the example sending client I/O interface 112, the example receiving server I/O interface 114, the example server data store 116, the example decoder 118, the example metadata engine 136, the example task process compiler 186, the example VM 152, the example client payload monitor 204, the example metadata reference manager 134, the example encoder interface 208, the example task storage interface 210, the example annotation engine 190, the example reference value analyzer 192, the example union analyzer 194, the example method analyzer 196, the example reference header manager 232, the example reference transmission buffer manager 234, the example reference validity analyzer 236, the example reference size analyzer 238, the example header manager 242, the example parameter analyzer 244, the example buffer allocator 246, the example PCLD generator 248, the example transmission block manager 250, the example union discriminator analyzer 262, the example union mapping manager 264, the example union transmission buffer manager 266, the example CID engine 120, the example CID pointer manager 122, the example CID file generator 124, the example CLD engine 126, the example CLD pointer manager 128, the example payload analyzer 132, the example CLD file generator 130, the example server payload monitor 404, the example server metadata manager 406, the example server storage interface 408, the example decoder manager 410, the example resolution table manager 414, the example exception generator 416, the example request manager 420, the example format resolver 422, the example translator system 424, the example format encoders 426 and/or, more generally, the example client payload engine 150, the example server payload engine 160, the example enumeration engine 170, the example translation engine 180, the example deep copy engine 230, the example method engine 240 and the example union engine 260 of FIGS. 1A, 1B, 2 and 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sending client device 102, the example receiving server device 104, the example client task engine 103, the example payload storage 108, the example encoder 110, the example sending client I/O interface 112, the example receiving server I/O interface 114, the example server data store 116, the example decoder 118, the example metadata engine 136, the example task process compiler 186, the example VM 152, the example client payload monitor 204, the example metadata reference manager 134, the example encoder interface 208, the example task storage interface 210, the example annotation engine 190, the example reference value analyzer 192, the example union analyzer 194, the example method analyzer 196, the example reference header manager 232, the example reference transmission buffer manager 234, the example reference validity analyzer 236, the example reference size analyzer 238, the example header manager 242, the example parameter analyzer 244, the example buffer allocator 246, the example PCLD generator 248, the example transmission block manager 250, the example union discriminator analyzer 262, the example union mapping manager 264, the example union transmission buffer manager 266, the example CID engine 120, the example CID pointer manager 122, the example CID file generator 124, the example CLD engine 126, the example CLD pointer manager 128, the example payload analyzer 132, the example CLD file generator 130, the example server payload monitor 404, the example server metadata manager 406, the example server storage interface 408, the example decoder manager 410, the example resolution table manager 414, the example exception generator 416, the example request manager 420, the example format resolver 422, the example translator system 424, the example format encoders 426 and/or, more generally, the example client payload engine 150, the example server payload engine 160, the example enumeration engine 170, the example translation engine 180, the example deep copy engine 230, the example method engine 240 and the example union engine 260 of FIGS. 1A, 1B, 2 and 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example client payload engine 150, the example server payload engine 160, the example enumeration engine 170, the example metadata engine 136, the example deep copy engine 230, the example method engine 240 and/or the example union engine 260 of FIGS. 1A, 1B, 2 and 4 may include one or more elements, processes and/or devices in addition to, or instead of, those illustrated in FIGS. 1A, 1B, 2 and/or 4, and/or may include more than one of any or all of the illustrated elements, processes and devices.

Flowcharts representative of example machine readable instructions for implementing the metadata engine 136, the client payload engine 150, the server payload engine 160, the enumeration engine 170, the deep copy engine 230, the method engine 240 and/or the union engine 260 of FIGS. 1A, 1B, 2 and 4 is/are shown in FIGS. 18-32. In these examples, the machine readable instructions comprise one or more programs for execution by a processor such as the processor 3312 shown in the example processor platform 3300 discussed below in connection with FIG. 33. The program(s) may be embodied in software stored on a tangible computer readable storage medium such as a CD-ROM, a floppy disk, a hard drive, a digital versatile disk (DVD), a Blu-ray disk, or a memory associated with the processor 3312, but the entire program(s) and/or parts thereof could alternatively be executed by a device other than the processor 3312 and/or embodied in firmware or dedicated hardware. Further, although the example program(s) is/are described with reference to the flowcharts illustrated in FIGS. 18-32, many other methods of implementing the example metadata engine 136, the example client payload engine 150, the example server payload engine 160, the example enumeration engine 170, the example deep copy engine 230, the example method engine 240 and/or the example union engine 260 may alternatively be used. For example, the order of execution of the blocks may be changed, and/or some of the blocks described may be changed, eliminated, or combined.

As mentioned above, the example processes of FIGS. 18-32 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 18-32 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 18:
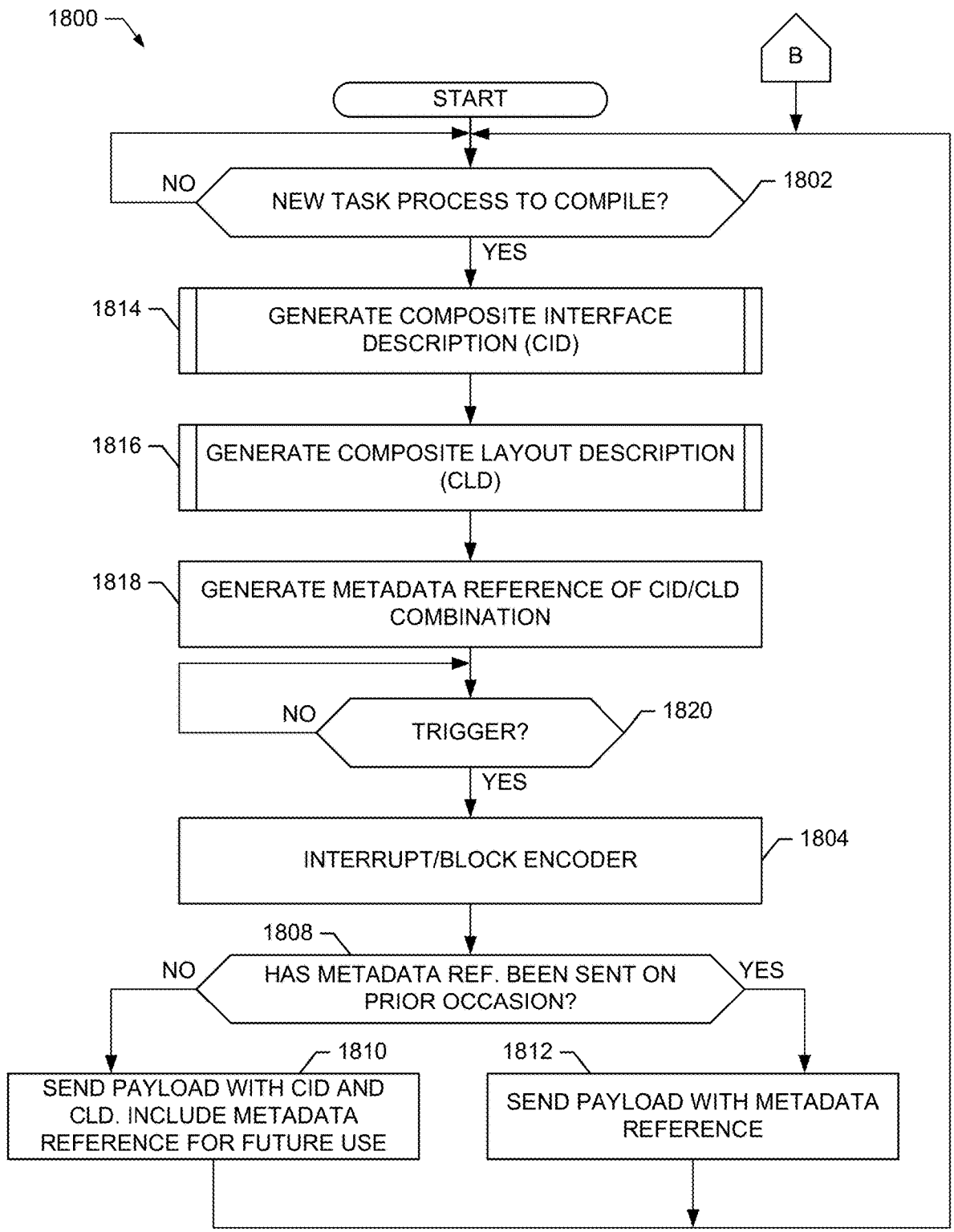
FIGS. 18-32 are flowcharts representative of example machine readable instructions that may be executed to implement the example sending client device of FIG. 2, the example receiving server device of FIG. 4, and the example metadata engine of FIGS. 1A and 1B.

The program 1800 of FIG. 18 begins at block 1802 where the example metadata engine 136 determines whether a new task is to be compiled. If so, the example CID engine 120 generates a CID associated with the composite binary to be sent (block 1814), and the example CLD engine 126 generates a CLD associated with the composite binary to be sent (block 1816). When both the example CID and CLD have been generated, the example metadata reference manager 134 generates a metadata reference associated therewith so that one or more future instances of sending the composite binary can occur without the need to re-send the CID and CLD to the target peer (block 1818). The client payload monitor 204 determines whether a payload (e.g., one or more composites) is to be sent to one or more requesting devices (peers) on the network 106, such as an example receiving server device 104 (block 1814). As described above, the example sending client device 102 may send payload data in response to a request from one or more peers, send payload data in response to a time-based trigger (e.g., periodic, aperiodic, scheduled, etc.), and/or send payload data in response to a condition-based trigger (e.g., threshold storage consumption value of the example payload storage 108). In some examples, an absence of a trigger results in a wait state, while in other examples the client payload engine 202 sends and/or otherwise distributes composite metadata to one or more peers so that they are ready when payload data becomes available.

To conserve computing resources of the example sending client device 102, the example encoder interface 208 interrupts and/or otherwise prevents the example encoder 110 from performing an encoding operation on the composite to be sent (block 1804). As such, any composite(s) sent by the example sending client device 102 will remain in a native format (e.g., binary), which consumes a relatively smaller memory storage footprint and preserves an inherent security of the composite that is sent via the example network 106.

The example task storage interface 210 determines whether the metadata reference has been sent to the target peer on a prior occasion (block 1808). As discussed above, the example client payload engine may distribute composite metadata as soon as it is available, such as when one or more peers is experiencing a relatively low computational demand. If the metadata reference has not been previously sent, then the example client payload engine 202 sends the payload (e.g., a composite within the payload) with (a) the metadata reference, (b) a CID associated with the composite, (c) a CLD associated with the composite and (d) the composite in its binary format (block 1810). On the other hand, in the event the task storage interface 210 determines that the metadata reference has been sent to the target peer on a prior occasion (block 1808), which means that the target peer already has received the corresponding CID and CLD associated with the composite, then the example client payload engine 202 sends only the composite in its binary format (block 1812). In still other examples, the client payload engine 202 always sends the payload with the metadata reference by default. In the event the receiving peer does not have the corresponding composite metadata, then it sends a request that is acknowledged by and/or otherwise serviced by the client payload engine 202 to send the composite metadata.

Figure 19:
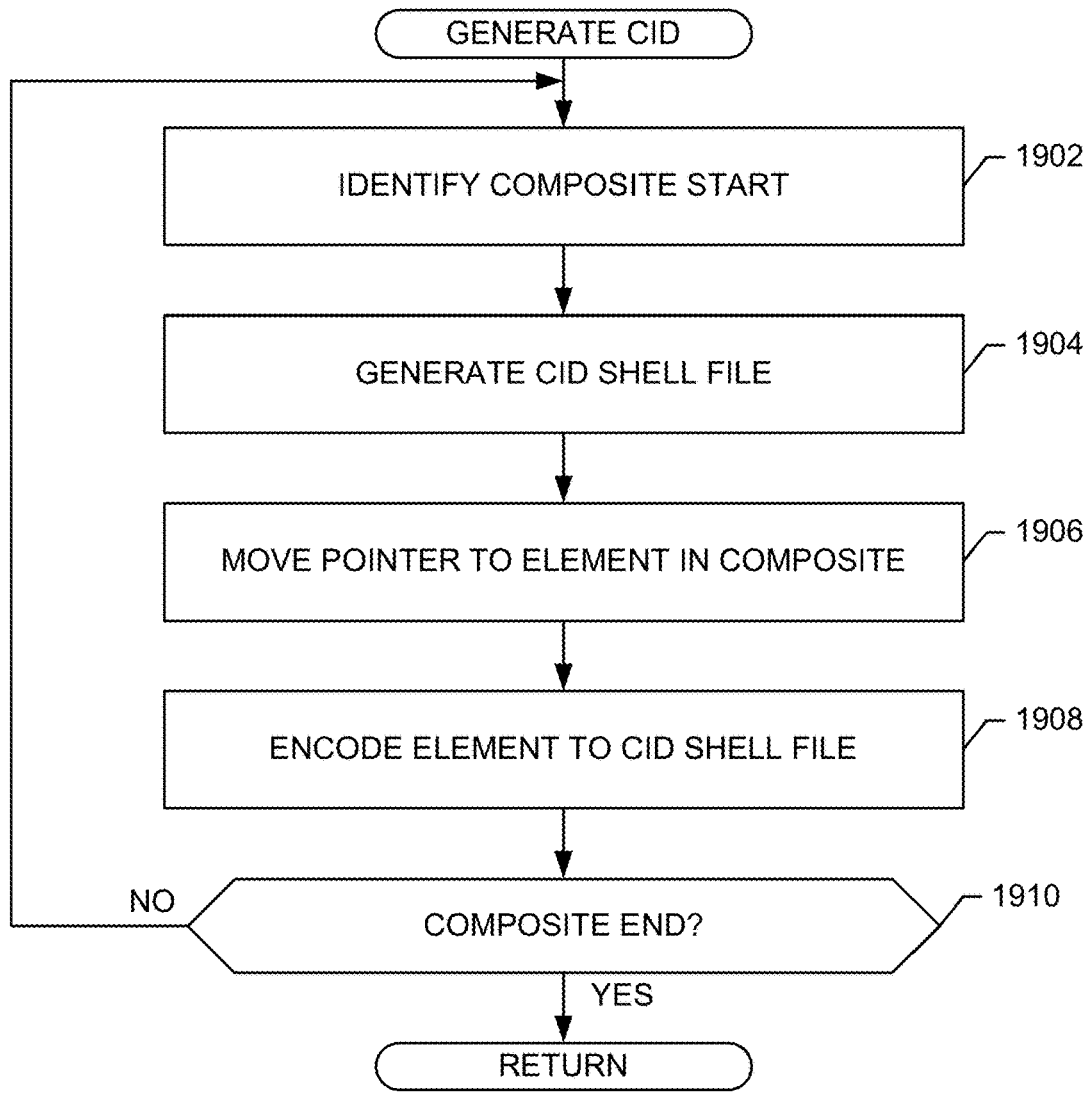

FIG. 19 illustrates additional detail for generating the CID of block 1814. In the illustrated example of FIG. 19, the CID pointer manager 122 employs a parsing pointer to retrieve the composite and identify a beginning portion of the composite (block 1902). The example CID file generator 124 generates a CID shell file to be populated with architecture agnostic data associated with the composite (block 1904), and the example CID pointer manager 122 moves the pointer to the first element of the composite (block 1906). The example CID file generator 124 encodes element data for the selected composite element to the CID shell file (block 1908), and the example CID pointer manager 122 determines whether there are any remaining elements in the composite to be sent (block 1910). If so, control returns to block 1906 in which the example CID pointer manager 122 advances the pointer to the next element in the binary composite, otherwise the example program 1814 exits.

Figure 20:
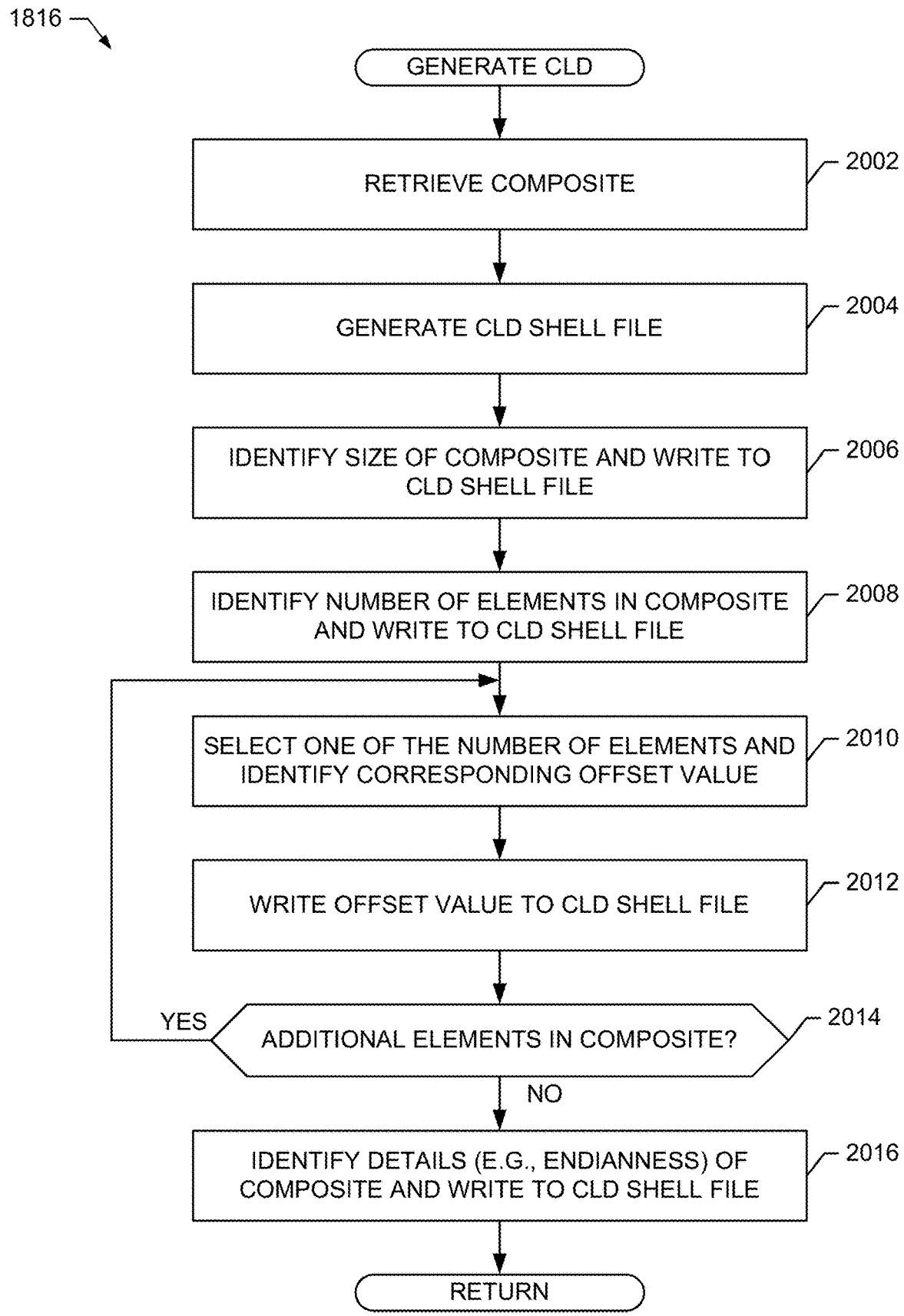

FIG. 20 illustrates additional detail for generating the CLD of block 1814. In the illustrated example of FIG. 20, the example CLD pointer manager 128 retrieves the binary composite to be sent (block 2002) and the example CLD file generator 130 generates a CLD shell file to be written to with architecture specific data associated with the composite binary to be sent (block 2004). The example payload analyzer 132 identifies a size of the composite to be sent and writes this information to the example CLD shell file (block 2006), identifies a number of elements in the composite, and writes this data to the CLD shell file (block 2008). The example payload analyzer 132 selects one of the number of elements in the binary composite to determine a corresponding offset value (block 2010) and writes the corresponding offset value to the CLD shell file (block 2012). If the example CLD pointer manager 128 determines that additional elements remain in the binary composite to be analyzed (block 2014), then control returns to block 2010. If all elements have been evaluated to determine their respective offset values (block 2014), then the example payload analyzer 132 identifies additional information associated with the binary composite to be sent (e.g., endianness information, floating point information, complement information, etc.), and writes this value to the CLD shell file (block 2016). The example program 1816 then exits.

Figure 21:
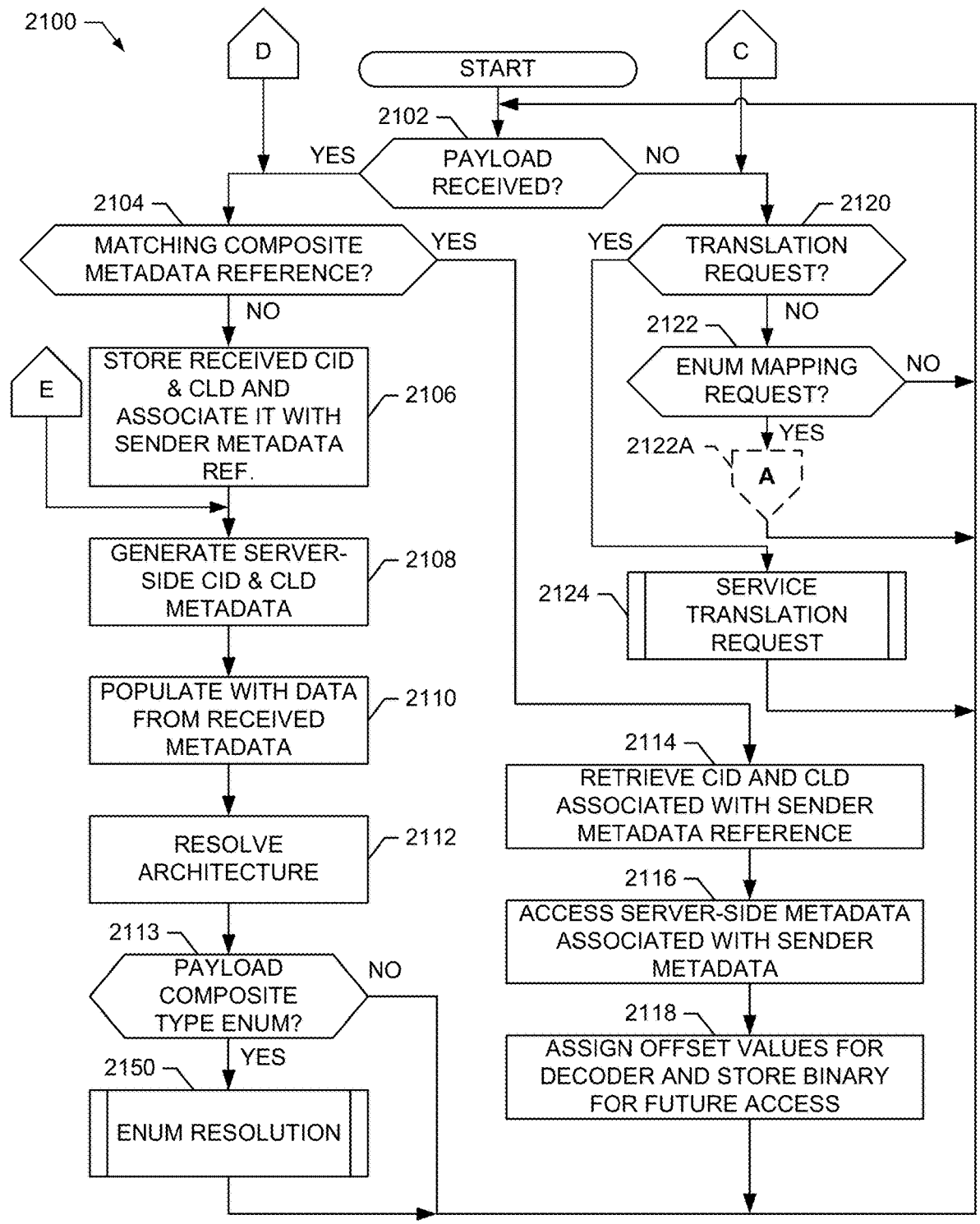

While the example programs of FIGS. 18-20 illustrate preparation of payload information (e.g., composites within the binary to be sent) by the example sending client device 102, FIG. 21 illustrates a program 2100 for handling of payload information by the example receiving server device 104. In the illustrated example of FIG. 21, the example server payload monitor 404 determines whether payload information (e.g., a binary composite from a network peer) has been received (block 2102). If so, then the example server metadata manager 406 determines whether the received payload information (e.g., a binary composite) includes a matching composite metadata reference (block 2104). If not, then this instance of receiving the payload information may be occurring for a first time, and the example server storage interface 408 extracts and stores the respective CID, CLD and associated metadata reference nomenclature to the example server data store 116 (block 2106).

So that the example receiving server device 104 can process the received payload, which includes a composite binary that may have an architecture format different than that of the example receiving server device 104, the example server metadata manager 406 generates its own server-side CID file and server-side CLD file (block 2108). Generally speaking, the server-side CID file and server-side CLD file stores corresponding metadata information associated with the sending peer (e.g., the sending client device 102) in a manner that permits resolution and mapping for architecture specific requirements of the receiving server device 104. As described above, the example server metadata manager 406 populates the server-side CID and the server-side CLD with the corresponding metadata translated and/or otherwise compared by the translation engine 180 in view of the received CID and CLD from the peer (block 2110). Based on the architecture of the receiving server device 104, the example translation engine 180 resolves architecture discrepancies by assigning each element with an offset value in the server-side CLD (block 2112). Additionally, if the example enumeration engine 170 determines that the composite is of type ENUM (block 2113), then the enumeration engine 170 resolves enumeration nomenclature discrepancies that may exist between the example sending client device 102 and the example receiving server device 104 (block 2150), as described in further detail below. Control then returns to block 2102.

Returning to block 2104, in the event that the example server metadata manager 406 includes a matching composite metadata reference, then the example server storage interface 408 retrieves the previously stored server-side CID and server-side CLD associated with the received metadata reference (block 2114). The example translator system 424 accesses the previously stored server-side metadata (e.g., the server-side CID 500 and the server-side CLD 550) as shown in FIG. 5 (block 2116). In some examples, the example translator system 424 invokes an appropriate format encoder 426 and uses the offset values from the server-side CLD 550 to store the received binary to the example server data store 116 in a format compatible with the receiving server side device 104 (block 2118). This may afford a degree of computational efficiency when repeated requests for a particular format are received by reducing future translation effort(s). On the other hand, some examples may not employ the decoder manager 410 and, instead, store the binary received from the sending client device 102 in an unaltered format for future translations, as needed. As described above, because the received composite binary is now stored in a native binary format associated with the receiving server side device 104, any future requests by one or more peers (e.g., third party clients) for translated data may be rendered via the offset mapping information of the server-side CLD 550. Control then returns to block 2102.

While the example receiving server-side device 104 has been described above with reference to a network peer (e.g., the example sending client device 102) that provides one or more composite binaries for collection, the receiving server-side device 104 also services requests from other peers (e.g., networked peers, same-platform peers, etc.) that demand a translated version of the composite binary (a translation request). As described above, translation requests originate from peer devices that may have varying preferences on the format of the composite data to be retrieved, such as plain text, XML, JSON, etc. As such, the example translation engine 180 includes any number of different format encoders 426 in the example translation engine 180 to accommodate for particular encoding type formats. Returning to block 2102, in the event a payload (e.g., a composite binary) has not been received, the example request manager 420 determines whether a translation request has occurred (block 2120). If not, then the example service payload monitor 404 determines whether an ENUM mapping request has been received (block 2122) and, if so, the example ENUM engine 170 services the ENUM mapping request (block 2420), as described in further detail below. However, in response to detecting a translation request (block 2120), then the example translation engine 180 services the request (block 2124), such as a request from one of the example translation request entities 182.

Figure 22:
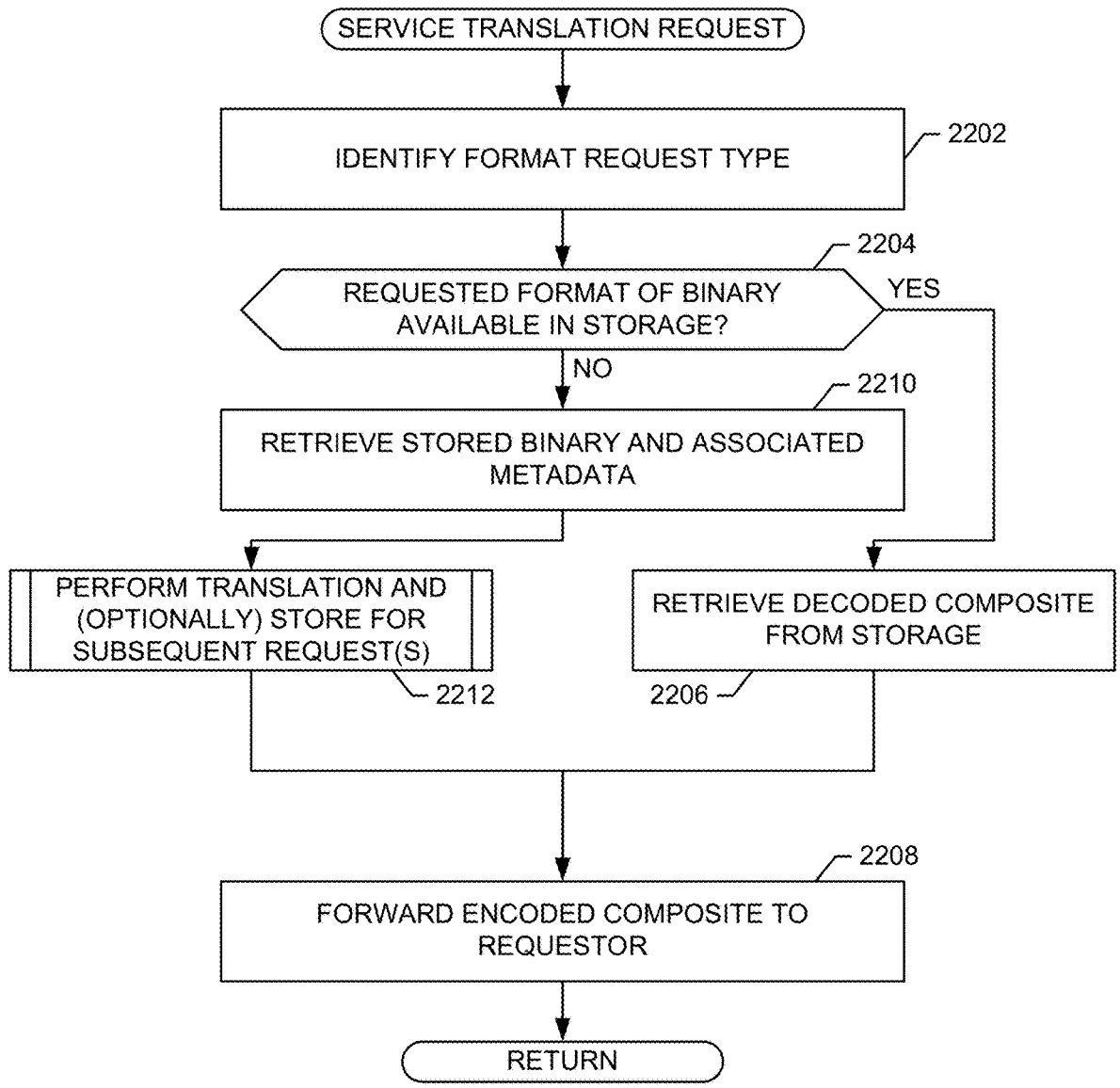

FIG. 22 includes additional detail regarding servicing the example translation request (block 2124). In the illustrated example of FIG. 22, the format resolver 422 identifies a format request type (e.g., from one of the translation request entities 182) (block 2202), and determines whether the requested format type has already been previously translated and stored in the example server data store 116 (block 2204). For example, while an example first one of the translation request entities 182 may request that a composite be formatted into XML, such translated composite information may also be optionally stored in the example server data store 116 in the event an example second one of the translation request entities 182 also requests that composite in an XML format, thereby preventing duplicative translation efforts on the example receiving server device 104. The example translation engine 180 retrieves the decoded composite from storage (e.g., the example server data store 116) (block 2206), and forwards the decoded composite to the requestor (e.g., via the example receiving server I/O interface 114) (block 2208).

Returning to block 2204, in the event the example format resolver 422 determines that the requested format is not already available in the example server data store 116, which may occur when the binary composite is translated for the first time in response to a request, then the example translator system 424 retrieves the stored binary and associated metadata (e.g., the example server-side CID 500 and server-side CLD 550 of FIG. 5) (block 2210). As described above, the binary composite may be optionally stored in the server data store 116 having a format compatible with the architecture of the receiving server device 104 so that the example translation engine 180 may reference the corresponding server-side CID 500 and server-side CLD 550 when performing translation (encoding) to the requested format type (block 2212).

Figure 23:
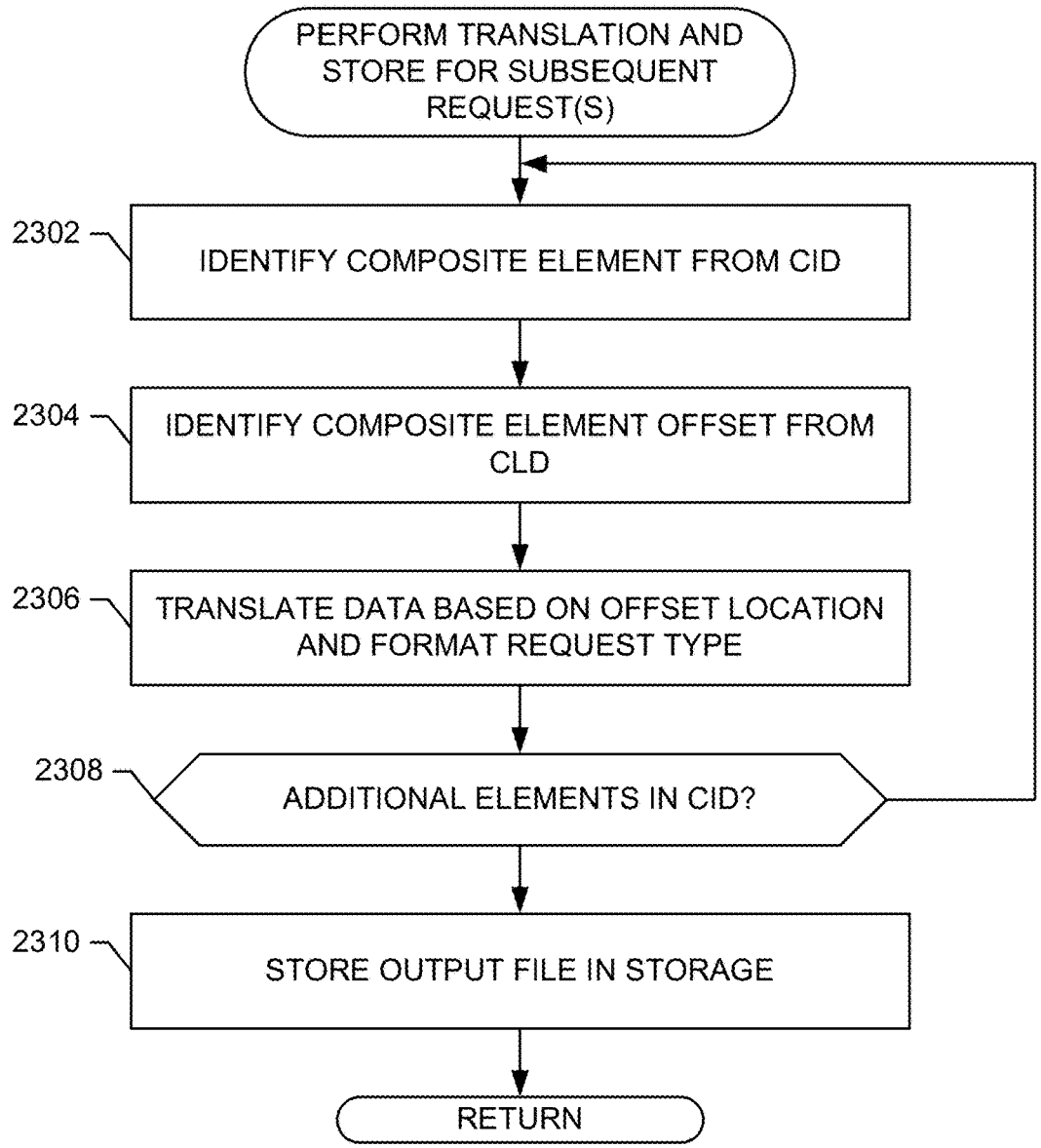

FIG. 23 illustrates additional detail for performing translation of the binary composite (block 2212). In the illustrated example of FIG. 23, the example translator system 424 identifies one of the composite elements from the server-side CID 500 (block 2302), and identifies the corresponding element from the server-side CLD 550 to determine an offset value of the data related to the element of interest (block 2304). The example translator system 424 forwards such information to a corresponding format encoder 426 to translate the data based on the offset location and format request type (block 2306), which produces data associated with the element of interest having the requested format type. The example format resolver 422 determines whether the server-side CID 500 includes additional elements of interest in the binary composite to be translated (block 2308) and, if so, control returns to block 2302. However, when all elements of the requested binary composite have been translated into the requested format, the example translation engine 180 stores the translated data in the example server data store 116 so that future requests for this binary composite may be provided to one or more requesting peers (e.g., one or more of the example translation request entities 182) without duplicative translation effort (block 2310).

Figure 24:
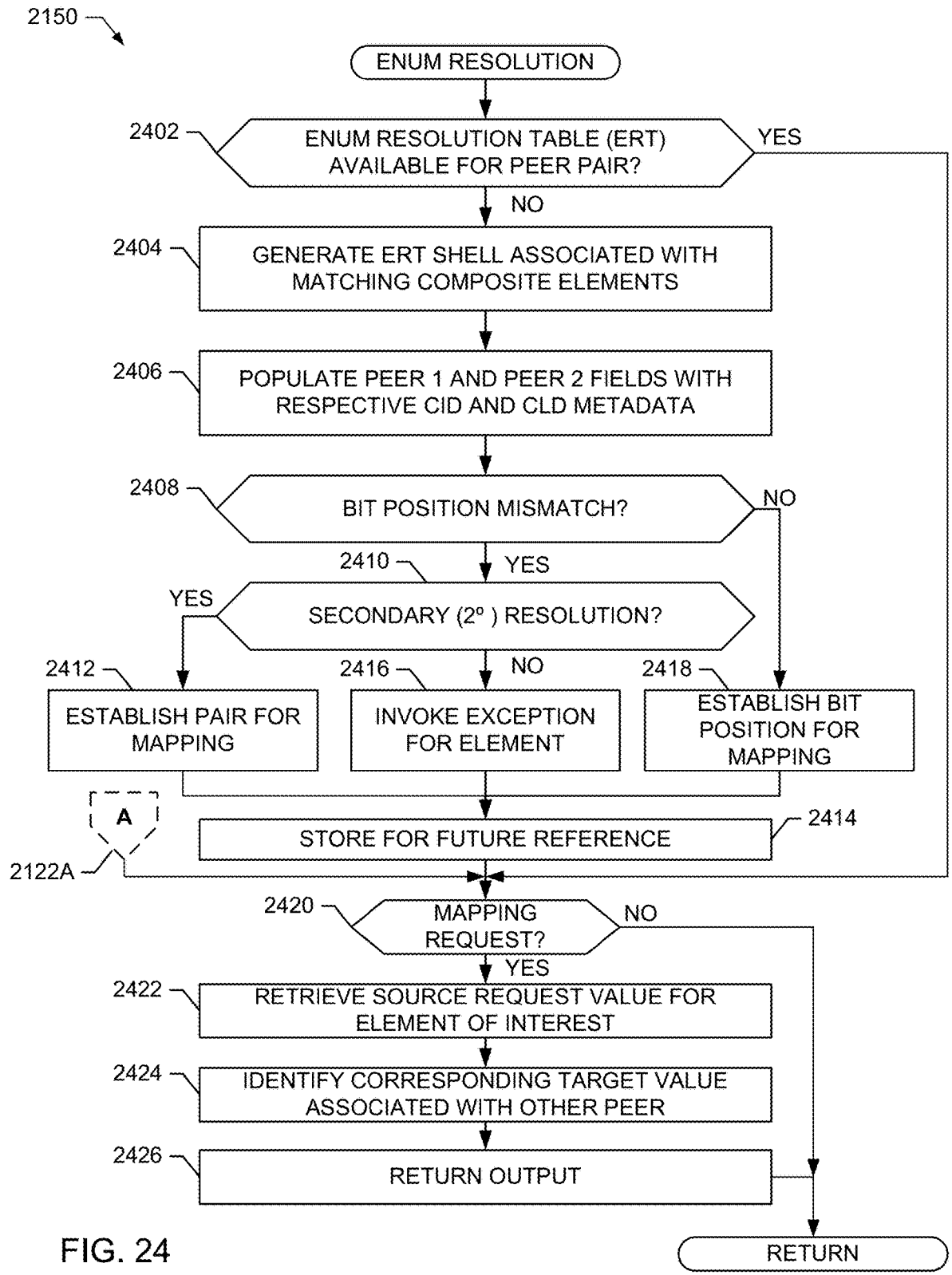

Returning to FIG. 21, in some examples when a payload composite is of type ENUM (block 2113) or when an ENUM mapping request occurs (block 2122A), the example enumeration engine 170 is invoked to resolve ENUM discrepancies (block 2150) or service mapping requests (block 2122A). FIG. 24 illustrates additional detail associated with enumeration resolution of block 2150. In the illustrated example of FIG. 24, the example resolution table manager 414 determines whether an enumeration resolution table (ERT) is already available for peer comparison (block 2402). If not, then the example resolution table manager 414 generates an ERT shell file (block 2104) and populates fields of a first peer and a second peer column of the ERT shell file with CID and CLD data associated with the respective peers (block 2106), as shown in the illustrated example of FIG. 7.

In the event the exception generator 416 of the enumeration engine 170 identifies a mismatch (e.g., an element position mismatch, an element name mismatch, an element value mismatch, etc.) between the peers (e.g., a mismatch between the ENUM element order of the example first peer 702 as compared with the ENUM element order of the example second peer 704) (block 2408), then the example exception generator 416 determines whether secondary (or other) resolution is available (block 2410). As described above, secondary resolution may be based on one or more element parameters (e.g., element names) that are common to both the example first peer 702 and the example second peer 704. If available, then the example resolution table manager 414 establishes corresponding parameters for mapping (block 2412). For example, and as shown in the illustrated example of FIG. 7, if the example first peer 702 references element "3," then despite an element position mismatch with index "3" of the example second peer 704, the corresponding matching parameter "yellow" is matched to index position "2" of the second peer 704. As such, the ENUM reference of element "3" from the first peer 702 yields a corresponding value of "700" for the second peer 704, as described in further detail below. Such mappings are stored in the example server data storage 116 for future reference (block 2414). On the other hand, in the event secondary resolution is not possible (block 2410), such as when the example first peer 702 does not have a corresponding matching element name with the example second peer 704, the example exception generator 416 invokes an exception for that particular element (block 2416).

In the event the example exception generator 416 determines that there is no mismatch (e.g., element position mismatch) between the ENUM composites of the example first peer 702 and the example second peer 704 (block 2408), then the example resolution table manager 414 establishes corresponding parameters for mapping (block 2418), and stores those mappings in the example server data storage 116 for future reference (block 2414).

While the illustrated example program 1150 of FIG. 24 generates an ERT to resolve discrepancies that may reside between ENUM composites of a first peer and a second peer, the example program 2150 also handles ENUM mapping requests when the ERT has been previously generated. For example, returning briefly to the illustrated example of FIG. 21, when the example server payload monitor 404 determines an ENUM mapping request has occurred (block 2122A), then control advances to block 2420 where the example ENUM engine 170 confirms that an ENUM mapping request is to occur. The example resolution table manager 414 retrieves a source request value for an element of interest (block 2422), such as a request to map element position "1" of the ENUM composite associated with the example first peer 702 (e.g., the example sending client device 102). The example resolution table manager 414 identifies a corresponding target value from the ERT 700 that is associated with the corresponding other ENUM composite associated with the second peer 704 (e.g., the example receiving server device 104) (block 2424). The example decoder 118 returns the target value to the requestor (block 2426), which in the illustrated example of FIG. 7 is the value "50."

Figure 25:
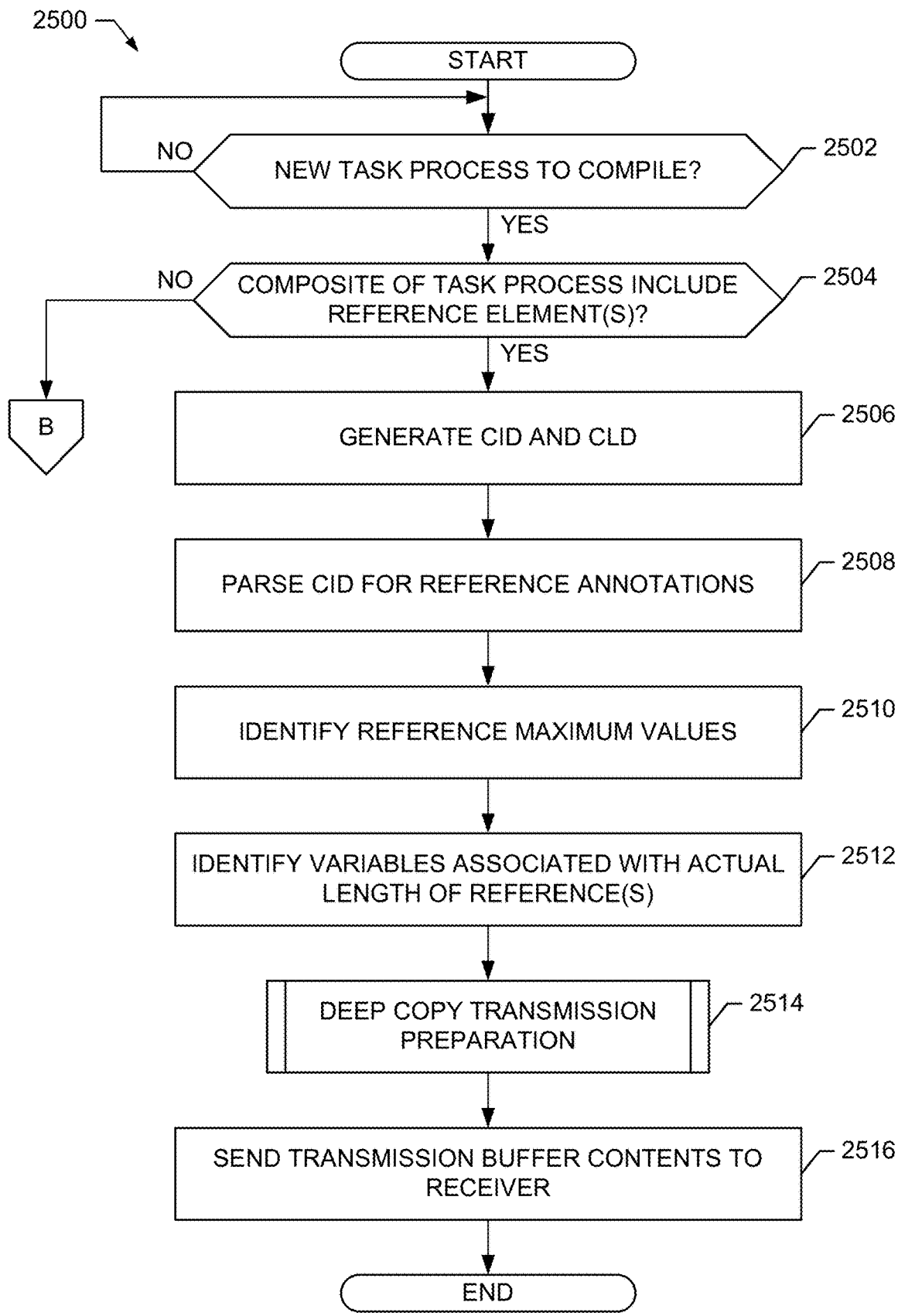

FIG. 25 illustrates a program 2500 for handling the exchange of reference data between peers. In the illustrated example of FIG. 25, the example metadata engine 136 determines if a task process is to be compiled (block 2502). If not, the program 2500 waits for such an occurrence. When a task process is to be compiled (block 2502), the example metadata engine 136 determines if that task includes reference elements (block 2504). If not, then control advances to block 1802 of FIG. 18 to determine if an alternate data type is to be handled. Otherwise, the example CID engine 120 and CLD engine 126 generate corresponding CIDs and CLDs corresponding to the new composite to be compiled that includes reference data (block 2506), as described above in connection with FIGS. 19 and 20.

The example annotation engine 190 parses the CID for reference annotations that are associated with the detected reference data type(s) (block 2508), which may have been provided by one or more developers of the composite in an effort to reveal array length information associated with the reference(s). The example reference value analyzer 192 identifies reference maximum values (block 2510), and identifies variables that are associated with actual length values of the reference(s) (block 2512). As described above, examples disclosed herein consider actual length information in an effort to reduce an amount of payload information that needs to be processed and/or transmitted between peers, thereby improving bandwidth efficiency. The example deep copy engine 230 performs a deep copy operation of only those reference elements (and references contained inside referenced components of composites) that need to be provided in the transmitted payload (block 2514) and, when the payload has been prepared with associated metadata, the example client payload engine 150 sends contents of a transmission buffer (e.g., payload storage 108) to the receiving peer (e.g., receiving server device 104) (block 2516).

Figure 26:
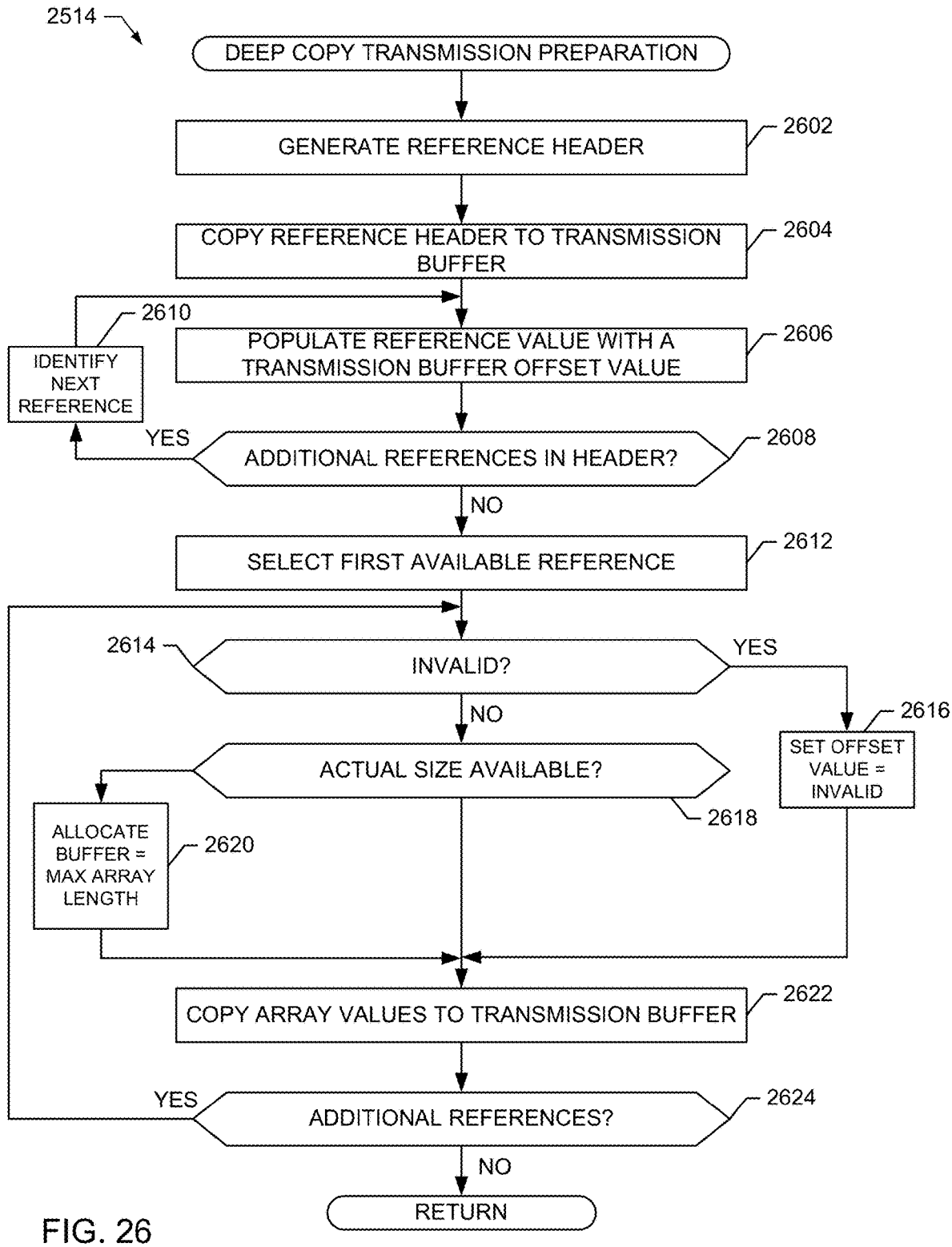

FIG. 26 illustrates additional detail for the deep copy operation of FIG. 25. In the illustrated example of FIG. 26, the example reference header manager 232 generates a reference header (block 2602), such as the example reference header 1002A of FIG. 10. The example reference header manager 232 copies the populated reference header to the transmission buffer (e.g. payload storage 108) (block 2604), and the example reference transmission buffer manager 234 populates reference values with appropriate offset values (block 2606), such as the offsets shown in the example reference header 1002B of FIG. 10. In the event the example reference header manager 232 determines that there are additional references in the example reference header (block 2608), the next reference is identified and/or otherwise selected from the metadata (block 2610), and control returns to block 2606.

The example reference transmission buffer manager 234 selects a first available reference to be transmitted (block 2612) and the example reference validity analyzer 236 verifies whether it contains an invalid reference (e.g., a reference to NULL for some languages), thereby capturing potential errors (block 2614). If so, then the example reference validity analyzer 236 sets an offset value with an indicator of invalidity (block 2616). However, if no validity errors are detected (block 2614), then the example reference size analyzer 238 determines whether the selected reference of interest also includes an indication of an actual size (versus a default to the maximum size) (block 2618). If there is no indication of an actual size (block 2618), then the example reference size analyzer 238 allocates transmission buffer size equal to a maximum length of the reference (e.g., array) of interest (block 2620). However, when an indication of an actual size for the reference is available (block 2618), then the example reference transmission buffer manager 234 allocates transmission buffer size equal to the actual size of the reference and copies only those values to the transmission buffer (block 2622). While examples above referred to one of the example references of an example composite, the example reference transmission buffer manager 234 determines whether additional references are to be analyzed (block 2624) and, if so, control returns to block 2614. When all references have been analyzed (block 2624), then the transmission buffer building is complete and ready to be sent to the receiving peer.

Figure 27:
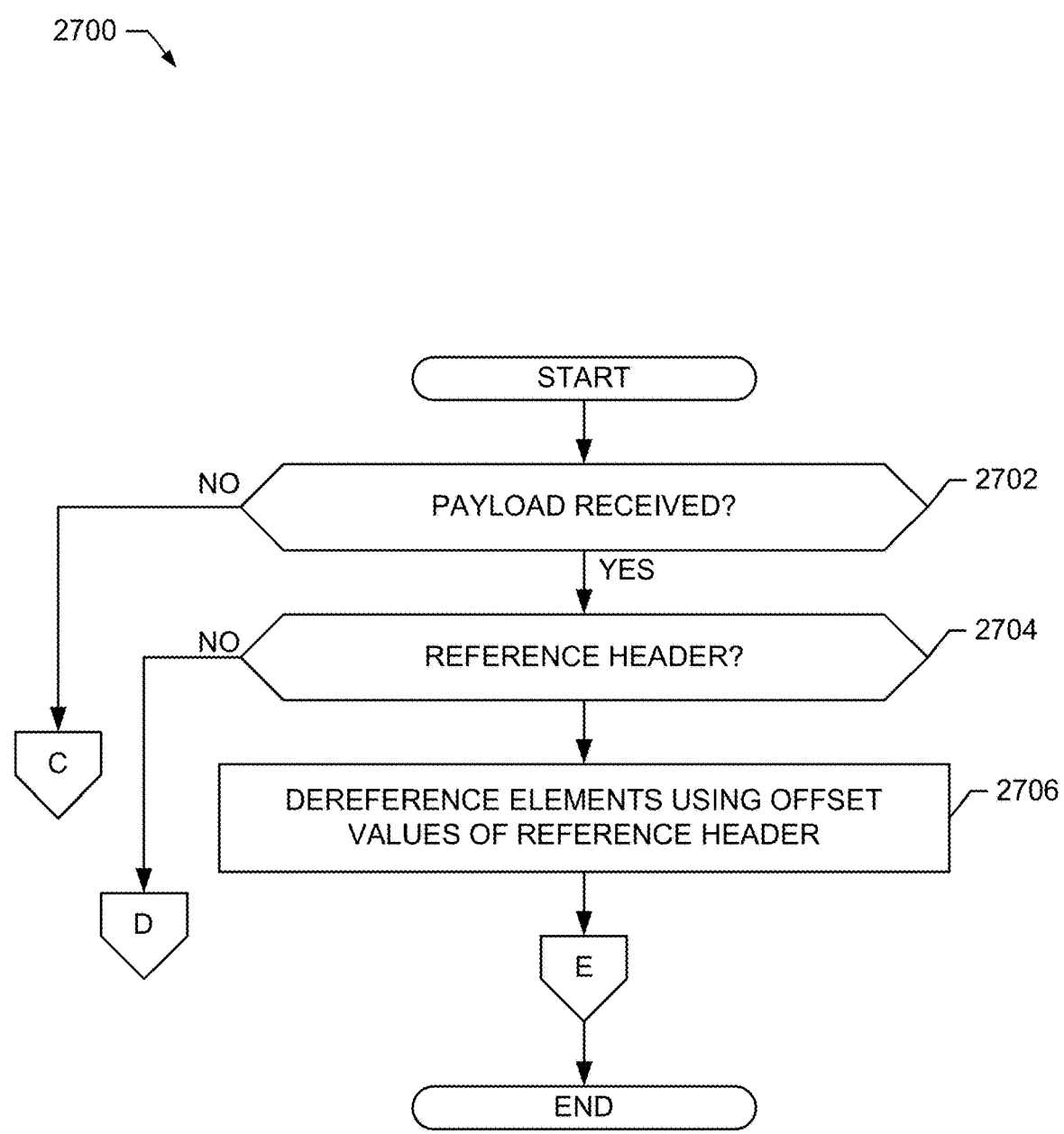

FIG. 27 illustrates an example program 2700 for a receiving peer (e.g., the receiving server device 104) that executes in response to receiving a payload from a sending peer (e.g., the sending client device 102) when reference data is part of the payload. In the illustrated example of FIG. 27, the example server payload monitor 404 determines whether a payload has been received (block 2702). If not, then control advances to block 2120 of FIG. 21, otherwise the example deep copy engine 430 determines whether a reference header is received (block 2704). If not, then control advances to block 2104 of FIG. 21 to manage the payload in view of some other data type. If so, then the example deep copy engine 430 de-references the reference elements using the received offset values of the reference header (block 2706), and control advances to block 2108 of FIG. 21 to process the retrieved payload information as needed (e.g., perform localized copy of payload information, perform translation efforts for requestors, etc.).

Figure 28:
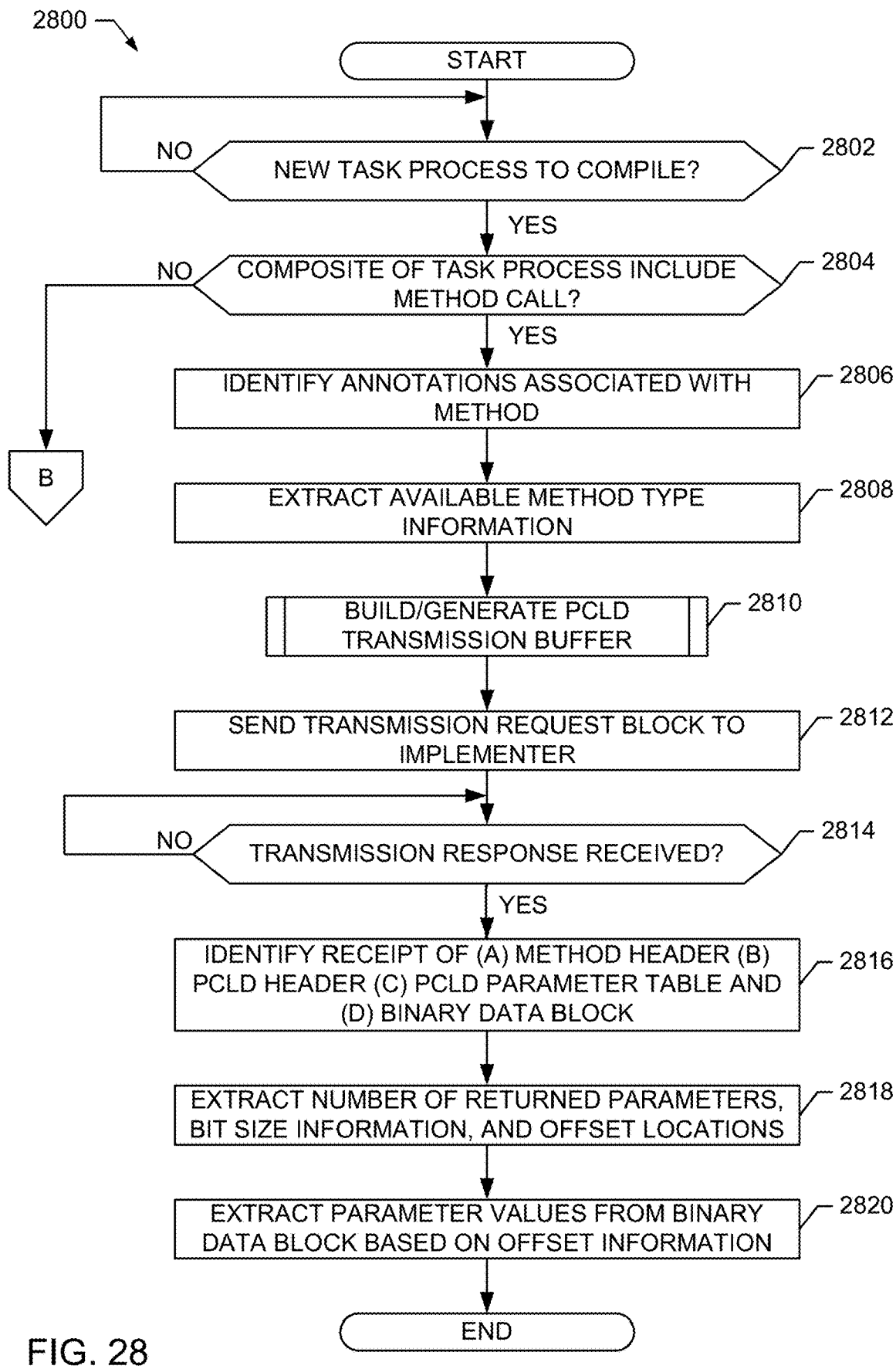

FIG. 28 illustrates a program 2800 for handling the exchange of method data between peers. In the illustrated example of FIG. 28, the example metadata engine 136 determines if a task process is to be compiled (block 2802). If not, the program 2800 waits for such an occurrence. When a task process is to be compiled (block 2802), the example metadata engine 136 determines if that task includes method elements, such as a function call (block 2804). If not, then control advances to block 1802 of FIG. 18 to determine if an alternate data type is to be handled. Otherwise, the example annotation engine 190 identifies annotations associated with the method (block 2806). The example method analyzer 196 extracts available method type information (block 2808) from those annotations, such as information related to whether particular parameters are of an input or output type. The example method engine 240 builds and/or otherwise generates a PCLD buffer (block 2810), which will be transmitted to a receiving peer (e.g., the receiving server device 104, which acts as the implementer of the invoked method) (block 2812) as described above and discussed in further detail below.

The example transmission block manager 250 determines if a transmission response block is received (block 2814), which will confirm completion of method execution by the receiving peer and contain method return information. When the example transmission response block is received (block 2814), the example method engine 240 identifies receipt of a method header, a PCLD header, a PCLD parameter table and a corresponding binary data block (block 2816). The example parameter analyzer 244 extracts a number of returned parameters, bit information and offset locations (block 2818) so that the parameter values in the binary data block can be extracted (block 2820).

Figure 29:
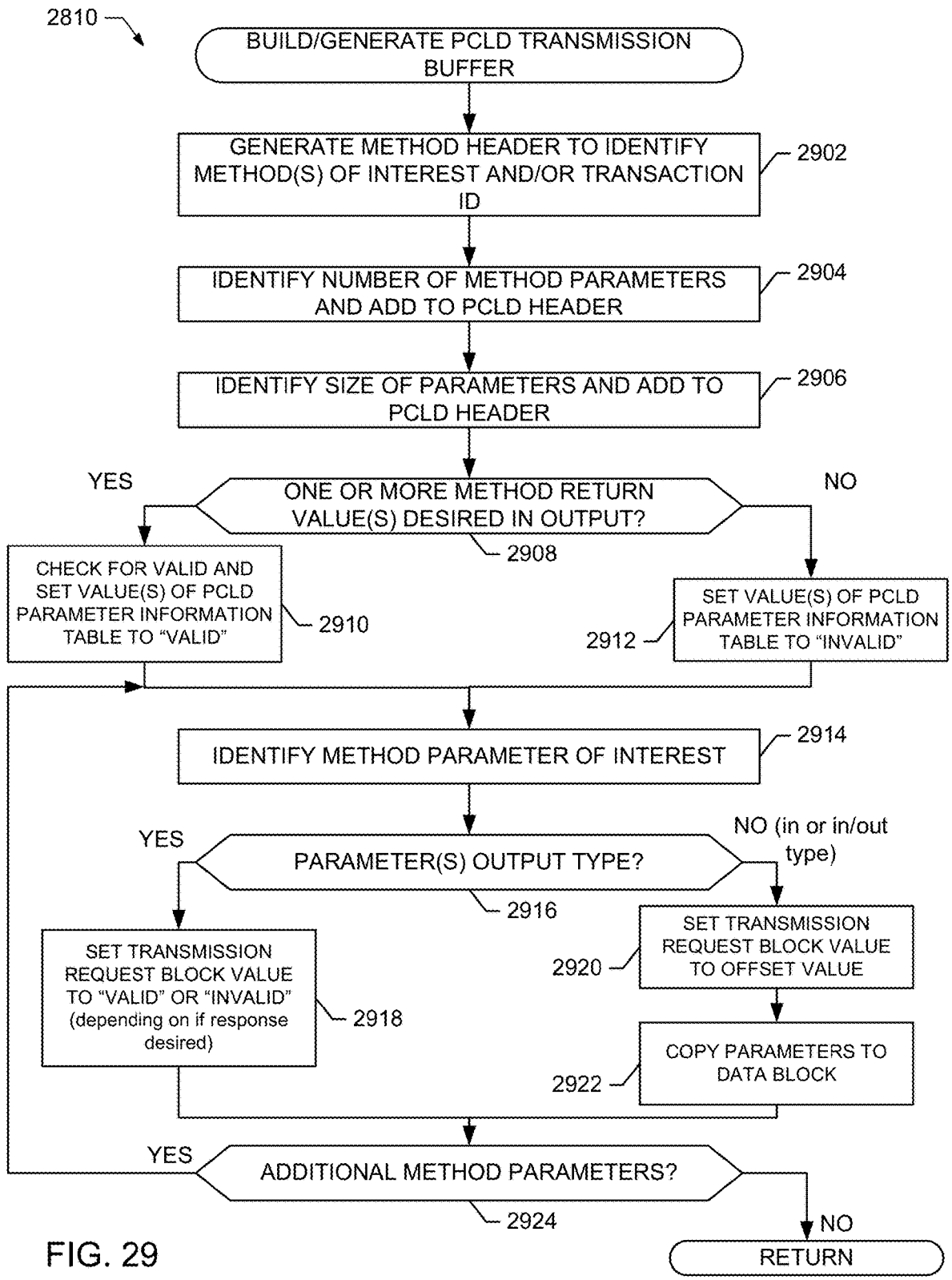

FIG. 29 illustrates additional detail for building and/or otherwise generating the PCLD transmission buffer of FIG. 28. In the illustrated example of FIG. 29, the example header manager 242 generates a method header to identify one or more method(s) of interest, for which corresponding parameter data is to be sent to the receiving peer (block 2902). The example header manager 242 identifies a number of method parameters of the method of interest, and adds this value to the PCLD header (block 2904). Additionally, the example header manager 242 identifies a size of the parameters (e.g., table element size) and adds this information to the example PCLD header (block 2906).

The example parameter analyzer 244 determines whether one or more method return value(s) is/are desired when the implementer completes execution of the method (block 2908). If so, then the example PCLD generator 248 checks for the desired designation (e.g., "VALID") and sets corresponding values (e.g., a first value if only one return parameter is to occur) of the PCLD parameter information table to that desired type (e.g., a "VALID" indicator/indicia) (block 2910), and if not it sets the corresponding values to an "INVALID" indicator (block 2912). While some methods only return a single parameter, examples disclosed herein are not limited thereto. Additionally, some parameters may be both input and output parameters. The example parameter analyzer 244 identifies whether a method parameter of interest (in a list of any number of parameters) (block 2914), and determines whether that parameter of interest is desired as output data from the method (is the parameter an output type, input type or in/out type) (block 2916). If the parameter of interest is an output type, then the example transmission block manager 250 sets an entry for that parameter with a "VALID" indicator/indicia if a response is desired, and an "INVALID" indicator/indicia if a response is neither needed nor desired (block 2918), and if not the entry for that parameter includes an offset value, such as an offset value to identify input data for the method to be executed (block 2920). The input parameters are copied to the example data block, which may include the deep copy techniques described above if that parameter has an associated reference type (block 2922). In the event there are additional method parameters to evaluate, as determined by the example PCLD generator 248 (block 2924), then control returns to block 2914.

Figure 30:
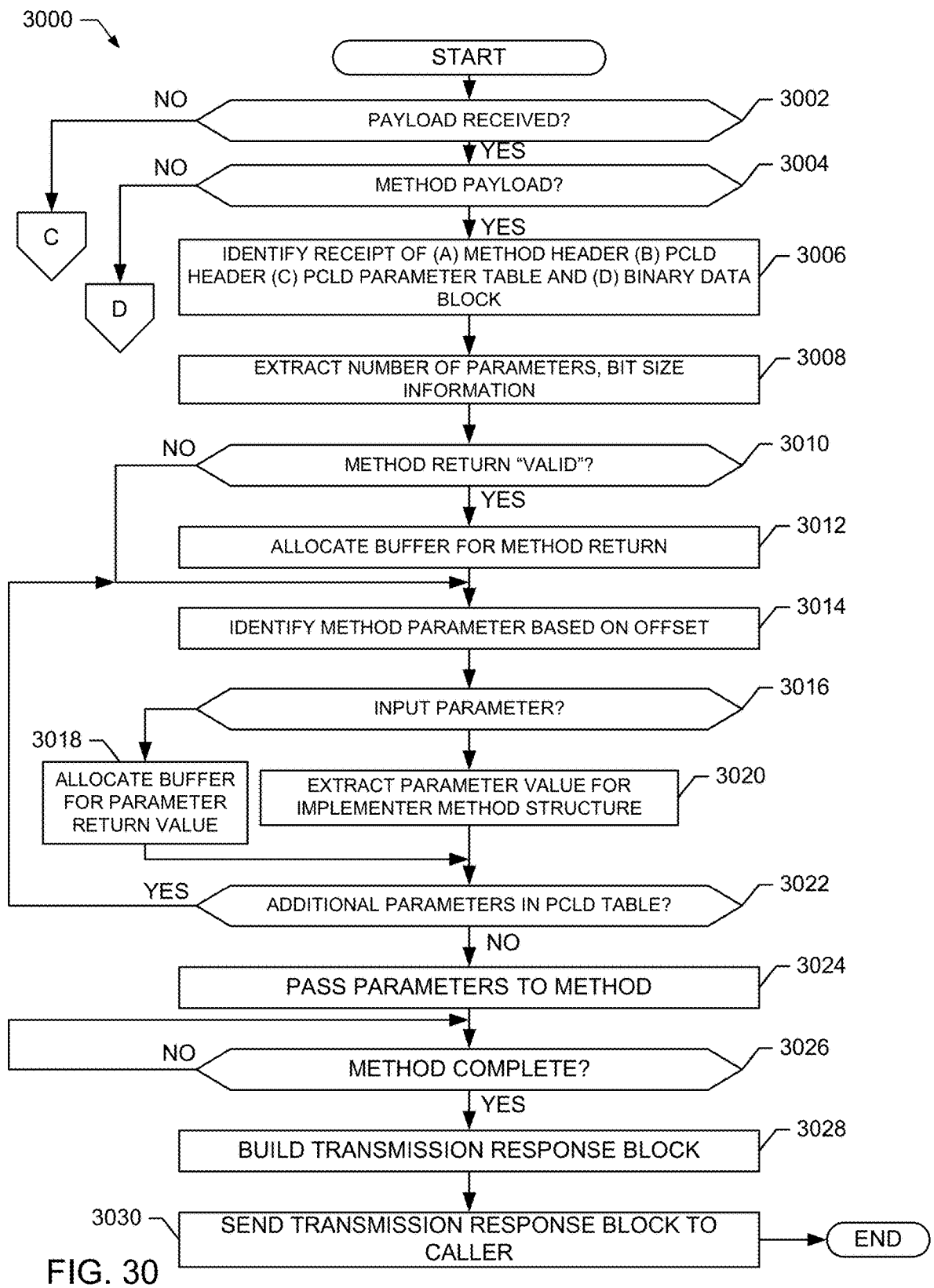

FIG. 30 illustrates a program 3000 for a receiving peer (e.g., the receiving server device 104) that executes in response to receiving a payload from a sending peer (e.g., the sending client device 102) when method data is part of the payload. In the illustrated example of FIG. 30, the example server payload monitor 404 determines whether a payload has been received (block 3002). If not, then control advances to block 2120 of FIG. 21, otherwise the example method engine 440 determines whether the payload includes method data (block 3004). If not, then control advances to block 2104 of FIG. 21 to manage the payload in view of some other data type. If so, then the example method engine 440 identifies receipt of a method header, a PCLD header, a PCLD parameter table, and a corresponding binary data block (block 3006).

The example parameter analyzer 442 extracts a number of parameters and bit size information (block 3008), and determines whether the method is to return one or more values (e.g., success, failure, etc.) upon completion (block 3010). As described above, some methods are of type "void" and do not provide return values, or in other circumstances the method return value is not needed. In the event the PCLD header identifies a lack of a "VALID" indicator, then buffer/memory space is not allocated, otherwise the example buffer allocator 446 allocates buffer/memory space as a placeholder for the method return value, which will be provided back to the sending peer (block 3012). The example parameter analyzer 442 identifies a method parameter (e.g., a first in a list of parameters to analyze) based on received offset information (block 3014) and determines whether it is an input parameter or an output parameter (block 3016). In the event it is a valid output parameter (e.g., marked as "VALID" in a request block), which is indicative of a desire to have some output data returned by the function upon completion, then the example buffer allocator 446 allocates buffer/memory space for the parameter return value (or multiple return values) (block 3018). Otherwise, the example method engine 440 extracts the input parameter value(s) to be used during execution of the method (block 3020).

The example parameter analyzer 442 determines whether there are additional method parameters in the PCLD table to be analyzed (block 3022), and if so control returns to block 3014. Otherwise, the example method engine 440 passes extracted parameter values to the method to be executed (block 3024) and determines whether the method has completed its execution (block 3026). When the method has completed its execution, the example transmission block manager 450 builds a transmission response block in a manner consistent as described above (block 3028), and sends the transmission response block back to the requestor/caller (block 3030).

Figure 31:
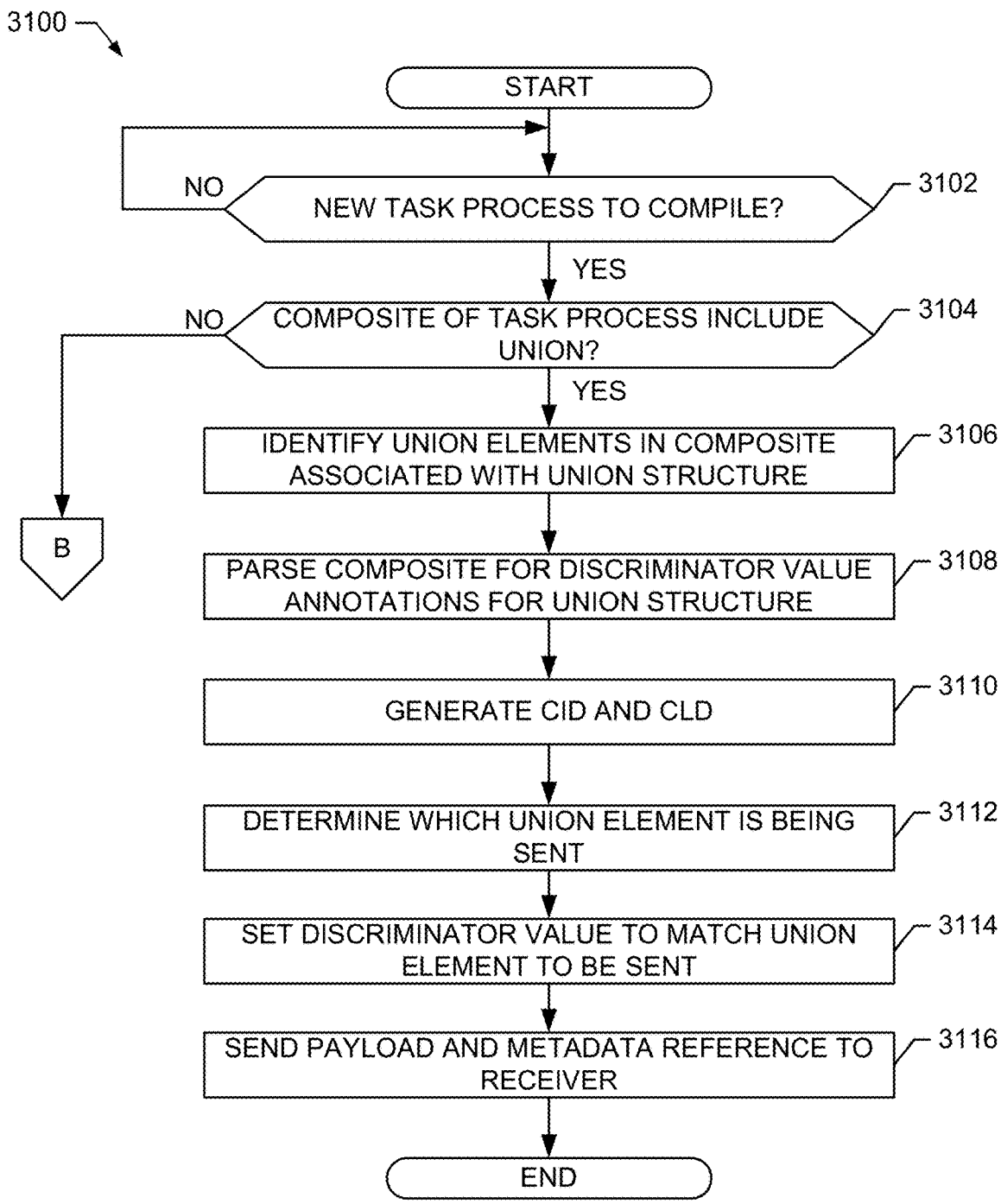

FIG. 31 illustrates a program 3100 for handling the exchange of union data between peers. In the illustrated example of FIG. 31, the example metadata engine 136 determines if a task process is to be compiled (block 3102). If not, the program 3100 waits for such an occurrence. When a task process is to be compiled (block 3102), the example metadata engine 136 determines if that task includes union data (block 3104). If not, then control advances to block 1802 of FIG. 18 to determine if an alternate data type is to be handled. Otherwise, the example union analyzer 194 identifies union elements in the composite associated with one or more union structures (block 3106). The example union analyzer 194 parses the composite for discriminator value annotations associated with the one or more union structure(s) (block 3108). The example CID engine 120 and CLD engine 126 generate a CID and CLD in a manner consistent with descriptions above (block 3110).

The example union discriminator analyzer 262 determines which union element is active and to be sent to a receiving peer (block 3112). The example union transmission buffer manager 266 sets the discriminator value to match the union element to be set (block 3114). As discussed above, assume for the sake of this example that the "bus" union element is active, which has a corresponding discriminator value of fifty (50). The example client payload engine 150 sends the payload and corresponding metadata reference to the receiving peer, in which the payload data is in a binary format (block 3116).

Figure 32:
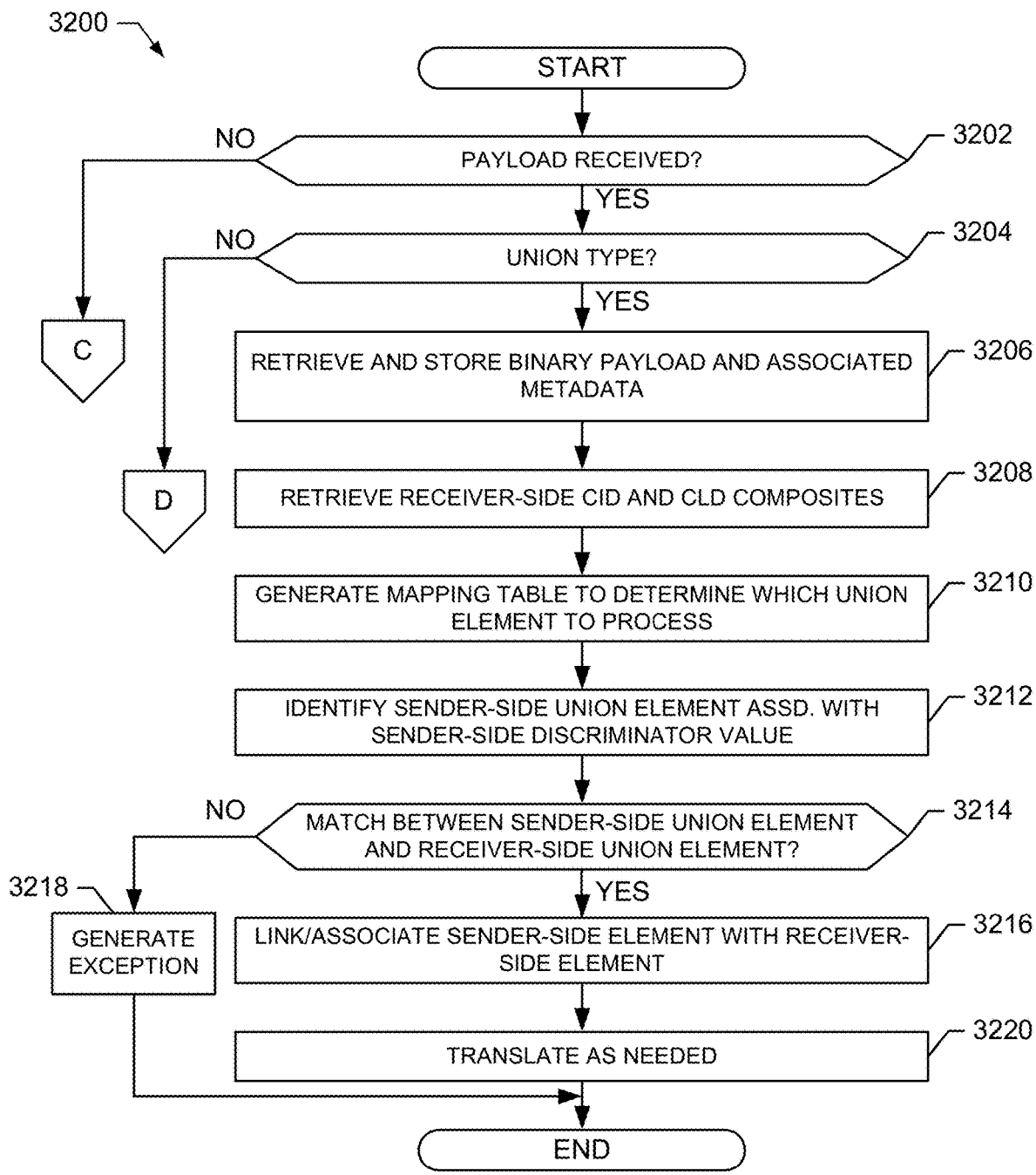

FIG. 32 illustrates a program 3200 for a receiving peer (e.g., the receiving server device 104) that executes in response to receiving a payload from a sending peer (e.g., the sending client device 102) when union data is part of the payload. In the illustrated example of FIG. 32, the example payload monitor 404 determines whether a payload has been received (block 3202). If not, then control advances to block 2120 of FIG. 21, otherwise the example union engine 460 determines whether the payload includes union data (block 3204). If not, then control advances to block 2104 of FIG. 21 to manage the payload in view of some other data type. If so, then the example receiving server I/O interface 114 retrieves and stores the binary payload and associated metadata (block 3206), and retrieves a receiver-side CID and CLD associated with the composite (block 3208), if available. As described above, in some examples the receiving peer may already have metadata associated with the composite of interest, in which that metadata (e.g., CID/CLD) includes some differences in nomenclature and/or architecture specific detail. As shown in the illustrated example of FIG. 17, the example receiving peer included at least two union elements (e.g., "tram" and "plane") not found in the corresponding union structure of the sending peer, and the discriminator values for the union elements also differ therebetween.

To reconcile which union element the sending peer is referring to when sending a payload is received, the example union mapping manager 464 generates a mapping table (block 3210) and identifies which sending peer element is active based on the sending peer discriminator value (block 3212). As described above in the illustrated example of FIG. 17, if the sending peer discriminator value is fifty (50), then the example union mapping manager 464 identifies that the corresponding active union element is associated with "bus." The example union mapping manager 464 also determines whether a matching union element "bus" exists on the receiving peer (block 3214) and, if so, links and/or otherwise associates the sending-side union element with the corresponding receiving-side union element as active (block 3216). On the other hand, in the event there is a mismatch (or no match) (block 3214), then the example union engine 460 generates an exception (block 3218). After the receiving-side identifies which union element is active (block 3216), the example translation engine 180 may translate that binary payload data into any format needed (block 3220), such as an XML format needed by one or more example translation request entities 182.

Figure 33:
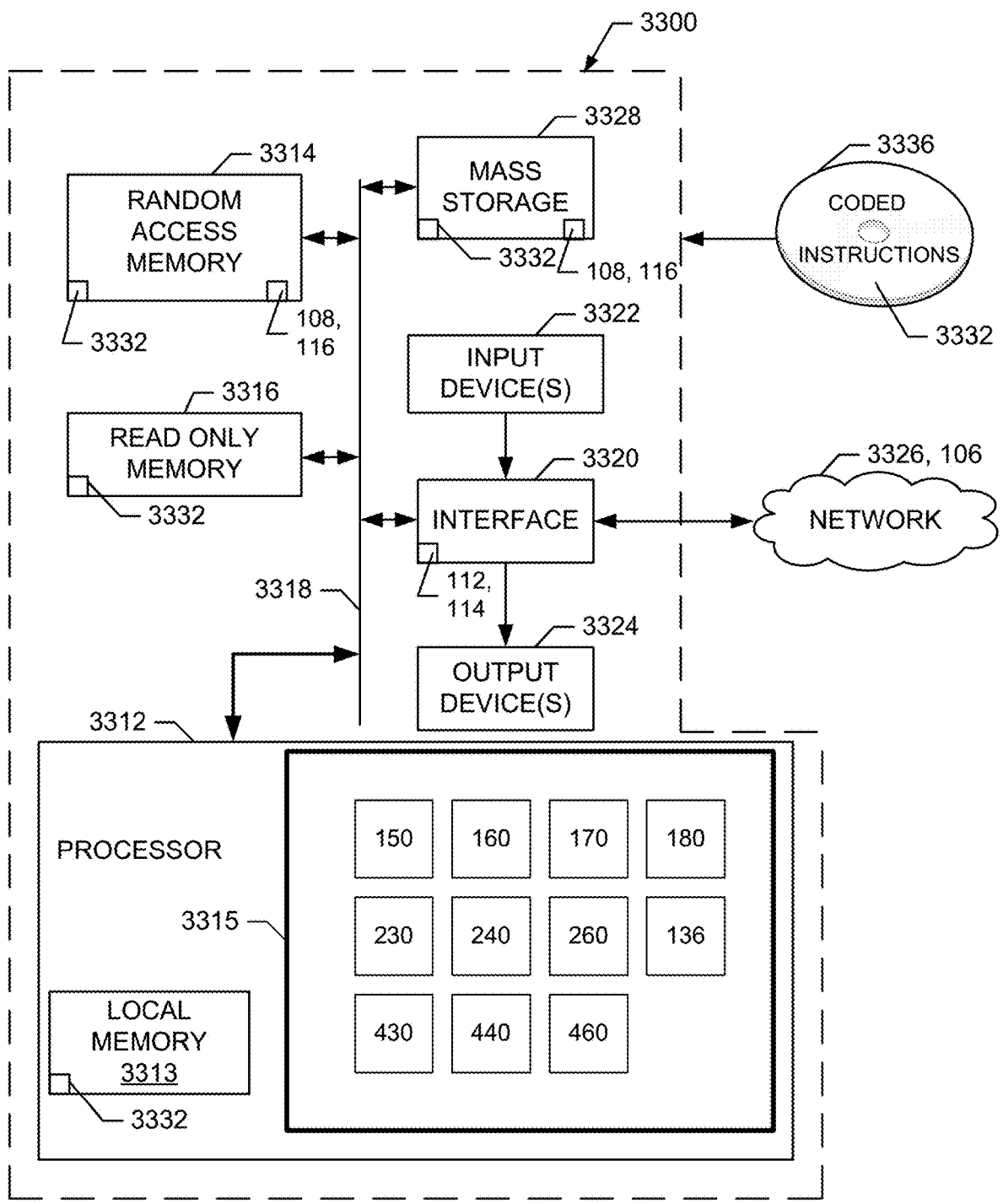
FIG. 33 is a block diagram of an example processor platform structured to execute the example machine readable instructions of FIGS. 18-32 to implement the example sending client device of FIG. 2, the example receiving server device of FIG. 4, and/or the example metadata engine of FIGS. TA and/or 1B.

FIG. 33 is a block diagram of an example processor platform 3300 capable of executing the instructions of FIGS. 18-32 to implement the metadata engine 136, the client payload engine 150, the server payload engine 160, the enumeration engine 170, the translation engine 180, the deep copy engine 230, the method engine 240 and the union engine 260 of FIGS. 1A, 1B, 2 and 4. The processor platform 3300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a digital camera, a virtual machine, or any other type of computing device.

The processor platform 3300 of the illustrated example includes a processor 3312. The processor 3312 of the illustrated example is hardware. For example, the processor 3312 can be implemented by one or more integrated circuits, logic circuits, microprocessors or controllers from any desired family or manufacturer. In the illustrated example of FIG. 33, the processor 3312 includes one or more example processing cores 3315 configured via example instructions 3332, which include the example instructions of FIGS. 18-32 to implement the example metadata engine 136, the example client payload engine 150, the example server payload engine 160, the example enumeration engine 170, the example translation engine 180, the example deep copy engine 230, the example method engine 240 and/or the example union engine 260, the example receiver-side deep copy engine 430, the example receiver-side method engine 440 and/or the example receiver-side union engine 460 of FIGS. 1A, 1B, 2 and/or 4.

The processor 3312 of the illustrated example includes a local memory 3313 (e.g., a cache). The processor 3312 of the illustrated example is in communication with a main memory including a volatile memory 3314 and a non-volatile memory 3316 via a bus 3318. The volatile memory 3314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3316 may be implemented by flash memory and/or any other desired type of memory device. Access to the main memory 3314, 3316 is controlled by a memory controller.

The processor platform 3300 of the illustrated example also includes an interface circuit 3320. The interface circuit 3320 may be implemented by any type of interface standard, such as an Ethernet interface, a universal serial bus (USB), and/or a PCI express interface.

In the illustrated example, one or more input devices 3322 are connected to the interface circuit 3320. The input device(s) 3322 permit(s) a user to enter data and commands into the processor 3312. The input device(s) can be implemented by, for example, an audio sensor, a microphone, a camera (still or video), a keyboard, a button, a mouse, a touchscreen, a track-pad, a trackball, isopoint, a voice recognition system and/or any other human-machine interface.

One or more output devices 3324 are also connected to the interface circuit 3320 of the illustrated example. The output devices 3324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 3320 of the illustrated example, thus, typically includes a graphics driver card, a graphics driver chip or a graphics driver processor.

The interface circuit 3320 of the illustrated example also includes a communication device such as a transmitter, a receiver, a transceiver, a modem and/or network interface card to facilitate exchange of data with external machines (e.g., computing devices of any kind) via a network 3326 (e.g., an Ethernet connection, a digital subscriber line (DSL) to facilitate exchange of data within a similar machine platform (e.g., a communication bus), a telephone line, coaxial cable, a cellular telephone system, etc.). In the illustrated example of FIG. 33, the interface circuit 3320 is also structured to implement one or more of the example sending client I/O interface 112 and/or the example receiving server I/O interface 114 of FIGS. 1A, 1B, 2 and/or 4.

The processor platform 3300 of the illustrated example also includes a communication device such as a transmitter, a receiver, a transceiver, a modem and/or network interface card to facilitate exchange of data with external machines (e.g., computing devices of any kind) via a network 3326 and/or the network 106 (e.g., an Ethernet connection, a digital subscriber line (DSL), a telephone line, coaxial cable, a cellular telephone system, etc.).

The processor platform 3300 of the illustrated example also includes one or more mass storage devices 3328 for storing software and/or data. Examples of such mass storage devices 3328 include floppy disk drives, hard drive disks, compact disk drives, Blu-ray disk drives, RAID systems, and digital versatile disk (DVD) drives. In some examples, the mass storage device 3330 may implement the example payload storage 108 and/or the example server data store 116.

The coded instructions 3332 of FIGS. 18-32 may be stored in the mass storage device 3328, in the volatile memory 3314, in the non-volatile memory 3316, in the local memory 3313 and/or on a removable tangible computer readable storage medium such as a CD or DVD 3336.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems and articles of manufacture to improve interprocess communication are disclosed herein. Further examples and combinations thereof include the following.

Example 1 is an apparatus to improve network transmission efficiency of a sending peer including a metadata engine to identify a method call of a composite to a receiving peer, an annotation engine to identify configuration information of the method call, a method engine to generate a transmission request block to define buffer allocation information for the receiving peer, a parameter analyzer to distinguish respective parameters of the method call as an input type or an output type based on the configuration information, and a transmission block manager to modify the buffer allocation information for the respective parameters being of the input type or the output type.

Example 2 includes the apparatus as defined in example 1, wherein the transmission block manager is to reduce a transmission bandwidth consumption by preventing transmission of output type parameters in the transmission request block.

Example 3 includes the apparatus as defined in example 1, wherein the transmission block manager is to identify a transmission response block in response to transmitting the transmission request block to the receiving peer.

Example 4 includes the apparatus as defined in example 3, wherein the method engine is to examine the transmission response block for metadata associated with a binary data block.

Example 5 includes the apparatus as defined in example 4, wherein the metadata includes a method header to identify a name of the method call executed by the receiving peer.

Example 6 includes the apparatus as defined in example 4, wherein the metadata includes a parameter composite language description header to identify at least one of a number of parameters associated with the binary data block or a size of the parameters associated with the binary data block.

Example 7 includes the apparatus as defined in example 4, wherein the metadata includes a parameter composite language description table to identify offset values associated with respective ones of parameters associated with the binary data block.

Example 8 is a method to improve network transmission efficiency of a sending peer, including identifying, with an instruction by a processor, a method call of a composite to a receiving peer, identifying, with an instruction by the processor, configuration information of the method call, generating, with an instruction by the processor, a transmission request block to define buffer allocation information for the receiving peer, distinguishing, with an instruction by the processor, respective parameters of the method call as an input type or an output type based on the configuration information, and modifying, with an instruction by the processor, the buffer allocation information for the respective parameters being of the input type or the output type.

Example 9 includes the method of example 8, further including reducing a transmission bandwidth consumption by preventing transmission of output type parameters in the transmission request block.

Example 10 includes the method of example 8, further including identifying a transmission response block in response to transmitting the transmission request block to the receiving peer.

Example 11 includes the method of example 10, further including examining the transmission response block for metadata associated with a binary data block.

Example 12 includes the method of example 11, further including identifying a name of the method call executed by the receiving peer.

Example 13 includes the method of example 11, further including identifying at least one of a number of parameters associated with the binary data block or a size of the parameters associated with the binary data block.

Example 14 includes the method of example 11, further including identifying offset values associated with respective ones of parameters associated with the binary data block.

Example 15 is a tangible computer-readable medium having instructions which, when executed, cause a processor to at least identify a method call of a composite to a receiving peer, identify configuration information of the method call, generate a transmission request block to define buffer allocation information for the receiving peer, distinguish respective parameters of the method call as an input type or an output type based on the configuration information, and modify the buffer allocation information for the respective parameters being of the input type or the output type.

Example 16 includes the computer-readable medium as defined in example 15, wherein the instructions, when executed, further cause the processor to reduce a transmission bandwidth consumption by preventing transmission of output type parameters in the transmission request block.

Example 17 includes the computer-readable medium as defined in example 15, wherein the instructions, when executed, further cause the processor to identify a transmission response block in response to transmitting the transmission request block to the receiving peer.

Example 18 includes the computer-readable medium as defined in example 17, wherein the instructions, when executed, further cause the processor to examine the transmission response block for metadata associated with a binary data block.

Example 19 includes the computer-readable medium as defined in example 18, wherein the instructions, when executed, further cause the processor to identify a name of the method call executed by the receiving peer.

Example 20 includes the computer-readable medium as defined in example 18, wherein the instructions, when executed, further cause the processor to identify at least one of a number of parameters associated with the binary data block or a size of the parameters associated with the binary data block.

Example 21 includes the computer-readable medium as defined in example 18, wherein the instructions, when executed, further cause the processor to identify offset values associated with respective ones of parameters associated with the binary data block.

Example 22 is a system to improve network transmission efficiency of a sending peer, including means for identifying a method call of a composite to a receiving peer, means for identifying configuration information of the method call, means for generating a transmission request block to define buffer allocation information for the receiving peer, means for distinguishing respective parameters of the method call as an input type or an output type based on the configuration information, and means for modifying the buffer allocation information for the respective parameters being of the input type or the output type.

Example 23 includes the system as defined in example 22, further including means for reducing a transmission bandwidth consumption by preventing transmission of output type parameters in the transmission request block.

Example 24 includes the system as defined in example 22, further including means for identifying a transmission response block in response to transmitting the transmission request block to the receiving peer.

Example 25 includes the system as defined in example 24, further including means for examining the transmission response block for metadata associated with a binary data block.

Example 26 includes the system as defined in example 25, further including means for identifying a name of the method call executed by the receiving peer.

Example 27 includes the system as defined in example 25, further including means for identifying at least one of a number of parameters associated with the binary data block or a size of the parameters associated with the binary data block.

Example 28 includes the system as defined in example 25, further including means for identifying offset values associated with respective ones of parameters associated with the binary data block.

Example 29 is an apparatus to improve network transmission efficiency of a sending peer, including a metadata engine to identify a reference element of a composite to a receiving peer, an annotation engine to identify configuration information of the reference element, a deep copy engine to extract an active portion of the reference element based on the configuration information, and a client payload engine to transmit the active portion of the reference element in a binary data format associated with transmission metadata.

Example 30 includes the apparatus as defined in example 29, wherein the reference element includes an array.

Example 31 includes the apparatus as defined in example 29, wherein the configuration information includes at least one of a maximum size or an actual size of the reference element.

Example 32 includes the apparatus as defined in example 29, further including a reference header manager to generate a reference header to identify the transmission metadata, the transmission metadata including a size of the reference element and an offset value of the reference element associated with the binary data format.

Example 33 includes the apparatus as defined in example 29, further including a reference size analyzer to determine if the reference element includes an actual size value.

Example 34 includes the apparatus as defined in example 33, wherein the reference size analyzer is to allocate an offset size equal to the actual size value.

Example 35 includes the apparatus as defined in example 33, wherein the reference size analyzer is to allocate an offset size equal to a maximum size of the reference element when the actual size value is unavailable.

Example 36 includes the apparatus as defined in example 29, further including a reference validity analyzer to determine if the reference element includes an indication of invalidity.

Example 37 includes the apparatus as defined in example 36, wherein the indication of invalidity includes a reference to NULL.

Example 38 includes the apparatus as defined in example 36, wherein the reference validity analyzer is to allocate an offset size of ONE in response to identifying the indication of invalidity.

Example 39 is a method to improve network transmission efficiency of a sending peer, including identifying, with an instruction by a processor, a reference element of a composite to a receiving peer, identifying, with an instruction by the processor, configuration information of the reference element via code annotation, extracting, with an instruction by the processor, an active portion of the reference element based on the configuration information, and transmitting, with an instruction by the processor, the active portion of the reference element in a binary data format associated with transmission metadata.

Example 40 includes the method as defined in example 39, wherein the reference element includes an array.

Example 41 includes the method as defined in example 39, wherein the configuration information includes at least one of a maximum size or an actual size of the reference element.

Example 42 includes the method as defined in example 39, further including generating a reference header to identify the transmission metadata, the transmission metadata including a size of the reference element and an offset value of the reference element associated with the binary data format.

Example 43 includes the method as defined in example 39, further including determining if the reference element includes an actual size value.

Example 44 includes the method as defined in example 43, further including allocating an offset size equal to the actual size value.

Example 45 includes the method as defined in example 43, further including allocating an offset size equal to a maximum size of the reference element when the actual size value is unavailable.

Example 46 includes the method as defined in example 39, further including determining if the reference element includes an indication of invalidity.

Example 47 includes the method as defined in example 46, wherein the indication of invalidity includes a reference to NULL.

Example 48 includes the method as defined in example 46, further including allocating an offset size of ONE in response to identifying the indication of invalidity.

Example 49 is a tangible computer-readable medium having instructions which, when executed, cause a processor to at least identify a reference element of a composite to a receiving peer, identify configuration information of the reference element via code annotation, extract an active portion of the reference element based on the configuration information, and transmit the active portion of the reference element in a binary data format associated with transmission metadata.

Example 50 includes the computer-readable medium as defined in example 49, wherein the instructions, when executed, further cause the processor to generate a reference header to identify the transmission metadata, the transmission metadata including a size of the reference element and an offset value of the reference element associated with the binary data format.

Example 51 includes the computer-readable medium as defined in example 49, wherein the instructions, when executed, further cause the processor to determine if the reference element includes an actual size value.

Example 51 includes the computer-readable medium as defined in example 51, wherein the instructions, when executed, further cause the processor to allocate an offset size equal to the actual size value.

Example 52 includes the computer-readable medium as defined in example 51, wherein the instructions, when executed, further cause the processor to allocate an offset size equal to a maximum size of the reference element when the actual size value is unavailable.

Example 53 includes the computer-readable medium as defined in example 49, wherein the instructions, when executed, further cause the processor to determine if the reference element includes an indication of invalidity.

Example 54 includes the computer-readable medium as defined in example 53, wherein the instructions, when executed, further cause the processor to allocate an offset size of ONE in response to identifying the indication of invalidity.

Example 55 is a system to improve network transmission efficiency of a sending peer, including means for identifying a reference element of a composite to a receiving peer, means for identifying configuration information of the reference element via code annotation, means for extracting an active portion of the reference element based on the configuration information, and means for transmitting the active portion of the reference element in a binary data format associated with transmission metadata.

Example 56 includes the system as defined in example 55, wherein the reference element includes an array.

Example 57 includes the system as defined in example 55, wherein the configuration information includes at least one of a maximum size or an actual size of the reference element.

Example 58 includes the system as defined in example 55, further including means for generating a reference header to identify the transmission metadata, the transmission metadata including a size of the reference element and an offset value of the reference element associated with the binary data format.

Example 59 includes the system as defined in example 55, further including means for determining if the reference element includes an actual size value.

Example 60 includes the system as defined in example 59, further including means for allocating an offset size equal to the actual size value.

Example 61 includes the system as defined in example 59, further including means for allocating an offset size equal to a maximum size of the reference element when the actual size value is unavailable.

Example 62 includes the system as defined in example 55, further including means for determining if the reference element includes an indication of invalidity.

Example 63 includes the system as defined in example 62, wherein the indication of invalidity includes a reference to NULL.

Example 64 includes the system as defined in example 62, further including means for allocating an offset size of ONE in response to identifying the indication of invalidity.

Example 65 is a system to improve network transmission efficiency of a sending peer, including a metadata engine to identify a structure of a composite to a receiving peer, a union analyzer to identify respective ones of union elements of the union structure and parse the respective ones of the union elements for associated discriminator values, and a union transmission buffer manager to assign a discriminator variable value equal to one of the associated discriminator values that is associated with an active union element and transmit the discriminator variable value as metadata with a binary payload of the active union element.

Example 66 includes the system as defined in example 65, further including a receiving peer input/output interface to retrieve the metadata and the binary payload.

Example 67 includes the system as defined in example 66, further including a union mapping manager to generate a mapping table having a list of the respective ones of the union elements and associated discriminator values, and a list of receiver-side union elements and associated receiver-side discriminator values.

Example 68 includes the system as defined in example 67, wherein the union mapping manager is to identify the active union element based on the one of the discriminator values that matches a value of the discriminator variable.

Example 69 includes the system as defined in example 68, wherein the union mapping manager is to link one of the list of receiver-side union elements with the active union element based on the match.

Example 70 includes the system as defined in example 65, further including a composite interface description engine to generate architecture agnostic metadata associated with the union structure.

Example 71 includes the system as defined in example 65, further including a composite language description engine to generate architecture specific metadata associated with the union structure.

Example 72 includes the system as defined in example 71, wherein the union analyzer is to assign an offset value of zero for the active union element.

Example 73 is a method to improve network transmission efficiency of a sending peer, including identifying, with an instruction by a processor, a structure of a composite to a receiving peer, identifying, with an instruction by the processor, respective ones of union elements of the union structure, parsing, with an instruction by the processor, the respective ones of the union elements for associated discriminator values, assigning, with an instruction by the processor, a discriminator variable value equal to one of the associated discriminator values that is associated with an active union element, and transmitting, with an instruction by the processor, the discriminator variable value as metadata with a binary payload of the active union element.

Example 74 includes the method as defined in example 73, further including retrieving the metadata and the binary payload via a receiving peer input/output interface.

Example 75 includes the method as defined in example 74, further including generating a mapping table having a list of the respective ones of the union elements and associated discriminator values, and a list of receiver-side union elements and associated receiver-side discriminator values.

Example 76 includes the method as defined in example 75, further including identifying the active union element based on the one of the discriminator values that matches a value of the discriminator variable.

Example 77 includes the method as defined in example 76, further including linking one of the list of receiver-side union elements with the active union element based on the match.

Example 78 includes the method as defined in example 73, further including generating architecture agnostic metadata associated with the union structure.

Example 79 includes the method as defined in example 73, further including generating architecture specific metadata associated with the union structure.

Example 80 includes the method as defined in example 79, further including assigning an offset value of zero for the active union element.

Example 81 is a tangible computer-readable medium including instructions which, when executed, cause a processor to at least identify a structure of a composite to a receiving peer, identify respective ones of union elements of the union structure, parse the respective ones of the union elements for associated discriminator values, assign a discriminator variable value equal to one of the associated discriminator values that is associated with an active union element, and transmit the discriminator variable value as metadata with a binary payload of the active union element.

Example 82 includes the computer-readable medium as defined in example 81, wherein the instructions, when executed, further cause the processor to retrieve the metadata and the binary payload via a receiving peer input/output interface.

Example 83 includes the computer-readable medium as defined in example 82, wherein the instructions, when executed, further cause the processor to generate a mapping table having a list of the respective ones of the union elements and associated discriminator values, and a list of receiver-side union elements and associated receiver-side discriminator values.

Example 84 includes the computer-readable medium as defined in example 83, wherein the instructions, when executed, further cause the processor to identify the active union element based on the one of the discriminator values that matches a value of the discriminator variable.

Example 85 includes the computer-readable medium as defined in example 84, wherein the instructions, when executed, further cause the processor to link one of the list of receiver-side union elements with the active union element based on the match.

Example 86 includes the computer-readable medium as defined in example 81, wherein the instructions, when executed, further cause the processor to generate architecture agnostic metadata associated with the union structure.

Example 87 includes the computer-readable medium as defined in example 81, wherein the instructions, when executed, further cause the processor to generate architecture specific metadata associated with the union structure.

Example 88 is a system to improve network transmission efficiency of a sending peer, including means for identifying a structure of a composite to a receiving peer, means for identifying respective ones of union elements of the union structure, means for parsing the respective ones of the union elements for associated discriminator values, means for assigning a discriminator variable value equal to one of the associated discriminator values that is associated with an active union element, and means for transmitting the discriminator variable value as metadata with a binary payload of the active union element.

Example 89 includes the system as defined in example 88, further including means for retrieving the metadata and the binary payload via a receiving peer input/output interface.

Example 90 includes the system as defined in example 89, further including means for generating a mapping table having a list of the respective ones of the union elements and associated discriminator values, and a list of receiver-side union elements and associated receiver-side discriminator values.

Example 91 includes the system as defined in example 90, further including means for identifying the active union element based on the one of the discriminator values that matches a value of the discriminator variable.

Example 92 includes the system as defined in example 91, further including means for linking one of the list of receiver-side union elements with the active union element based on the match.

Example 93 includes the system as defined in example 88, further including means for generating architecture agnostic metadata associated with the union structure.

Example 94 includes the system as defined in example 88, further including means for generating architecture specific metadata associated with the union structure.

Example 95 includes the system as defined in example 94, further including means for assigning an offset value of zero for the active union element.

What is claimed is:

1. An apparatus to improve network transmission efficiency of a sending peer, comprising:
    a metadata engine to identify a reference element of a composite from a sending peer to a receiving peer;
    an annotation engine to identify configuration information of the reference element;
    a deep copy engine to extract an active portion of the reference element from the composite, the active portion based on the configuration information; and
    a client payload engine to transmit the active portion of the reference element in a binary data format associated with transmission metadata.

2. The apparatus as defined in claim 1, wherein the reference element includes an array.

3. The apparatus as defined in claim 1, wherein the configuration information includes at least one of a maximum size or an actual size of the reference element.

4. The apparatus as defined in claim 1, further including a reference header manager to generate a reference header including the transmission metadata, the transmission metadata including a size of the reference element and an offset value of the reference element associated with the binary data format.

5. The apparatus as defined in claim 1, further including a reference size analyzer to determine if the reference element includes an actual size value.

6. The apparatus as defined in claim 5, wherein the reference size analyzer is to allocate an offset size value equal to the actual size value.

7. The apparatus as defined in claim 5, wherein the reference size analyzer is to allocate an offset size value equal to a maximum size of the reference element when the actual size value is unavailable.

8. The apparatus as defined in claim 1, further including a reference validity analyzer to determine if the reference element includes an indication of invalidity.

9. The apparatus as defined in claim 8, wherein the indication of invalidity includes a reference to NULL.

10. The apparatus as defined in claim 8, wherein the reference validity analyzer is to allocate an offset size of one in response to identifying the indication of invalidity.

11. A method to improve network transmission efficiency of a sending peer, comprising:
    identifying, with an instruction by a processor, a reference element of a composite from a sending peer to a receiving peer;
    identifying, with an instruction by the processor, configuration information of the reference element via code annotation;
    extracting, with an instruction by the processor, an active portion of the reference element from the composite, the active portion based on the configuration information; and
    transmitting, with an instruction by the processor, the active portion of the reference element in a binary data format associated with transmission metadata.

12. The method as defined in claim 11, wherein the reference element includes an array.

13. The method as defined in claim 11, wherein the configuration information includes at least one of a maximum size or an actual size of the reference element.

14. The method as defined in claim 11, further including generating a reference header including the transmission metadata, the transmission metadata including a size of the reference element and an offset value of the reference element associated with the binary data format.

15. The method as defined in claim 11, further including determining if the reference element includes an actual size value.

16. The method as defined in claim 15, further including allocating an offset size value equal to the actual size value.

17. The method as defined in claim 15, further including allocating an offset size value equal to a maximum size of the reference element when the actual size value is unavailable.

18. The method as defined in claim 11, further including determining if the reference element includes an indication of invalidity.

19. The method as defined in claim 18, wherein the indication of invalidity includes a reference to NULL.

20. The method as defined in claim 18, further including allocating an offset size of one in response to identifying the indication of invalidity.

21. A tangible computer-readable medium comprising instructions which, when executed, cause a processor to at least:
    identify a reference element of a composite from a sending peer to a receiving peer;
    identify configuration information of the reference element via code annotation;
    extract an active portion of the reference element from the composite, the active portion based on the configuration information; and
    transmit the active portion of the reference element in a binary data format associated with transmission metadata.

22. The tangible computer-readable medium as defined in claim 21, wherein the instructions, when executed, further cause the processor to generate a reference header including the transmission metadata, the transmission metadata including a size of the reference element and an offset value of the reference element associated with the binary data format.

23. The tangible computer-readable medium as defined in claim 21, wherein the instructions, when executed, further cause the processor to determine if the reference element includes an actual size value.

24. The tangible computer-readable medium as defined in claim 23, wherein the instructions, when executed, further cause the processor to allocate an offset size value equal to the actual size value.

25. The tangible computer-readable medium as defined in claim 23, wherein the instructions, when executed, further cause the processor to allocate an offset size value equal to a maximum size of the reference element when the actual size value is unavailable.

* * * * *